(12) United States Patent
Kroepfl et al.

(10) Patent No.: US 11,698,272 B2
(45) Date of Patent: Jul. 11, 2023

(54) MAP CREATION AND LOCALIZATION FOR AUTONOMOUS DRIVING APPLICATIONS

(71) Applicant: NVIDIA Corporation, Santa Clara, CA (US)

(72) Inventors: Michael Kroepfl, Kirkland, WA (US); Amir Akbarzadeh, San Jose, CA (US); Ruchi Bhargava, Redmond, WA (US); Vaibhav Thukral, Bellevue, WA (US); Neda Cvijetic, East Palo Alto, CA (US); Vadim Cugunovs, Bellevue, WA (US); David Nister, Bellevue, WA (US); Birgit Henke, Seattle, WA (US); Ibrahim Eden, Redmond, WA (US); Youding Zhu, Sammamish, WA (US); Michael Grabner, Redmond, WA (US); Ivana Stojanovic, Berkeley, CA (US); Yu Sheng, San Diego, CA (US); Jeffrey Liu, Bellevue, WA (US); Enliang Zheng, Redmond, WA (US); Jordan Marr, Santa Clara, CA (US); Andrew Carley, Kenmore, WA (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 17/007,873

(22) Filed: Aug. 31, 2020

(65) Prior Publication Data

US 2021/0063200 A1    Mar. 4, 2021

Related U.S. Application Data

(60) Provisional application No. 62/894,727, filed on Aug. 31, 2019.

(51) Int. Cl.
*G01C 21/00* (2006.01)
*G06N 3/02* (2006.01)
*G01C 21/16* (2006.01)

(52) U.S. Cl.
CPC ..... *G01C 21/3841* (2020.08); *G01C 21/1652* (2020.08); *G01C 21/3811* (2020.08);
(Continued)

(58) Field of Classification Search
CPC ........... G06N 3/02; G06N 3/063; G06N 3/08; G06N 3/0454; G01C 21/3841;
(Continued)

(56) References Cited

U.S. PATENT DOCUMENTS 7,409,295 B2    8/2008    Paradie
8,204,542 B2    6/2012    Liao et al.
(Continued)

FOREIGN PATENT DOCUMENTS

DE    10 2013 208 521 A1    11/2014
DE    102013208521 A1 *    11/2014    ............. G01C 21/32
(Continued)

OTHER PUBLICATIONS

Notice of Allowance dated Apr. 20, 2022, in U.S. Appl. No. 16/355,328, 5 pages.
(Continued)

*Primary Examiner* — Aaron L Troost
(74) *Attorney, Agent, or Firm* — Taylor English Duma L.L.P.

(57) ABSTRACT

An end-to-end system for data generation, map creation using the generated data, and localization to the created map is disclosed. Mapstreams—or streams of sensor data, perception outputs from deep neural networks (DNNs), and/or relative trajectory data—corresponding to any number of drives by any number of vehicles may be generated and
(Continued)

uploaded to the cloud. The mapstreams may be used to generate map data—and ultimately a fused high definition (HD) map—that represents data generated over a plurality of drives. When localizing to the fused HD map, individual localization results may be generated based on comparisons of real-time data from a sensor modality to map data corresponding to the same sensor modality. This process may be repeated for any number of sensor modalities and the results may be fused together to determine a final fused localization result.

25 Claims, 28 Drawing Sheets

(52) U.S. Cl.
CPC ..... *G01C 21/3867* (2020.08); *G01C 21/3878* (2020.08); *G01C 21/3896* (2020.08); *G06N 3/02* (2013.01)

(58) Field of Classification Search
CPC ............ G01C 21/1652; G01C 21/3811; G01C 21/3867; G01C 21/3878; G01C 21/3896; G01C 21/3815
See application file for complete search history.

(56) References Cited

U.S. PATENT DOCUMENTS

| | | | |
|---|---|---|---|
| 8,204,642 B2 | 6/2012 | Tanaka et al. |
| 9,098,751 B2 | 8/2015 | Hilldore et al. |
| 9,373,057 B1 | 6/2016 | Erhan et al. |
| 9,623,905 B2 | 4/2017 | Shashua et al. |
| 9,701,307 B1 | 7/2017 | Newman et al. |
| 9,710,714 B2 | 7/2017 | Chen et al. |
| 9,721,471 B2 | 8/2017 | Chen et al. |
| 9,742,869 B2 | 8/2017 | Bolotin et al. |
| 10,007,269 B1 | 6/2018 | Gray |
| 10,108,867 B1 | 10/2018 | Vallespi-Gonzalez et al. |
| 10,133,274 B2 | 11/2018 | Shashua et al. |
| 10,134,278 B1 | 11/2018 | Konrardy et al. |
| 10,157,331 B1 | 12/2018 | Tang et al. |
| 10,262,213 B2 | 4/2019 | Chen et al. |
| 10,282,995 B2 | 5/2019 | Heinla et al. |
| 10,289,469 B2 | 5/2019 | Fortino et al. |
| 10,372,136 B2 | 8/2019 | Yang et al. |
| 10,380,886 B2 | 8/2019 | Ran et al. |
| 10,489,972 B2 | 11/2019 | Atsmon |
| 10,580,158 B1 | 3/2020 | Mousavian et al. |
| 10,586,456 B2 | 3/2020 | Wang |
| 10,625,748 B1 | 4/2020 | Dong et al. |
| 10,635,110 B2 | 4/2020 | Shashua et al. |
| 10,730,517 B2 | 8/2020 | Park et al. |
| 10,739,778 B2 | 8/2020 | Winkler et al. |
| 10,740,954 B2 | 8/2020 | Liu |
| 10,761,535 B2 | 9/2020 | Chen et al. |
| 10,776,985 B2 | 9/2020 | Liu et al. |
| 10,816,978 B1 | 10/2020 | Schwalb |
| 10,829,116 B2 | 11/2020 | Iagnemma et al. |
| 10,829,793 B2 | 11/2020 | Arikawa et al. |
| 10,832,439 B1 | 11/2020 | Ma et al. |
| 10,885,698 B2 | 1/2021 | Muthler et al. |
| 10,942,030 B2 | 3/2021 | Haque et al. |
| 11,042,163 B2 | 6/2021 | Chen et al. |
| 11,210,537 B2 | 12/2021 | Koivisto et al. |
| 11,321,924 B2 | 5/2022 | Molyneaux et al. |
| 2004/0016870 A1 | 1/2004 | Pawlicki et al. |
| 2004/0252864 A1 | 12/2004 | Chang et al. |
| 2005/0196034 A1 | 9/2005 | Hattori et al. |
| 2007/0154068 A1 | 7/2007 | Stein et al. |
| 2007/0182528 A1 | 8/2007 | Breed et al. |
| 2008/0266396 A1 | 10/2008 | Stein |
| 2009/0088941 A1 | 4/2009 | Tsuchiya et al. |
| 2009/0097704 A1 | 4/2009 | Savidge et al. |
| 2009/0256840 A1 | 10/2009 | Varadhan et al. |
| 2010/0149193 A1 | 6/2010 | Yu |
| 2010/0322476 A1 | 12/2010 | Kanhere et al. |
| 2011/0044557 A1 | 2/2011 | Abraham et al. |
| 2012/0194516 A1 | 8/2012 | Newcombe et al. |
| 2013/0061033 A1 | 3/2013 | Kim et al. |
| 2013/0100286 A1 | 4/2013 | Lao |
| 2013/0106837 A1 | 5/2013 | Mukherjee et al. |
| 2014/0104424 A1 | 4/2014 | Zhang et al. |
| 2015/0054824 A1 | 2/2015 | Jiang |
| 2015/0067672 A1 | 3/2015 | Mitra et al. |
| 2015/0172626 A1 | 6/2015 | Martini |
| 2015/0278578 A1 | 10/2015 | Otsuka et al. |
| 2015/0304634 A1 | 10/2015 | Karvounis |
| 2015/0346716 A1 | 12/2015 | Scharfe et al. |
| 2016/0153801 A1 | 6/2016 | Cho et al. |
| 2016/0247290 A1 | 8/2016 | Liu et al. |
| 2016/0321074 A1 | 11/2016 | Hung et al. |
| 2016/0364907 A1 | 12/2016 | Schoenberg |
| 2017/0010108 A1 | 1/2017 | Shashua |
| 2017/0061625 A1 | 3/2017 | Estrada et al. |
| 2017/0061632 A1 | 3/2017 | Lindner et al. |
| 2017/0090478 A1 | 3/2017 | Blayvas et al. |
| 2017/0116781 A1 | 4/2017 | Babahajiani et al. |
| 2017/0122747 A1 | 5/2017 | Park |
| 2017/0124717 A1 | 5/2017 | Baruch et al. |
| 2017/0124758 A1 | 5/2017 | Jia et al. |
| 2017/0177950 A1* | 6/2017 | Hasberg .................. G06T 7/73 |
| 2017/0220876 A1 | 8/2017 | Gao et al. |
| 2017/0236013 A1 | 8/2017 | Clayton et al. |
| 2017/0236419 A1 | 8/2017 | Grewe |
| 2017/0259801 A1 | 9/2017 | Abou-Nasr et al. |
| 2017/0344808 A1 | 11/2017 | El-Khamy et al. |
| 2017/0357862 A1 | 12/2017 | Tatsubori |
| 2017/0371340 A1 | 12/2017 | Cohen et al. |
| 2017/0371346 A1 | 12/2017 | Mei et al. |
| 2018/0089833 A1 | 3/2018 | Lewis et al. |
| 2018/0121273 A1 | 5/2018 | Fortino et al. |
| 2018/0136332 A1 | 5/2018 | Barfield et al. |
| 2018/0158244 A1 | 6/2018 | Ybanez Zepeda et al. |
| 2018/0164812 A1 | 6/2018 | Oh et al. |
| 2018/0188045 A1 | 7/2018 | Wheeler et al. |
| 2018/0188059 A1 | 7/2018 | Wheeler et al. |
| 2018/0203959 A1 | 7/2018 | Refsnaes et al. |
| 2018/0232663 A1 | 8/2018 | Ross et al. |
| 2018/0267558 A1 | 9/2018 | Tiwari et al. |
| 2018/0276278 A1 | 9/2018 | Cagan et al. |
| 2018/0300590 A1 | 10/2018 | Briggs et al. |
| 2018/0304468 A1 | 10/2018 | Holz |
| 2018/0348374 A1 | 12/2018 | Laddha et al. |
| 2018/0349746 A1 | 12/2018 | Vallespi-Gonzalez |
| 2018/0370540 A1 | 12/2018 | Yousuf et al. |
| 2018/0373980 A1 | 12/2018 | Huval |
| 2019/0016285 A1 | 1/2019 | Freienstein et al. |
| 2019/0061771 A1 | 2/2019 | Bier et al. |
| 2019/0065933 A1 | 2/2019 | Bogdoll et al. |
| 2019/0066328 A1 | 2/2019 | Kwant et al. |
| 2019/0071101 A1 | 3/2019 | Emura et al. |
| 2019/0080467 A1 | 3/2019 | Hirzer et al. |
| 2019/0095946 A1 | 3/2019 | Azout et al. |
| 2019/0101399 A1 | 4/2019 | Sunil Kumar et al. |
| 2019/0102646 A1 | 4/2019 | Redmon et al. |
| 2019/0102668 A1 | 4/2019 | Yao et al. |
| 2019/0120640 A1 | 4/2019 | Ho et al. |
| 2019/0129831 A1 | 5/2019 | Goldberg |
| 2019/0146497 A1 | 5/2019 | Urtasun et al. |
| 2019/0146500 A1 | 5/2019 | Yalla et al. |
| 2019/0147072 A1 | 5/2019 | Homeier et al. |
| 2019/0147600 A1 | 5/2019 | Karasev et al. |
| 2019/0147610 A1 | 5/2019 | Frossard et al. |
| 2019/0163990 A1 | 5/2019 | Mei et al. |
| 2019/0171912 A1 | 6/2019 | Vallespi-Gonzalez et al. |
| 2019/0179979 A1 | 6/2019 | Melick |
| 2019/0189001 A1 | 6/2019 | Smothers et al. |
| 2019/0197774 A1 | 6/2019 | Molyneaux et al. |
| 2019/0213481 A1 | 7/2019 | Godard et al. |
| 2019/0220003 A1 | 7/2019 | Sharma et al. |
| 2019/0235515 A1 | 8/2019 | Shirvani et al. |

(56) References Cited

U.S. PATENT DOCUMENTS

| | | | |
|---|---|---|---|
| 2019/0243371 | A1 | 8/2019 | Nister et al. |
| 2019/0250622 | A1 | 8/2019 | Nister et al. |
| 2019/0251442 | A1 | 8/2019 | Koivisto et al. |
| 2019/0258251 | A1 | 8/2019 | Ditty et al. |
| 2019/0302761 | A1 | 10/2019 | Huang et al. |
| 2020/0013176 | A1 | 1/2020 | Kang et al. |
| 2020/0080849 | A1 | 3/2020 | Ondruska et al. |
| 2020/0117213 | A1 | 4/2020 | Tian et al. |
| 2020/0117898 | A1 | 4/2020 | Tian et al. |
| 2020/0143205 | A1 | 5/2020 | Yao et al. |
| 2020/0160559 | A1 | 5/2020 | Urtasun et al. |
| 2020/0175311 | A1 | 6/2020 | Xu et al. |
| 2020/0247431 | A1* | 8/2020 | Ferencz ............ G01C 21/3658 |
| 2020/0257306 | A1 | 8/2020 | Nisenzon |
| 2020/0293064 | A1 | 9/2020 | Wu et al. |
| 2021/0025696 | A1 | 1/2021 | Goto et al. |
| 2021/0064980 | A1 | 3/2021 | Heinrich et al. |
| 2021/0089794 | A1 | 3/2021 | Chen et al. |
| 2021/0150722 | A1 | 5/2021 | Homayounfar et al. |
| 2021/0174516 | A1 | 6/2021 | Kang et al. |
| 2021/0286923 | A1 | 9/2021 | Kristensen et al. |
| 2021/0300379 | A1 | 9/2021 | Hackeloeer et al. |
| 2022/0084406 | A1 | 3/2022 | Asai et al. |
| 2022/0132145 | A1 | 4/2022 | Choi et al. |
| 2022/0187095 | A1 | 6/2022 | Lee |

FOREIGN PATENT DOCUMENTS

| | | |
|---|---|---|
| DE | 10 2015 221 920 A1 | 5/2017 |
| DE | 10 2015 226 762 A1 | 6/2017 |
| EP | 1 930 863 A2 | 6/2008 |
| EP | 1 930 868 A1 | 6/2008 |
| EP | 2 384 009 A2 | 11/2011 |
| EP | 3 171 297 A1 | 5/2017 |
| EP | 3 441 909 A1 | 2/2019 |
| KR | 10-2012-0009590 A | 2/2012 |
| WO | 2012/011713 A2 | 1/2012 |
| WO | 2016/183074 A1 | 11/2016 |
| WO | 2017/177128 A1 | 10/2017 |
| WO | 2017/220705 A1 | 12/2017 |
| WO | 2018/002910 A1 | 1/2018 |
| WO | 2018/102717 A1 | 6/2018 |
| WO | 2018/104563 A2 | 6/2018 |
| WO | 2018/193254 A1 | 10/2018 |

OTHER PUBLICATIONS

Notice of Allowance dated May 11, 2022 in U.S. Appl. No. 16/911,007, 9 pages.
"Methodology of Using a Single Controller (ECU) For a Fault-Tolerant/Fail-Operational Self-Driving System", U.S. Appl. No. 62/524,283, filed Jun. 23, 2017.
"Systems and Methods for Safe and Reliable Autonomous Vehicles", U.S. Appl. No. 62/584,549, filed Nov. 10, 2017.
"System and Method for Controlling Autonomous Vehicles", U.S. Appl. No. 62/614,466, filed Jan. 17, 2018.
"System and Method for Safe Operation of Autonomous Vehicles", U.S. Appl. No. 62/625,351, filed Feb. 2, 2018.
"Conservative Control for Zone Driving of Autonomous Vehicles", U.S. Appl. No. 62/628,831, filed Feb. 9, 2018.
"Systems and Methods for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for Autonomousvehicles", U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Methods for Accurate Real-time Lane and Road Boundary Detection for Autonomous Driving", U.S. Appl. No. 62/636,142, filed Feb. 27, 2018.
"Convolutional Neural Networks to Detect Drivable Freespace for Autonomous Vehicles", U.S. Appl. No. 62/643,665, filed Mar. 15, 2018.
"Energy Based Reflection Filter for Denoising Ray-Traced Glossy Reflections", U.S. Appl. No. 62/644,386, filed Mar. 17, 2018.
"Geometric Shadow Filter for Denoising Ray-Traced Shadows", U.S. Appl. No. 62/644,385, filed Mar. 17, 2018.
"Adaptive Occlusion Sampling of Rectangular Area Lights with Voxel Cone Tracing", U.S. Appl. No. 62/644,806, filed Mar. 19, 2018.
"Distance Based Ambient Occlusion Filter for Denoising Ambient Occlusions", U.S. Appl. No. 62/644,601, filed Mar. 19, 2018.
"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Video Prediction Using Spatially Displaced Convolution", U.S. Appl. No. 62/647,545, filed Mar. 23, 2018.
"Network Injection Rate Limiting", U.S. Appl. No. 62/648,326, filed Mar. 26, 2018.
"Network Synchronization Using Posted Operation Tracking For Flush Semantics", U.S. Appl. No. 62/648,333, filed Mar. 26, 2018.
"System and Methods for Advanced AI-Assisted Vehicles", U.S. Appl. No. 62/648,358, filed Mar. 26, 2018.
"Method and System of Remote Operation of a Vehicle Using an Immersive Virtual Reality Environment", U.S. Appl. No. 62/648,493, filed Mar. 27, 2018.
"System and Method for Training, Testing, Verifying, and Validating Autonomous and Semi-Autonomous Vehicles", U.S. Appl. No. 62/648,399, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"Methods for High-Precision, High-Accuracy Lane Detection In Autonomous Driving Applications", U.S. Appl. No. 62/699,669, filed Jul. 17, 2018.
"Distance to Obstacle Detection in Autonomous Driving Applications", U.S. Appl. No. 62/786,188, filed Dec. 28, 2018.
"Detection and Classification of Wait Conditions in Autonomous Driving Applications", U.S. Appl. No. 62/816,838, filed Mar. 11, 2019.
"Intersection Detection and Handling Using Live Perception in Autonomous Driving Applications", U.S. Appl. No. 62/839,155, filed Apr. 26, 2019.
"Intersection Contention Area Detection Using Live Perception in Autonomous Driving Applications", U.S. Appl. No. 62/866,158, filed Jun. 25, 2019.
"Lidar range Image Processing for Autonomous Vehicle Applications", U.S. Appl. No. 62/893,814, filed Aug. 30, 2019.
International Search Report and Written Opinion received for PCT Patent Application No. PCT/US2020/048786, dated Nov. 12, 2020, 13 pages.
"Euler spiral", Wikipedia, Retrieved from Internet URL : https://en.wikipedia.org/wiki/Euler_spiral, accessed on Feb. 21, 2019, pp. 10.
"F1 score", Wikipedia, Retrieved from Internet URL : https://en.wikipedia.org/wiki/F-score, accessed on Feb. 21, 2019, pp. 3.
"Implementation of Control Flow in TensorFlow" TensorFlow Authors, Retrieved from the Internet URL : http://download.tensorflow.org/paper/white_paper_tf_control_flow_implementation_2017_11_1.pdf, pp. 1-18 (Nov. 1, 2016).
"Neural Networks", Retrieved from Internet URL : https://www.tensorflow.org/api_guides/python/nn#conv2d_transpose, accessed on Mar. 1, 2019, pp. 14.
"Polynomial curve fitting", Retrieved from Internet URL : https://www.mathworks.com/help/matlab/ref/polyfit.html, accessed on Feb. 21, 2019, pp. 13.

(56) References Cited

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

"Tensorflow", Retrieved from the Internet URL :https://github.com/tensorflow/tensorflow/blob/master/tensorflow/core/kernels/hinge-loss.h, accessed on May 16, 2019, pp. 1-4.

"Tf.while_loop much slower than static graph? #9527", tensorflow, Retrieved from the Internet URL : https://github.com/tensorflow/tensorflow/issues/9527,accessed on May 16, 2019, pp. 1-7.

"Tf.losses.get_regularization_loss", TensorFlow Core 1.13, Retrieved from the Internet URL : https://www.tensorflow.org/api_docs/python/tf/losses/get_regularization_loss, accessed on May 16, 2019, pp. 1-1.

What is polyline?, Webopedia Definition, Retrieved from Internet URL : https://www.webopedia.com/TERM/P/polyline.html, accessed on Feb. 21, 2019, pp. 4.

"What are deconvolutional layers?", Data Science Stack Exchange, Retrieved from Internet URL : https://datascience.stackexchange.com/questions/6107/what%E2%80%90are%E2%80%90deconvolutional%E2%80%90layers, accessed on Feb. 21, 2019, pp. 21.

Allison, R. S., et al., "Binocular depth discrimination and estimation beyond interaction space", Journal of Vision, vol. 9, No. 1, pp. 1-14 (Jan. 2009).

Alvarez, J. M., et al., "Road Scene Segmentation from a Single Image", In Proceedings of the 12th European Conference on Computer Vision—vol. Part VII, ECCV'12, pp. 376-389 (2012).

Asvadi, A., et al.,"DepthCN: Vehicle detection using 3D-LIDAR and ConvNet", IEEE 20th International Conference On Intelligent Transportation Systems (ITSC), pp. 1-6 (2017).

Bach, M., et al., "Multi-Camera Traffic Light Recognition Using A Classifying Labelled Multi-Bernoulli Filter", In 2017 IEEE Intelligent Vehicles Symposium (IV), pp. 1045-1051 (Jun. 11-14, 2017).

Badino, H., et al., "Free Space Computation Using Stochastic Occupancy Grids And Dynamic Programming", Worshop on Dynamical Vision at ICCV, pp. 1-12 (Oct. 2007).

Badino, H., et al., "The Stixel World—A Compact Medium Level Representation Of The 3d-World", In DAGM, pp. 1-10 (2009).

Benenson, R., et al., "Stixels Estimation Without Depth Map Computation", In ICCV, pp. 1-8 (2011).

Bidlack, C. et al., "Visual Robot Navigation Using Flat Earth Obstacle Projection", Proceedings Of The IEEE International Conference On Robotics And Automation, pp. 3374-3381 (May 8, 1994).

Bojarski, M., et al.,"End To End Learning For Self-Driving Cars", arXiv: 1604.07316v1 [cs.CV], XP055570062, Retrieved from the Internet URL:https://nvidia.com/content/tegra/automotive/images/2016/solutions/pdf/end-to-end-dl-using-px.pdf, pp. 1-9 (Apr. 25, 2016).

Borland, D., and Taylor II, R. M.,"Rainbow Color Map (Still) Considered Harmful", IEEE Computer Graphics and Applications, vol. 27, No. 2, pp. 1-17 (Mar./Apr. 2007).

Brust, C. A., et al., "Convolutional Patch Networks With Spatial Prior For Road Detection And Urban Scene Understanding", In International Conference on Computer Vision Theory and Applications (VISAPP), arXiv:1502.06344v1 [cs.CV], pp. 1-9 (Feb. 23, 2015).

Chen, J., et al., "FOAD: Fast Optimization-based Autonomous Driving Motion Planner", 2018 Annual American Control Conference (ACC), IEEE, pp. 1-8 (Jun. 27-29, 2018).

Cheng, G., et al., "Automatic Road Detection and Centerline Extraction via Cascaded End-to-End Convolutional Neural Network", IEEE Transactions on Geoscience and Remote Sensing vol. 55, No. 6, pp. 3322-3337 (Jun. 1, 2017).

Chilamkurthy, S., "A 2017 Guide to Semantic Segmentation with Deep Learning", Qure.ai Blog, Retrieved from Internet URL : http://blog.qure.ai/notes/semantic-segmentation-deep-learning-review, accessed on Feb. 21, 2019, pp. 16 (Jul. 5, 2017).

Clevert, D.-A., et al.,"Fast and Accurate Deep Network Learning by Exponential Linear Units (ELUs)", ICLR 2016, pp. 1-14 (Feb. 22, 2016).

Cormack, R. H., "Stereoscopic depth perception at far viewing distances", Perception & Psychophysics, vol. 35, No. 5, pp. 423-428 (Sep. 1984).

Deshpande, A., "A Beginner's Guide to Understanding Convolutional Neural Networks", accessed at: https://adeshpande3.github.io/A-Beginner's-Guide-To-Understanding-Convolutional-Neural-Networks/, Accessed on Feb. 21, 2019, pp. 1-13.

Dipietro, R., "A Friendly Introduction to Cross-Entropy Loss," Version 0.1, Accessed on Feb. 21, 2019 at: https://rdipietro.github.io/friendly-intro-to-cross-entropy-loss/, pp. 1-10 (May 2, 2016).

Du, L., and Du, Y., "Hardware Accelerator Design for Machine Learning", Machine Learning-Advanced Techniques and Emerging Applications, pp. 1-14 (2017).

Eigen,D., et al., "Depth Map Prediction from a Single Image using a Multi-Scale Deep Network", NIPS, pp. 1-9, (2014).

Elfes, A., "Sonar-Based Real-World Mapping And Navigation", IEEE Journal on Robotics and Automation, vol. 3, Issue: 3, pp. 249-265 (Jun. 1987).

Foley, D., and Danskin, J., "Ultra-Performance Pascal GPU and NVLink Interconnect," IEEE Computer Society, IEEE Micro, vol. 37, No. 2, pp. 1-11 (Mar./Apr. 2017).

Franke, U., and Kutzbach., I., "Fast Stereo Based Object Detection for Stop & Go Traffic", pp. 1-6 (1996).

Fukunaga, K., and Hostetler, L., "The estimation of the gradient of a density function, with applications in pattern recognition", IEEE Transactions on Information Theory, vol. 21, No. 1, pp. 32-40 (Jan. 1975).

Gao, J., et al., "Embedding Structured Contour and Location Prior in Siamesed Fully Convolutional Networks for Road Detection", in IEEE Transactions on Intelligent Transportation Systems, vol. 19, No. 1, pp. 1-6 (Jan. 2018).

Garg, R., et al., "Unsupervised CNN for Single View Depth Estimation: Geometry to the Rescue", ECCV 2016, pp. 1-16 (Jul. 29, 2016).

Garnett, N., et al., "Real-Time Category-Based and General Obstacle Detection for Autonomous Driving", IEEE International Conference on Computer Vision Workshops (ICCVW), IEEE, pp. 198-205 (2017).

Geiger, A., et al., "Vision meets Robotics: The KITTI Dataset", The International Journal of Robotics Research, pp. 1-6 (2013).

Gidaris, S., and Komodakis, N., "Detect, Replace, Refine: Deep Structured Prediction For Pixel Wise Labeling", Computer Vision and Pattern Recognition, pp. 1-21 (Dec. 14, 2016).

Godard, C., et al.,"Unsupervised Monocular Depth Estimation with Left-Right Consistency", IEEE Computer Society Conference on Computer Vision and Pattern Recognition, pp. 270-279 (Jul. 21, 2017).

Gregory, R. L., "Eye and brain : The psychology of seeing", World University Library, pp. 130 (1966) (Part 1).

Gregory, R. L., "Eye and brain : The psychology of seeing", World University Library, pp. 130 (1966) (Part 2).

Guney, F., et al., Displets: Resolving Stereo Ambiguities using Object Knowledge:, IEEE Conference on Computer Vision and Pattern Recognition (CVPR), pp. 1-11 (Jun. 7-12, 2015).

Han, S., et al., "Learning Both Weights And Connections For Efficient Neural Networks", arXiv:1506.02626v3 [cs.NE], pp. 1-9 (Oct. 30, 2015).

Hartley, R., and Zisserman, A., "Multiple View Geometry in Computer Vision", Cambridge University Press, pp. 1-48 (2004).

He, K., et al., "Deep Residual Learning For Image Recognition", Proceedings of IEEE, Conference on Computer Vision and Pattern Recognition (CVPR), pp. 770-778 (2016).

(56) References Cited

OTHER PUBLICATIONS

He, L., et al., "Learning Depth from Single Images with Deep Neural Network Embedding Focal Length", arXiv:1803.10039v1 [cs.CV], pp. 1-14 (Mar. 27, 2018).
Xie, S., and Tu, Z., "Holistically-Nested Edge Detection", Computer Vision Foundation, pp. 1395-1403 (2015).
Yang, Z., "Research on Lane Recognition Algorithm Based on Deep Learning", International Conference on Artificial Intelligence and Advanced Manufacturing (AIAM), IEEE, pp. 387-391 (2019).
Yao, J., et al., "Estimating Drivable Collision-Free Space From Monocular Video," IEEE Winter Conference on Applications of Computer Vision (WACV), pp. 1-10 (2015).
Zbontar, J., and Lecun, Y., "Stereo Matching by Training a Convolutional Neural Network to Compare Image Patches", Journal of Machine Learning Research, vol. 17, pp. 1-32 (2016).
Zhao, H., et al., "Loss Functions for Image Restoration With Neural Networks", IEEE Transactions on Computational Imaging, vol. 3, No. 1, pp. 1-11 (Mar. 2017).
Zhong, Y., et al., "Self-Supervised Learning for Stereo Matching With Self-Improving Ability", arXiv:1709.00930v1 [cs.CV], pp. 1-13 (Sep. 4, 2017).
Invitation to pay additional fees received for PCT Application No. PCT/US2019/018348, mailed on May 29, 2019, 18 pages.
Invitation to pay additional fees received for PCT Application No. PCT/US2019/019656, mailed on May 31, 2019, 9 pages.
International Search Report and Written Opinion dated Jun. 26, 2019 in International Application No. PCT/US2019/024400, 11 pages.
Invitation to pay additional fees received for PCT Application No. PCT/US2019/022592, mailed on Jun. 26, 2019, 9 pages.
International Search Report and Written Opinion received for PCT Patent Application No. PCT/US2019/019656, dated Jul. 24, 2019, 14 pages.
International Search Report and Written Opinion received for PCT Patent Application No. PCT/US2019/018348, dated Jul. 25, 2019, 21 pages.
International Search Report and Written Opinion received for PCT Patent Application No. PCT/US2019/022592, dated Aug. 26, 2019, 14 pages.
International Search Report and Written Opinion dated Oct. 18, 2019 in International Patent Application No. PCT/US2019/042225, 11 pages.
International Search Report and Written Opinion dated Nov. 7, 2019 in International Patent Application No. PCT/US2019/022753, 18 Pages.
International Search Report and Written Opinion received for PCT Patent Application No. PCT/US2019/068764, dated Apr. 22, 2020, 15 pages.
International Search Report and Written Opinion received for PCT Patent Application No. PCT/US2019/068766, dated Apr. 22, 2020, 13 pages.
Invitation to pay additional fees received for PCT Application No. PCT/US2020/028116, mailed on Jul. 21, 2020, 12 pages.
International Search Report and Written Opinion in International Patent Application No. PCT /US2020/021894 dated Aug. 3, 2020, 14 pages.
International Preliminary Report on Patentability received for PCT Application No. PCT/US2019/018348, dated Aug. 27, 2020, 16 pages.
International Preliminary Report on Patentability received for PCT Application No. PCT/US2019/019656, dated Sep. 3, 2020, 11 pages.
International Search Report and Written Opinion received for PCT Patent Application No. PCT/US2020/028116, dated Sep. 11, 2020, 17 pages.
International Preliminary Report on Patentability received for PCT Application No. PCT/US2019/022592, dated Sep. 24, 2020, 11 pages.
Preinterview First Office Action dated Sep. 29, 2020 in U.S. Appl. No. 16/385,921, 10 pages.

International Preliminary Report on Patentability received for PCT Application No. PCT/US2019/022753, dated Oct. 1, 2020, 14 pages.
International Preliminary Report on Patentability received for PCT Application No. PCT/US2019/024400, dated Oct. 8, 2020, 10 pages.
International Search Report and Written Opinion received for PCT Patent Application No. PCT/US2020/039430, dated Oct. 9, 2020, 13 pages.
Non-Final Office Action dated Nov. 25, 2020, in U.S. Appl. No. 16/356,439, 22 pages.
Notice of Allowance dated Dec. 24, 2020, in U.S. Appl. No. 16/385,921, 18 pages.
Notice of Allowance dated Jan. 4, 2021, in U.S. Appl. No. 16/535,440, 10 pages.
Notice of Allowance dated Jan. 19, 2021 in U.S. Appl. No. 16/286,329, 8 pages.
Preinterview First Office Action dated Jan. 26, 2021 in U.S. Appl. No. 16/355,328, 5 pages.
International Preliminary Report on Patentability received for PCT Patent Application No. PCT/US2019/042225, dated Jan. 28, 2021, 9 pages.
First Action Interview Office Action dated Mar. 1, 2021 in U.S. Appl. No. 16/355,328, 4 pages.
International Search Report and Written Opinion received for PCT Patent Application No. PCT/US2020/062869, dated Mar. 17, 2021, 11 pages.
Notice of Allowance dated Mar. 26, 2021, in U.S. Appl. No. 16/356,439, 11 pages.
Notice of Allowance dated Jul. 2, 2021 in U.S. Appl. No. 16/813,306, 13 pages.
International Preliminary Report on Patentability received for PCT Application No. PCT/US2019/068764, dated Jul. 8, 2021, 12 pages.
International Preliminary Report on Patentability received for PCT Application No. PCT/US2019/068766, dated Jul. 8, 2021, 10 pages.
Non-Final Office Action dated May 13, 2021 in U.S. Appl. No. 16/728,595, 18 pages.
Notice of Allowance dated Jul. 16, 2021 in U.S. Appl. No. 16/728,598, 9 pages.
Notice of Allowance dated Aug. 31, 2021 in U.S. Appl. No. 16/728,595, 8 pages.
International Preliminary Report on Patentability received for PCT Application No. PCT /US2020/021894, dated Sep. 23, 2021, 11 pages.
Notice of Allowance dated Oct. 7, 2021 in U.S. Appl. No. 16/813,306, 9 pages.
International Preliminary Report on Patentability received for PCT Application No. PCT/US2020/028116, dated Nov. 4, 2021, 14 pages.
Final Office Action dated Dec. 17, 2021 in U.S. Appl. No. 16/355,328, 17 pages.
International Preliminary Report on Patentability received for PCT Application No. PCT/US2020/039430, dated Jan. 6, 2022, 12 pages.
Preinterview First Office Action dated Feb. 22, 2022 in U.S. Appl. No. 16/911,007, 2 pages.
Notice of Allowance dated Mar. 4, 2022, in U.S. Appl. No. 16/355,328, 5 pages.
International Preliminary Report on Patentability received for PCT Application No. PCT/US2020/048786, dated Mar. 10, 2022, 11 pages.
Hibbard, P. B., et al., "Magnitude, precision, and realism of depth perception in stereoscopic vision", Cognitive Research: Principles and Implications, vol. 2, pp. 1-11 (2017).
Hirschmuller, H.,"Stereo Processing By Semiglobal Matching And Mutual Information", IEEE Transactions On Pattern Analysis And Machine Intelligence, pp. 1-14 (2008).
Huval, Brody et al., "An Empirical Evaluation of Deep Learning on Highway Driving", Apr. 17, 2015, 7 pages. Available at: https://arxiv.org/pdf/1504.01716.pdf.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

(56) References Cited

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Ioffe, S., and Szegedy, C., "Batch Normalization: Accelerating Deep Network Training by Reducing Internal Covariate Shift", arXiv:1502.03167v3 [cs.LG], pp. 1-12 (Mar. 2, 2015), Available at: https://arxiv.org/abs/1502.03167.
Jaderberg, M., et al., "Spatial Transformer Networks", NIPS, pp. 1-9 (2015).
Jayaraman, A. et al., "Creating 3D Virtual Driving Environments for Simulation-Aided Development of Autonomous Driving and Active Safety", SAE Technical Paper Series, vol. 1, pp. 1-6 (Mar. 28, 2017).
John, V., et al., "Real-time road surface and semantic lane estimation using deep features", Signal, Image and Video Processing, vol. 12, pp. 1133-1140 (Mar. 8, 2018).
Kendall, A., et al.,"End-to-end Learning of Geometry and Context for Deep Stereo Regression", pp. 66-75 (Mar. 13, 2017).
Kim, W.S., et al.,"Depth map coding with distortion estimation of rendered view", Proceedings Of SPIE, vol. 7543, Visual Information Processing and Communication, 75430B, pp. 1-11 (Jan. 17, 2010); doi: 10.1117/12.839030.
Kingma, D. P., and BA, J. L., "Adam: A Method for Stochastic Optimization", published as a conference paper at CLR 2015, arXiv:1412.6980v9 [cs.LG], pp. 1-15 (Jan. 30, 2017).
Kokkinos, I., "Pushing the Boundaries of Boundary Detection using Deep Learning", Retrieved from the Internet: URL:http://arxiv.org/pdf/1511.07386v2.pdf, pp. 1-12 (2016).
Kovesi, P., "Good Colour Maps: How to Design Them" arXiv:1509.03700, pp. 1-42 (Sep. 12, 2015).
Kunze, L., et al., "Reading between the Lanes: Road Layout Reconstruction from Partially Segmented Scenes", 2018 21st International Conference on Intelligent Transportation Systems (ITSC), pp. 401-408 (Nov. 4-7, 2018).
Kutulakos, K. N., and Seitz, S. M., "A Theory of Shape by Space Carving" International Journal of Computer Vision, vol. 38, No. 3, pp. 199-218 (2000).
Kuznietsov, Y., et al., "Semi-Supervised Deep Learning for Monocular Depth Map Prediction", Computer Vision and Pattern Recognition, pp. 6647-6655 (2017).
Laurentini, A., "How far 3D shapes can be understood from 2D silhouettes", IEEE Transactions on Pattern Analysis and Machine Intelligence, vol. 17, No. 2, pp. 188-195 (Feb. 1995).
Levi, D., et al., "Stixelnet: A Deep Convolutional Network For Obstacle Detection And Road Segmentation", 26th British Machine Vision Conference (BMVC), pp. 1-12 (2015).
Levin, C. A., and Haber, R. N., "Visual angle as a determinant of perceived interobject distance" Perception & Psychophysics vol. vol. 54, No. 2, pp. 250-259 (Mar. 1993).
Liang, Z., et al., "Learning for Disparity Estimation through Feature Constancy", Computer Vision and Pattern Recognition, pp. 2811-2820 (2018).
Liu, F., et al., "Learning Depth from Single Monocular Images Using Deep Convolutional Neural Fields", IEEE Transactions on Pattern Analysis and Machine Intelligence, pp. 1-16 (2015).
Liu, H. et al., "Neural Person Search Machines", IEEE International Conference On Computer Vision (ICCV), pp. 493-501 (2017).
Long, J., et al.,"Fully Convolutional Networks for Semantic Segmentation", IEEE Computer Vision Foundation, CVPR, pp. 3431-3440 (Nov. 2015).
Mayer, N., et al., "A Large Dataset to Train Convolutional Networks for Disparity, Optical Flow, and Scene Flow Estimation", IEEE Conference on Computer Vision and Pattern Recognition, pp. 1-14 (2016).
Mendes, C.C.T., et al.,"Exploiting Fully Convolutional Neural Networks For Fast Road Detection", Proceedings of IEEE, International Conference on Robotics and Automation (ICRA), pp. 1-6 (May 2016).
Mikić, I. et al., "Human Body Model Acquisition and Tracking Using Voxel Data", International Journal of Computer Vision, vol. 53, No. 3, pp. 199-223 (2003).
Mohan, R., "Deep Deconvolutional Networks For Scene Parsing", arXiv:1411.4101v1 [stat.ML], pp. 1-8 (Nov. 15, 2014).
Molchanov, P., "Pruning Convolutional Neural Networks for Resource Efficient Inference", Published as a conference paper at ICLR 2017, arXiv:1611.06440v2 [cs.LG], pp. 1-17 (Jun. 8, 2017).
Neven, D., et al.,"Towards End-to-End Lane Detection: an Instance Segmentation Approach", arXiv:1802.05591v1 [cs.CV], pp. 1-7 (Feb. 15, 2018) XP055590532, Retrieved from the Internet: URL:https://arxiv.org/pdf/1802.05591.pdf.
Oliveira, G. L., "Efficient Deep Models for Monocular Road Segmentation", IEEE/ RSJ International Conference on Intelligent Robots and Systems (IROS), pp. 1-7 (2016).
Park, J. J., et al., "DeepSDF: Learning Continuous Signed Distance Functions for Shape Representation", Proceedings of the IEEE/CVF Conference on Computer Vision and Pattern Recognition (CVPR), pp. 165-174 (2019).
Palmisano, S., et al., "Stereoscopic perception of real depths at large distances", Journal of Vision, vol. 10, No. 6, pp. 1-16 (Jun. 2010).
Pang, J., et al., "Cascade Residual Learning: A Two-Stage Convolutional Neural Network for Stereo Matching", IEEE International Conference on Computer Vision Workshops (ICCVW), pp. 887-895 (Oct. 22, 2017).
Rothe, R., et al., "Non-Maximum Suppression For Object Detection By Passing Messages Between Windows", In Asian Conference On Computer Vision, pp. 1-17 (2015).
Seki, A., and Pollefeys, M., "Patch Based Confidence Prediction for Dense Disparity Map", British Machine Vision Conference, pp. 1-13 (2016).
Seki, A., and Pollefeys, M., "SGM-Nets: Semi-Global Matching with Neural Networks", IEEE Conference on Computer Vision and Pattern Recognition, pp. 231-240 (2017).
Shaked, A., and Wolf, L., "Improved Stereo Matching With Constant Highway Networks and Reflective Confidence Learning", IEEE Conference on Computer Vision and Pattern Recognition, pp. 1-13 (2016).
Stein, G. P., et al.,"Vision-Based ACC With A Single Camera: Bounds On Range And Range Rate Accuracy", Proceedings Of IEEE Intelligent Vehicle Symposium, pp. 1-6 (2003).
Suorsa, R. E., et al.,"A Parallel Implementation of A Multisensor Feature-Based Range-Estimation Method", IEEE Transactions On Robotics And Automation, vol. 10, Issue 6, pp. 1-34 (1994).
Szegedy, C.,et al.,"Going Deeper with Convolutions", arXiv:1409.4842v1 [cs.CV], Available at: https://arxiv.org/abs/1409.4842, pp. 1-12 (Sep. 17, 2014).
Tao, A., et al.,"Detectnet: Deep Neural Network For Object Detection In Digits", accessed at : https://devblogs.nvidia.com/detectnet-deep-neural-network-object-detection-digits/, Accessed on Jul. 22, 2019 , pp. 1-9.
Tateno, K. et al.,"CNN-SLAM: Real-time dense monocular SLAM with learned depth prediction", pp. 6243-6252 (2017).
Teichmann, M., et al., "Multinet: Real-Time Joint Semantic Reasoning For Autonomous Driving", arXiv:1612,.07695v2 [cs.CV], pp. 1-10 (May 8, 2018).
Thrun, S., et al., "Probabilistic Robotics: Intelligent Robotics and Autonomous Agents," The MIT Dress, pp. 1-180 (2005).
Virgo, M., "Lane Detection with Deep Learning (Part 1)", Accessed on Feb. 22, 2019 at: https://towardsdatascience.com/lane-detection-with-deep-learning-part-1-9e096f3320b7, pp. 1-10 (May 9, 2017).
Wang, Z., "Image quality assessment: from error visibility to structural similarity", IEEE Transactions on Image Processing, vol. 13, No. 4, pp. 1-14, (Apr. 2004).
Weber, M., et al., "Deeptlr: A Single Deep Convolutional Network For Detection And Classification Of Traffic Lights", In IEEE Intelligent Vehicles Symposium (IV), pp. 1-7 (Jun. 2016).
Wu, J., et al., "Automatic background filtering and lane identification with roadside LiDAR data", 2017 IEEE 20th International Conference on Intelligent Transportation Systems (ITSC), pp. 1-6 (2017).
Nister, David; Non-Final Office Action for U.S. Appl. No. 17/008,074, filed Aug. 31, 2020, dated Sep. 14, 2022, 76 pgs.

(56) References Cited

OTHER PUBLICATIONS

Akbarzadeh, Amir; Non-Final Office Action for U.S. Appl. No. 17/008,100, filed Aug. 31, 2020, dated Nov. 8, 2022, 60 pgs.
Applicant-Initiated Interview Summary for U.S. Appl. No. 17/008,100, filed Aug. 31, 2020, dated Jan. 13, 2023, 8 pgs.
Notice of Allowance for U.S. Appl. No. 17/008,100, filed Aug. 1, 2020, dated Feb. 1, 2023, 15 pgs.
Final Office Action for U.S. Appl. No. 17/008,074, filed Aug. 31, 2020, dated Mar. 16, 2023, 21 pgs.

\* cited by examiner

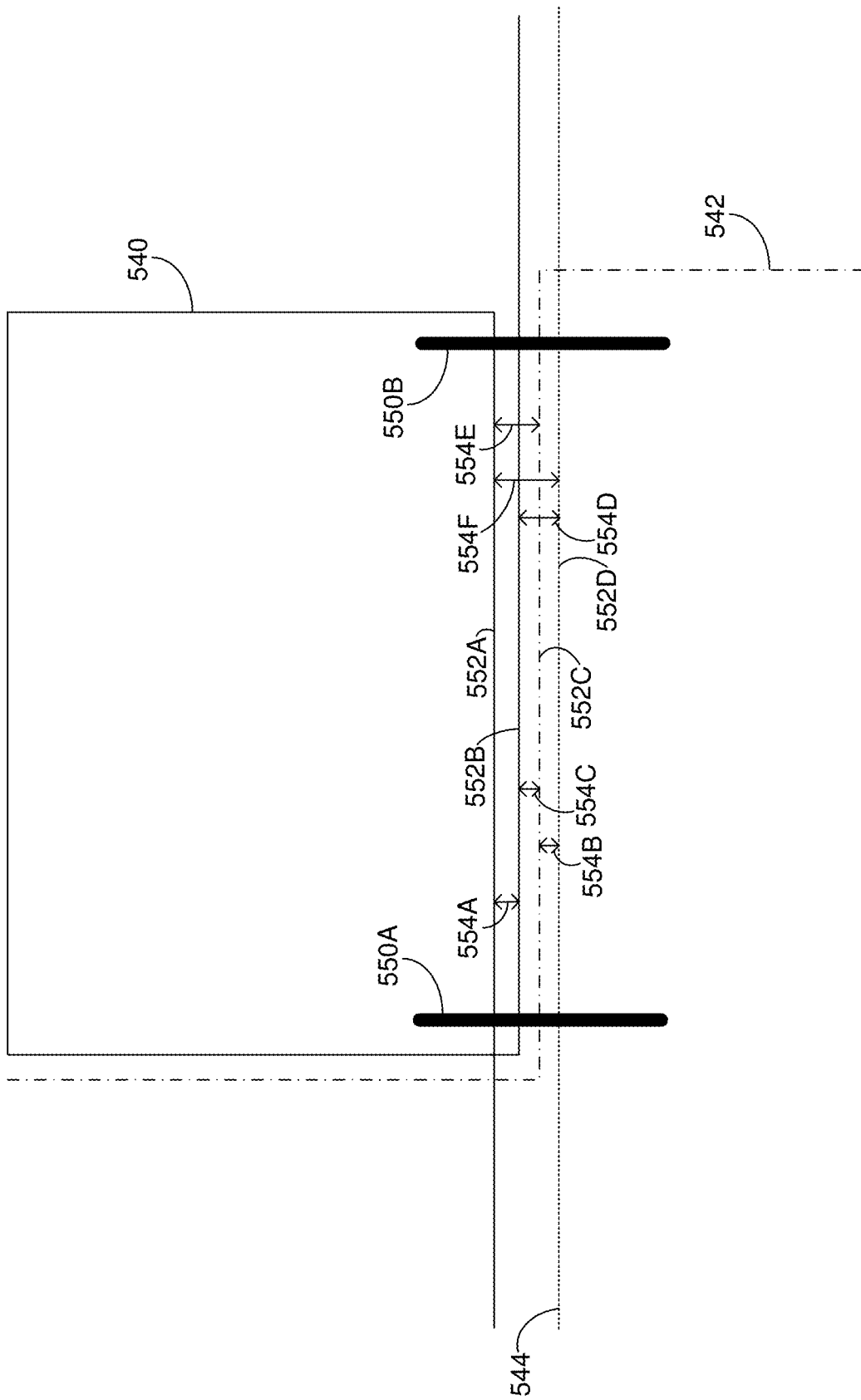

| NUMBER OF SEGMENTS | ALL CONNECTIONS | MINIMUM SPANNING TREE CONNECTIONS | SAFETY MARGIN CONNECTIONS |
|---|---|---|---|
| 2 | 1 | 1 | |
| 3 | 3 | 2 | 1 |
| 4 | 6 | 3 | 3 |
| 5 | 10 | 4 | 6 |
| 6 | 15 | 5 | 8 |
| 7 | 21 | 6 | 10 |
| 8 | 28 | 7 | 12 |
| 9 | 36 | 8 | 14 |
| 10 | 45 | 9 | 16 |
| 11 | 55 | 10 | 18 |
| 12 | 66 | 11 | 20 |
| 13 | 78 | 12 | 22 |
| 14 | 91 | 13 | 24 |
|  |  |  | 26 |

FIGURE 5D

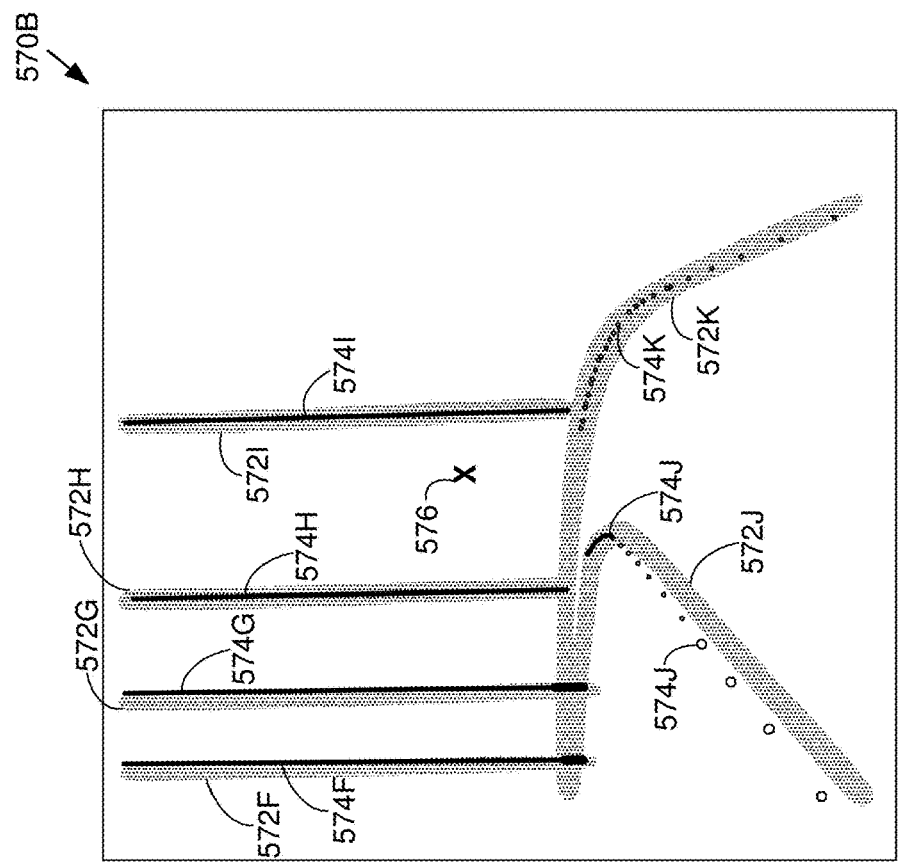
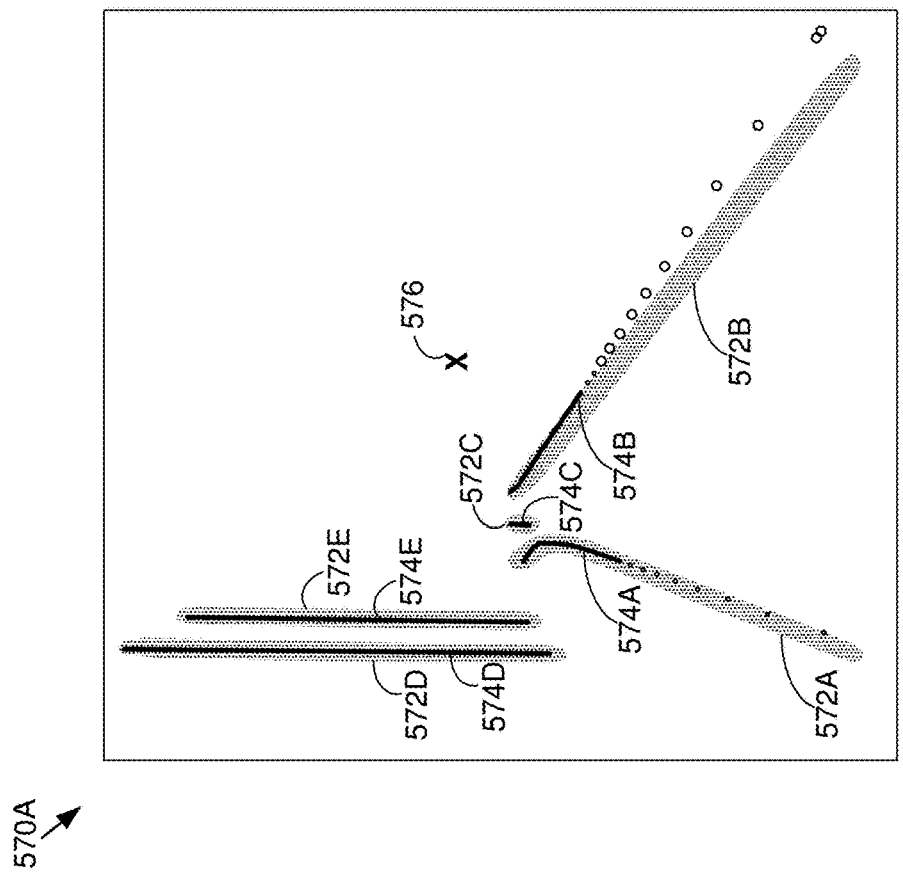
FIGURE 5F
FIGURE 5E

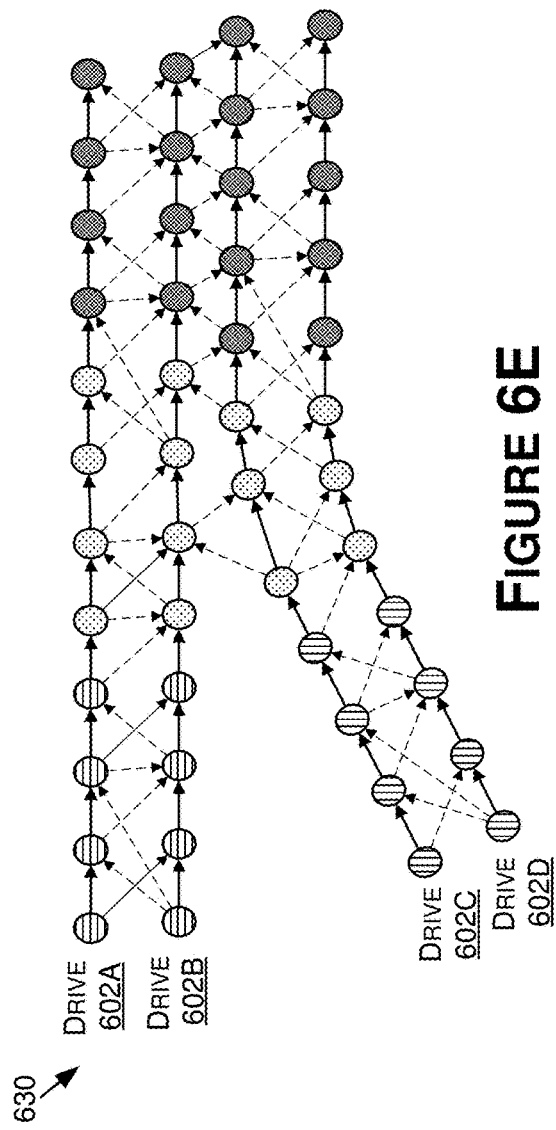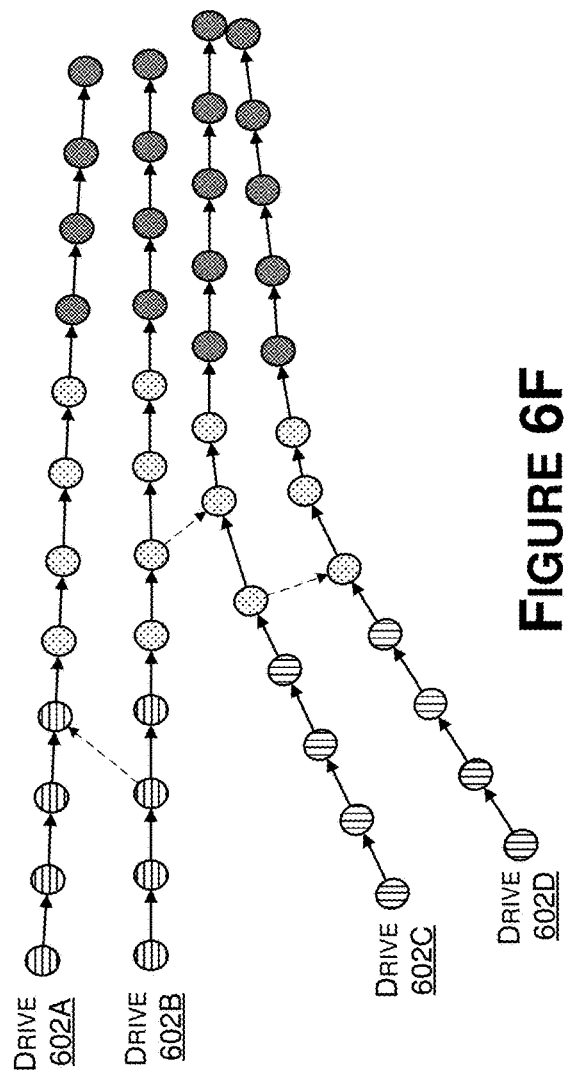

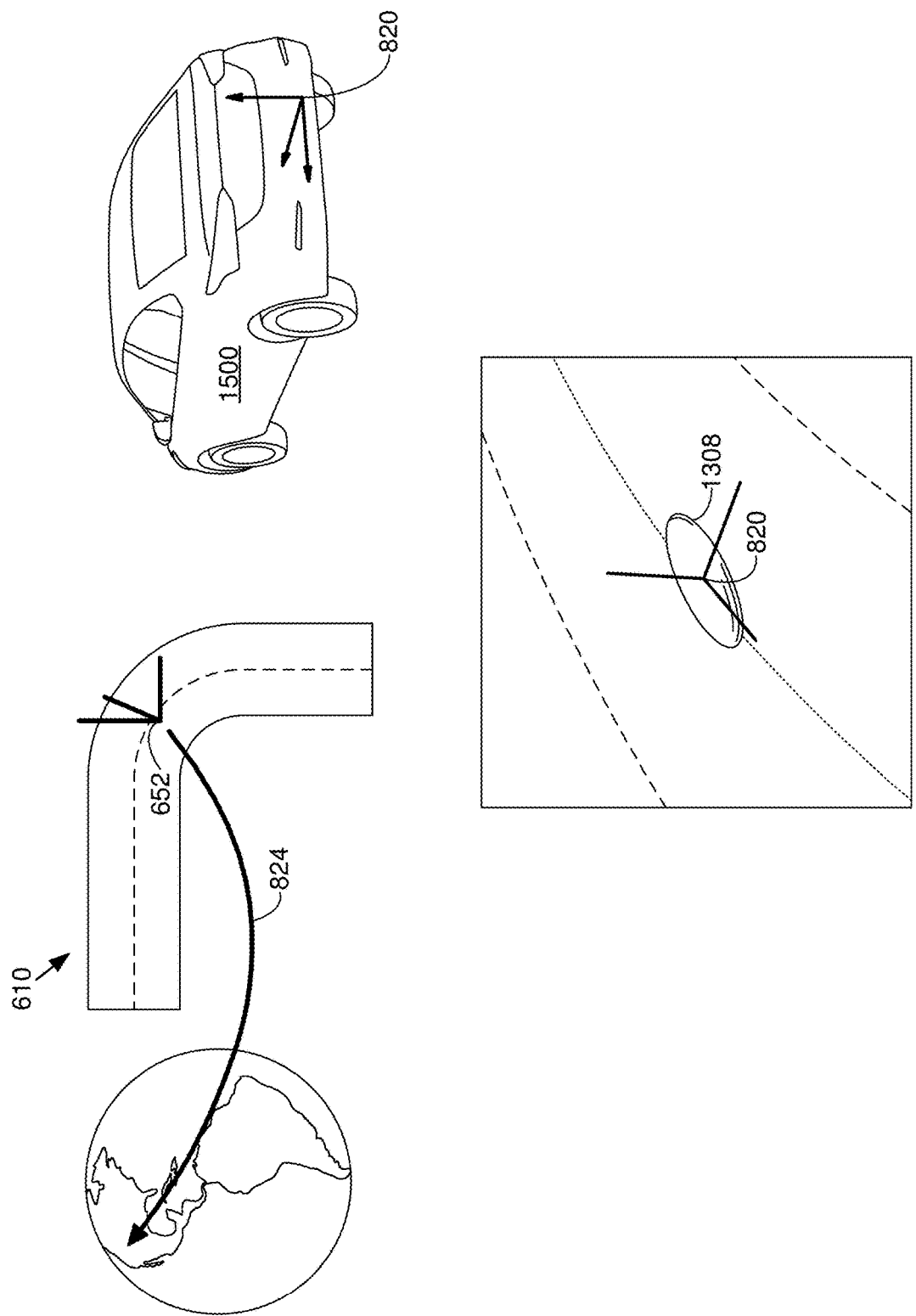

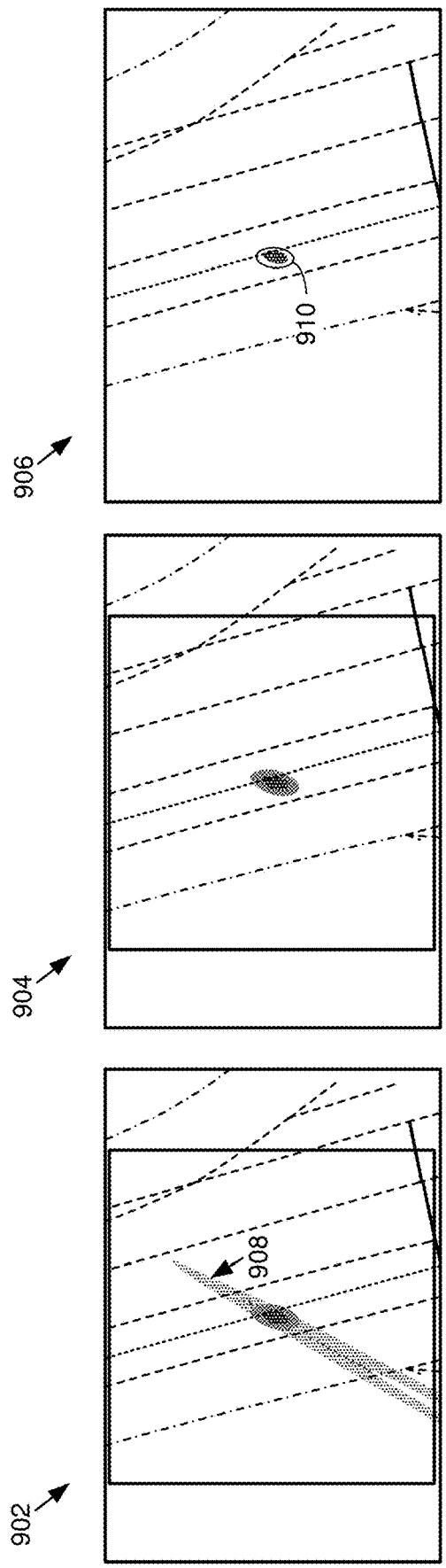

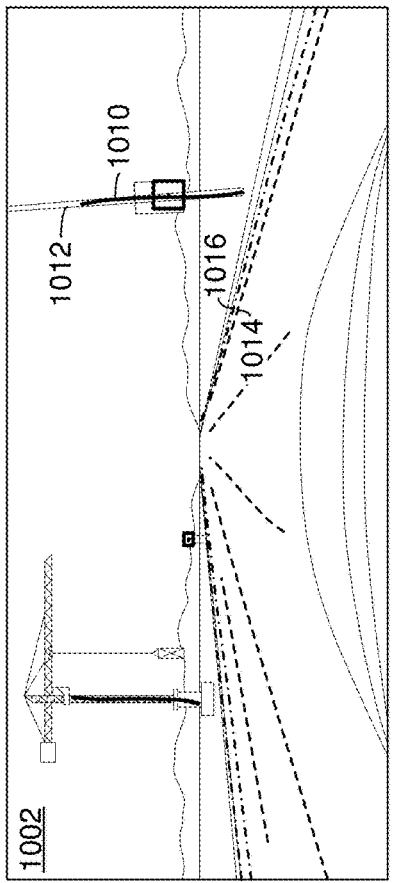
FIGURE 10A
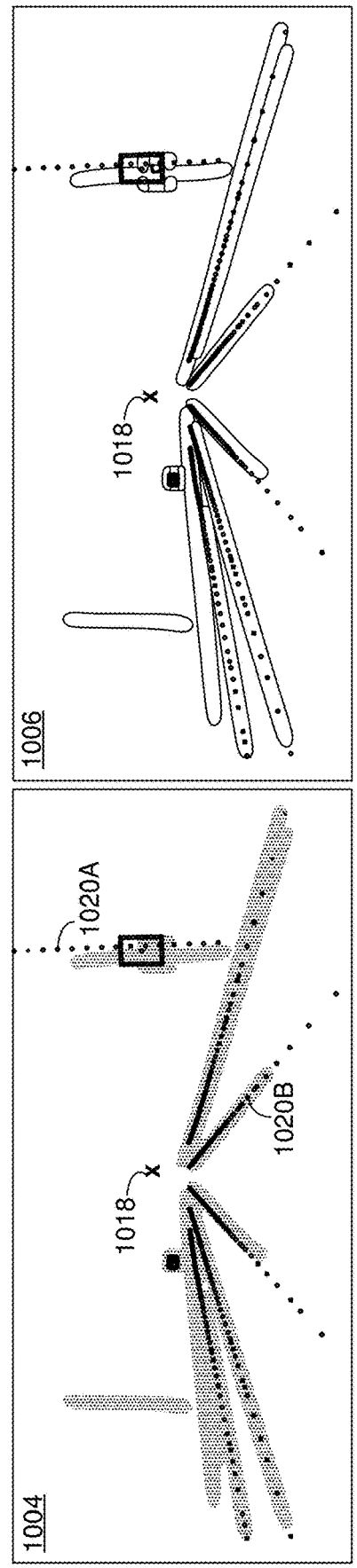
FIGURE 10B
FIGURE 10C

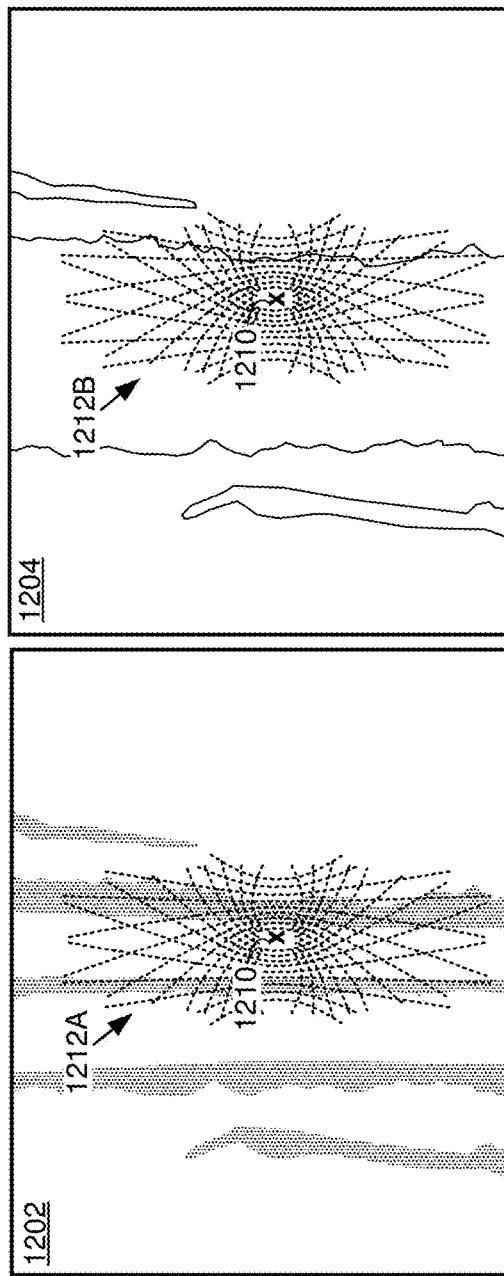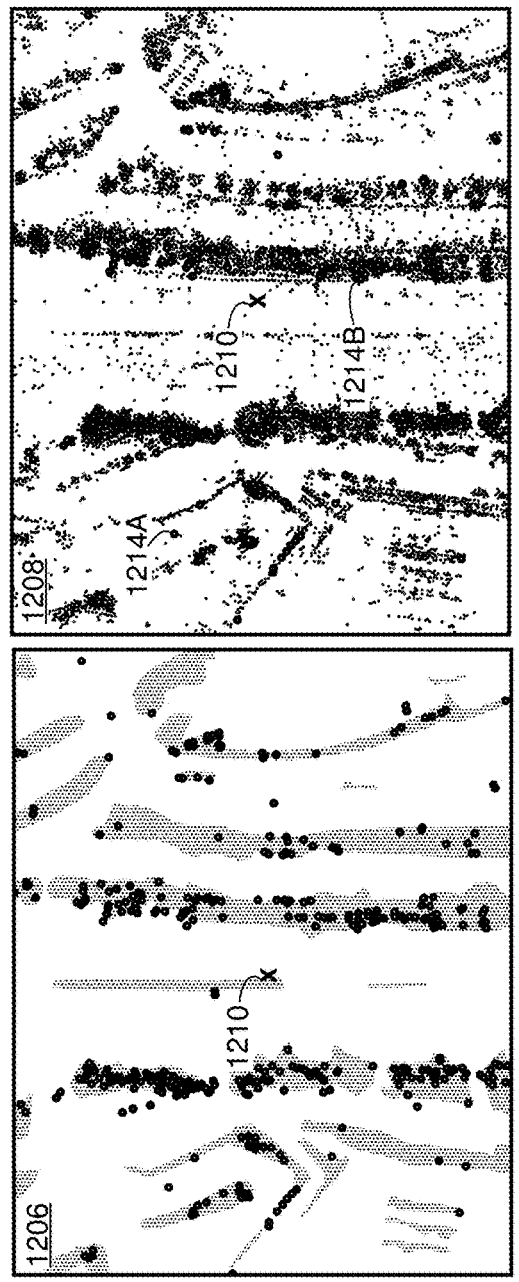

MAP CREATION AND LOCALIZATION FOR AUTONOMOUS DRIVING APPLICATIONS

CROSS-REFERENCE TO RELATED APPLICATIONS

This application claims the benefit of U.S. Provisional Application No. 62/893,814, filed on Aug. 31, 2019, which is hereby incorporated by reference in its entirety.

This application is related to U.S. Non-Provisional application Ser. No. 16/286,329, filed on Feb. 26, 2019, U.S. Non-Provisional application Ser. No. 16/355,328, filed on Mar. 15, 2019, U.S. Non-Provisional application Ser. No. 16/356,439, filed on Mar. 18, 2019, U.S. Non-Provisional application Ser. No. 16/385,921, filed on Apr. 16, 2019, U.S. Non-Provisional application Ser. No. 16/514,230, filed on Jul. 17, 2019, U.S. Non-Provisional application Ser. No. 535,440, filed on Aug. 8, 2019, U.S. Non-Provisional application Ser. No. 16/728,595, filed on Dec. 27, 2019, U.S. Non-Provisional application Ser. No. 16/728,598, filed on Dec. 27, 2019, U.S. Non-Provisional application Ser. No. 16/813,306, filed on Mar. 9, 2020, U.S. Non-Provisional application Ser. No. 16/814,351, filed on Mar. 10, 2020, U.S. Non-Provisional application Ser. No. 16/848,102, filed on Apr. 14, 2020, and U.S. Non-Provisional application Ser. No. 16/911,007, filed on Jun. 24, 2020, each of which is incorporated by reference herein in its entirety.

BACKGROUND

Mapping and localization are vital processes for autonomous driving functionality. High definition (HD) maps, sensor perception, or a combination thereof are often used to localize a vehicle with respect to an HD map in order to make planning and control decisions. Typically, conventional HD maps are generated using survey vehicles equipped with advanced, highly accurate sensors. However, these sensors are prohibitively expensive for implementing on consumer-grade vehicles. In a typical deployment, a survey vehicle is capable of generating HD maps suitable for localization after a single drive. Unfortunately, due to the scarcity of survey vehicles with such high cost sensors, the availability of HD maps for any particular area may be concentrated around metropolitans or hubs out of which the survey cars operate. For more remote areas, less-traveled areas, and areas that are greater distances from these hubs of activity, the data used to generate an HD map may have been collected from as few as a single drive—that is, if the data is available at all. As a result, where the single drive results in sensor data that is lower in quality or less suitable for this purpose—e.g., due to occlusions, dynamic objects, inclement weather effects, debris, construction artifacts, transitory hardware faults, and/or other issues that can compromise the quality of collected sensor data—an HD map generated from the sensor data may not be safe or reliable for use in localization.

To remedy these quality concerns, another survey vehicle may be required to perform another drive at locations where quality is compromised. However, the identification, deployment, sensor data generation, and map update process may take a long period of time due to systematic data collection and map creation processes, leaving the HD map unusable until an update is made. This problem is exacerbated where road conditions or layouts change frequently or dramatically over time—e.g., due to construction—as there may be no mechanism for identifying these changes and, even if identified, no way to generate updated data without deploying another survey vehicle.

In addition, because consumer vehicles may not be equipped with the same high quality, high cost sensors, localization to the HD maps—even when available—is not capable of being performed using many sensor modalities—e.g., cameras, LiDAR, RADAR, etc. —because the quality and type of data may not align with the data used to generate the HD map. As a result, localization relies solely on global navigation satellite system (GNSS) data which—even for the most expensive and accurate sensor models—still only achieves accuracy within a few meters and/or has variable accuracy under certain circumstances. A few meters of inaccuracy may place a vehicle in a different lane than the current lane of travel, or on a side of the road other than the one currently being traveled. As such, the use of conventional solutions for generating HD maps may result in inaccurate maps, which, when compounded by inaccurate localization thereto, present a significant obstacle to achieving highly autonomous vehicles (e.g., Level 3, 4, and 5) autonomous vehicles that are safe and reliable.

SUMMARY

Embodiments of the present disclosure relate to approaches for map creation and localization for autonomous driving applications. In particular, embodiments of the present disclosure include an end-to-end system for data generation, map creation using the generated data, and localization to the created map that can be used with universal, consumer-grade sensors in commercially available vehicles. For example, during the data generation process, data collection vehicles employing consumer quality sensors and/or consumer vehicles may be used to generate sensor data. The resulting data may correspond to mapstreams—that may include streams of sensor data, perception outputs from deep neural networks (DNNs), and/or relative trajectory (e.g., rotation and translation) data—corresponding to any number of drives by any number of vehicles. As such, in contrast to a systematic data collection effort of conventional systems, the current systems may crowdsource data generation using many vehicles and many drives. To reduce the bandwidth and memory requirements of the system, the data from the mapstreams may be minimized (e.g., by filtering out dynamic objects, executing LiDAR plane slicing or LiDAR point reduction, converting perception or camera based outputs to 3D location information, executing campaigns for particular data types only, etc.) and/or compressed (e.g., using delta compression techniques. As a result of the mapstream data being generated using consumer grade sensors, the sensor data—once converted into map form for localization—may be used directly for localization, rather than relying solely on GNSS data. Further, because the relative trajectory information corresponding to each drive is tracked, this information may be used to generate individual road segments (e.g., 25 meter, 50 meter, etc. sized road segments) that may be localized to, thereby allowing for localization accuracy within the centimeter range.

During map creation, the mapstreams may be used to generate map data—and ultimately a fused HD map—that represents data generated over a plurality of drives. In addition, as new mapstreams are generated, these additional drives may be merged, combined, or integrated with existing mapstream data and used to further increase the robustness of the HD map. For example, each of the mapstreams may be converted to a respective map, and any number of drive segments from any number of the maps (or corresponding mapstreams) may be used to generate a fused HD map representation of the particular drive segment. Pairs of the drive segments may be geometrically registered with respect to one another to determine pose links representing rotation and translation between poses (or frames) of the pairs of drives. Frame graphs representing the pose links may divided into road segments—e.g., the road segments that are used for relative localization—and the poses corresponding to each road segment may undergo optimization. The resulting, finalized poses within each segment may be used to fuse various sensor data and/or perception outputs for generating a final fused HD map. As a result, and because the map data corresponds to consumer quality sensors, the sensor data and/or perception results (e.g., landmark locations) from the HD map may be used directly for localization (e.g., by comparing current real-time sensor data and/or perception to corresponding map information), in addition to, in embodiments, using GNSS data.

For example, when localizing to the fused HD map, individual localization results may be generated based on comparisons of sensor data and/or perception outputs from a sensor modality to map data corresponding to the same sensor modality. For example, cost spaces may be sampled at each frame using the data corresponding to a sensor modality, aggregate cost spaces may be generated using a plurality of the individual cost spaces, and filtering (e.g., using a Kalman filter) may be used to finalize on a localization result for the particular sensor modality. This process may be repeated for any number of sensor modalities—e.g., LiDAR, RADAR, camera, etc. —and the results may be fused together to determine a final fused localization result for the current frame. The fused localization result may then be carried forward to a next frame, and used to determine the fused localization for the next frame, and so on. As a result of the HD map including individual road segments for localization, and each road segment having a corresponding global location, a global localization result may also be realized as the vehicle localizes to the local or relative coordinate system corresponding to the road segment.

BRIEF DESCRIPTION OF THE DRAWINGS

The present systems and methods for map creation and localization for autonomous driving applications are described in detail below with reference to the attached drawing figures, wherein:

FIG. 5C depicts an illustration of determining segments and pair-wise connections between the segments for registration, in accordance with some embodiments of the present disclosure;

FIG. 5D depicts a table illustrating numbers of pair-wise connections for registration for different numbers of sections using different approaches, in accordance with some embodiments of the present disclosure;

FIGS. 5E-5F depict example visualizations of registering two base layer map segments using a forward facing camera and a rearward facing camera, in accordance with some embodiments of the present disclosure;

FIGS. 6E-6G depict example pose graphs and corresponding optimization algorithms, in accordance with some embodiments of the present disclosure;

FIG. 8B depicts a relationship between a vehicle origin, a road segment origin, and a global origin for localization, in accordance with some embodiments of the present disclosure;

FIG. 9A depicts a sampled cost space corresponding to a frame generated during localization, in accordance with some embodiments of the present disclosure;

FIG. 9B depicts an aggregate cost space corresponding to sampled cost spaces of a plurality of frames generated during localization, in accordance with some embodiments of the present disclosure;

FIG. 9C depicts a filtered aggregate cost space generated during localization, in accordance with some embodiments of the present disclosure;

FIGS. 10A-10C depict example visualizations for sampling a pose of a sampled cost space for camera based localization, in accordance with some embodiments of the present disclosure;

FIGS. 12A-12D depict example visualizations for sampling a pose of a sampled cost space for LiDAR based localization, in accordance with some embodiments of the present disclosure;

DETAILED DESCRIPTION

Systems and methods are disclosed related to map creation and localization for autonomous driving applications. Although the present disclosure may be described with respect to an example autonomous vehicle 1500 (alternatively referred to herein as "vehicle 1500" or "ego-vehicle 1500," an example of which is described herein with respect to FIGS. 15A-15D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., mapping and localization for robotics), aerial systems (e.g., mapping and localization for a drone or other aerial vehicle), boating systems (e.g., mapping and localization for watercraft), simulation environments (e.g., for mapping and localization of virtual vehicles within a virtual simulation environment), and/or other technology areas, such as for data generation and curation, map creation, and/or localization.

Figure 1:
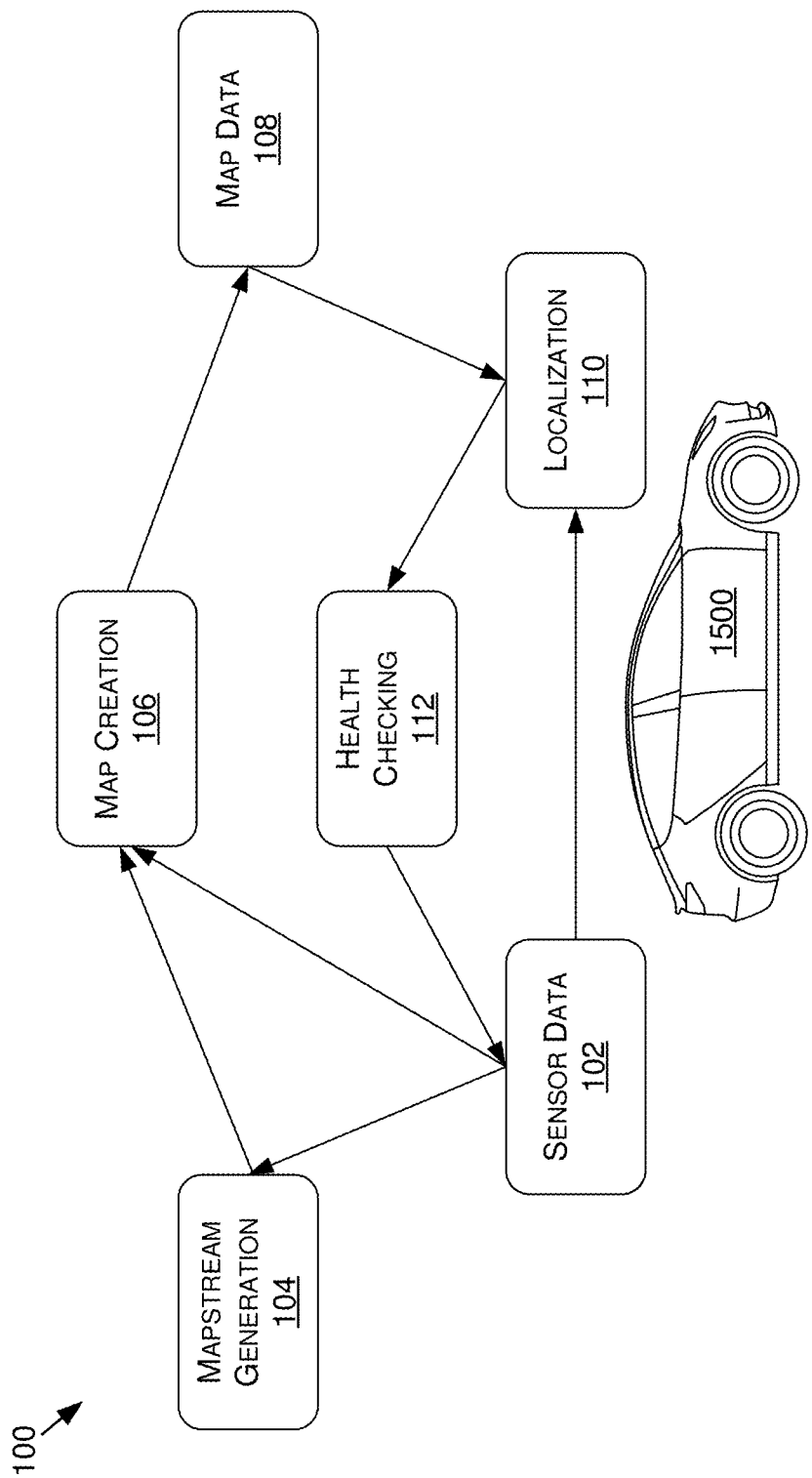
FIG. 1 depicts a data flow diagram for a process of map creation and localization system, in accordance with some embodiments of the present disclosure.

With reference to FIG. 1, FIG. 1 depicts a data flow diagram for a process 100 of a map creation and localization system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In some embodiments, vehicles 1500 may include similar components, features, and/or functionality of the vehicle 1500 described herein with respect to FIGS. 15A-15D. In addition, map creation 106 may be executed in a data center(s), in embodiments, and may be executed using similar components, features, and/or functionality as described herein with respect to example computing device 1600 and/or example data center 1700. In some embodiments, the entire end-to-end process 100 of FIG. 1 may be executed within a single vehicle 1500. Although only a single vehicle 1500 is illustrated in FIG. 1, this is not intended to be limiting. For example, any number of vehicles 1500 may be used to generate the sensor data 102 used for mapstream generation 104 and any number of (different) vehicles 1500 may be used to generate the sensor data 102 for localization 110. In addition, the vehicle make, model, year, and/or type, in addition to the sensor configurations and/or other vehicle attributes may be the same, similar, and/or different for each vehicle 1500 used in the mapstream generation 104, map creation 106, and/or localization 110 processes.

The process 100 may include operations for mapstream generation 104, map creation 106, and localization 110. For example, the process 100 may be executed as part of an end-to-end system that relies on mapstreams generated using sensor data 102 from any of a number of vehicles 1500 over any number of drives, map creation 106 using the received mapstream data from the vehicles 1500, and localization 110 to a map(s) (e.g., a high definition (HD) map) generated using the map creation 106 process. The maps represented by the map data 108 may include, in some non-limiting embodiments, maps generated for or by data collected from different sensor modalities or for individual sensors of an individual sensor modality. For example, the map data 108 may represent a first map (or map layer) corresponding to image-based localization, a second map (or map layer) corresponding to LiDAR-based localization, a third map (or map layer) corresponding to RADAR-based localization, and so on. In some embodiments, the image-based localization, for example, may be performed using a first map (or map layer) corresponding to a forward facing camera and a second map (which may or may not be corresponding to the same map layer) corresponding to a rear facing camera, and so on. As such, depending on the sensor configuration of the vehicle 1500 receiving the map data 108 and performing the localization 110 thereto, only the necessary portions of the map data 108 may be transmitted to the vehicle 1500. For a non-limiting example, where a first vehicle 1500 includes a camera(s) and a RADAR sensor(s), but not a LiDAR sensor(s), the camera map layer and the RADAR map layer may be transmitted to the vehicle 1500 and the LiDAR map layer may not. As a result, memory usage on the vehicle 1500 is reduced and bandwidth is preserved, as the LiDAR map layer may not be transmitted and/or stored on the vehicle 1500.

In addition, as vehicles 1500 navigate environments using map data 108 for localization 110, health checking 112 may be performed to ensure that the map(s) is up to date or accurate in view of changing road conditions, road structures, construction, and/or the like. As such, when a portion or segment of a map is determined to be below a desired quality—e.g., as a result of difficulty localizing to the map—mapstream generation 104 may be executed and used to update the map(s) corresponding to the particular portion of segment via map creation 106. As a result, the end-to-end system may be used to not only generate maps for localization 110, but also to ensure that the maps are kept up to date for accurate localization over time. The mapstream generation 104, map creation 106, and localization 116 processes are each described in more detail herein.

Mapstream Generation

To generate mapstreams, any number of vehicles 1500—e.g., consumer vehicles, data collection vehicles, a combination thereof—may be execute any number of drives. For example, each vehicle 1500 may drive through various road segments from locations around a town, city, state, country, continent, and/or the world, and may generate sensor data 102 using any number of sensors—e.g., LiDAR sensors 1564, RADAR sensors 1560, cameras 1568, 1570, 1572, 1574, 1598, etc., inertial measurement unit (IMU) sensors 1566, ultrasonic sensors 1562, microphones 1596, speed sensors 1544, steering sensors 1540, global navigation satellite system (GNSS) sensors 1558, etc. —during the drives. Each individual vehicle 1500 may generate the sensor data 102 may use the sensor data 102 for mapstream generation 104 corresponding to the particular drive of the vehicle 1500. The mapstreams generated to correspond to different drives from a single vehicle 1500 and the drives from any number of other vehicles 1500 may be used in map creation 106, as described in more detail herein.

As a result of a plurality of mapstreams being used to generate the map data 108 for any particular road segment, the individual mapstreams from each drive are not required to be as high-precision or high-fidelity as in conventional systems. For example, conventional systems use survey vehicles equipped with sensor types that are exorbitantly expensive and thus not desirable for installation in consumer vehicles (e.g., because the cost of the vehicles would increase drastically). However, the sensors on these survey vehicles may generate sensor data that may be reliable enough even after a single drive. The downside, however, is that where a particular drive included a lot of dynamic or transitory factors such as, without limitation, traffic, construction artifacts, debris, occlusions, inclement weather effects, transitory hardware faults, or other sources of sensor data quality concern, the single drive may not yield data that is suitable for generating an accurate map for localization. In addition, as road conditions change, and due to the low number of survey vehicles available, the maps may not be updated as quickly—e.g., the maps are not updated until another survey vehicle traverses the same route. In contrast, with systems of the present disclosure, by leveraging consumer vehicles with lower cost mass market sensors, any number of mapstreams from any number of drives may be used to generate the map data 108 more quickly and more frequently. As a result, individual mapstreams from drives where occlusions or other quality concerns were present may be relied on to a lesser extent, and the mapstreams from the higher quality sensor data may be relied on more heavily. In addition, as the road structure, layout, conditions, surroundings, and/or other information change, health checking 112 may be performed to update the map data 108 more quickly—e.g., in real-time or substantially real-time. The result of this process is a more crowdsourced approach to mapstream generation, rather than the systematic data collection effort of conventional approaches.

Figure 2:
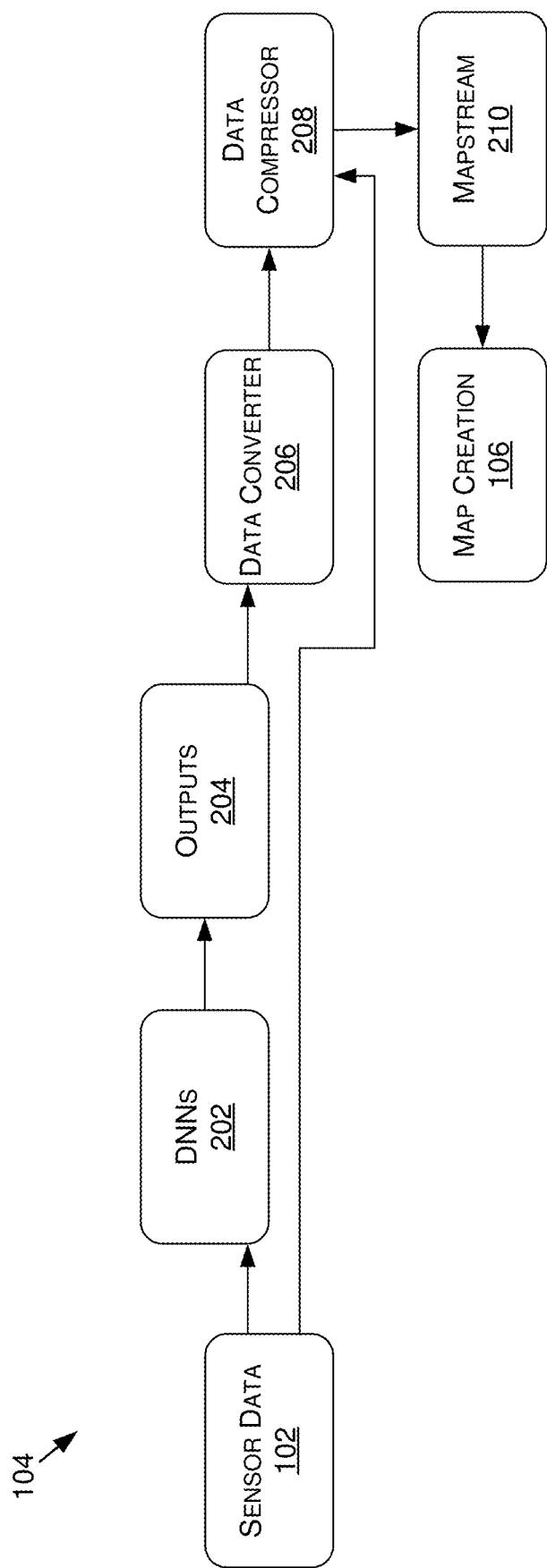
FIG. 2 depicts a data flow diagram for a process of mapstream generation, in accordance with some embodiments of the present disclosure.

With reference now to FIG. 2, FIG. 2 depicts a data flow diagram for a process 104 of mapstream generation, in accordance with some embodiments of the present disclosure. For example, the process 104 may correspond to generating a mapstream from a single drive by a vehicle 1500. This process 104 may be repeated by any number of vehicles 1500 over any number of drives. The sensor data 102, as described herein, may correspond to sensor data 102 from any number of different sensor modalities and/or of any number of sensors of a single modality. For example, the sensor data 102 may correspond to any of the sensor types described herein with respect to the vehicle 1500 of FIGS. 15A-15D—such as GNSS sensor(s) 1558 (e.g., Global Positioning System sensor(s)), RADAR sensor(s) 1560, ultrasonic sensor(s) 1562, LiDAR sensor(s) 1564, ultrasound sensors, IMU sensor(s) 1566 (e.g., accelerometer(s), gyroscope(s), magnetic compass(es), magnetometer(s), etc.), microphone(s) 1576, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1578, speed sensor(s) 1544 (e.g., for measuring the speed of the vehicle 1500), and/or other sensor types. In some embodiments, the sensor data 102 may be included in a mapstream 210 directly—e.g., with or without compression using data compressor 208. For example, for LiDAR data and/or RADAR data, the detections represented by the sensor data 102 may be in three-dimensional (3D) coordinate space (e.g., world space), and the LiDAR points and/or RADAR points (or detections) may be used directly to generate a LiDAR map layer and/or a RADAR map layer, respectively. In some embodiments, the sensor data 102 may be converted—e.g., using data converter 206—from two-dimensional (2D) coordinate space (e.g., image space) to 3D coordinate space, and then included in the mapstream 210 (e.g., after compression using the data compressor 208, in embodiments).

In some embodiments, LiDAR slicing may be executed on the LiDAR data—e.g., on a point cloud generated using the raw LiDAR data—to slice the LiDAR data into different height ranges. The LiDAR data may be sliced into any number of height ranges. In some embodiments, the LiDAR height ranges may be defined relative to the origin or rig of the vehicle 1500. As a non-limiting example, the LiDAR data may be sliced into an above ground slice (e.g., from 5 meters to 300 meters with respect to the origin of the vehicle 1500), a giraffe plane slice (e.g., from 2.5 meters to 5 meters with respect to the origin of the vehicle 1500), and/or a ground plane slice (e.g., from −2.5 meters to 0.5 meters with respect to the origin of the vehicle 1500). Where LiDAR slicing is executed, the different slices may be stored as separate LiDAR layers in the mapstream 210 and/or may be used to generate separate LiDAR map layers during map creation 106 for localization 110. In some embodiments, data corresponding to certain slices may be filtered out or removed such that less data is encoded to the mapstream 210 and less data is transmitted to the cloud for map creation 106. For example, the above ground slice may not be as valuable as the giraffe plane slice or the ground plane slice because the detections far from the ground plane may not be as usable, accurate, and/or sufficiently precise for localization. In such an example, the above ground slice (e.g., from 5 meters to 300 meters) may be filtered out.

The sensor data 102 may include data—e.g., generated by an IMU sensor(s) 1566, a GNSS sensors 1558, a speed sensor(s) 1544, camera sensors, LiDAR sensors 1564, and/or other sensor types—that may be used to track an absolute position of the vehicle 1500 and/or a local or relative position of the vehicle 1500. For example, at each frame of generated sensor data 102 from any number of sensor modalities, a global position—e.g., using the GNSS sensors 1558—may be recorded for that frame of sensor data 102. This global position—e.g., in a WGS84 reference system—may be used to generally place the vehicle 1500 within a global coordinate system. However, when using an HD map for autonomous driving operations, localization accuracy on a global scale is not as valuable as localization accuracy on a given road segment. For example, when driving on highway 101 in Santa Clara, Calif., the location of the vehicle 1500 with respect to interstate 95 in Boston, Mass. is not as crucial as the location of the vehicle with respect to 50 meters, 100 meters, 1 mile, etc. ahead on highway 101. In addition, GNSS sensors—even of the highest quality—may not be accurate within more than five or ten meters, so global localization may be less accurate and/or may be of variable accuracy subject to the relative positioning of satellites. This may still be the case—e.g., the global localization may be off by five or ten meters—but the relative localization to the current road segment may be accurate to within five or ten centimeters. When driving autonomously, to ensure safety, localization to a relative local layout or road segment thereof provides greater accuracy and precision than global-only approaches. As such, the system of the present disclosure—when performing localization, as described in more detail herein—may use the GNSS coordinates to determine which road segment(s) the vehicle 1500 is currently traveling on, and then may use a local or relative coordinate system for the determined road segment(s) to more precisely localize the vehicle 1500 (e.g., without requiring high cost GNSS sensor types impractical for consumer vehicle implementation, in embodiments). As such, once the vehicle 1500 is localized to a given road segment, the GNSS coordinates may not be required for accurate and precise localization as the vehicle 1500 may localize itself from road segment to road segment as the vehicle 1500 travels. In some non-limiting embodiments, as described herein, each road segment may be 25 meters, 50 meters, 80 meters, 100 meters, and/or another distance.

To generate data for the mapstream 210 that may be used to generate an HD map for accurate and precise local or relative localization, the sensor data 102 IMU sensor(s) 1566, a GNSS sensor(s) 1558, a speed sensor(s) 1544, wheel sensor(s) (e.g., counting wheel ticks of vehicle 1500), perception sensor(s) (e.g., camera, LiDAR, RADAR, etc.), and/or other sensor types may be used to track movement (e.g., rotation and translation) of the vehicle 1500 at each frame or time step. The trajectory or ego-motion of the vehicle 1500 may be used to generate a trajectory layer of the mapstream 210. For a non-limiting example, the movement of the perception sensor(s) may be tracked to determine a corresponding movement of the vehicle 1500—e.g., referred to as a visual odometer. The IMU sensor(s) 1566 may be used to track the rotation or pose of the vehicle 1500, and the speed sensor(s) 1544 and/or wheel sensor(s) may be used to track distance travelled by the vehicle 1500. As such, at a first frame, a first pose (e.g., angles along x, y, and z axes) and a first location (e.g., (x, y, z)) of the rig or origin of the vehicle 1500 may be determined using the sensor data 102. At a second frame, a second pose and a second location (e.g., relative to the first location) of the rig or origin of the vehicle 1500 may be determined using the sensor data, and so on. As a result, a trajectory may be generated with points (corresponds to frames), where each point may encode information corresponding to a relative location of the vehicle 1500 with respect to a prior point. In addition, sensor data 102 and/or outputs 204 of the DNN(s) 202 captured at each of these points or frames may be associated with the points or frames. As such, when creating the HD map (e.g., the map data 108 of FIG. 1), the sensor data 102 and/or outputs 204 of the DNN(s) 202 may have a known location relative to the origin or rig of the vehicle 1500 and, because the origin or rig of the vehicle 1500 may have a corresponding location on a global coordinate system, the sensor data 102 and/or outputs 204 of the DNN(s) 202 may also have a location on the global coordinate system.

By using the relative motion of the vehicle 1500 from frame to frame, the accuracy may be maintained even when in a tunnel, in a city, and/or in another environment where a GNSS signal may be weak or lost. However, even using relative motion and adding vectors (e.g., representing translation and rotation between frames) for each frame or time step, the relative locations may drift after a period of time or a distance traveled. As a result, at a predefined interval, when drift is detected, and/or based on some other criteria, the relative motion may be reset or recalibrated. For example, there may be anchor points in a global coordinate system that may have known locations, and the anchor points may be used to recalibrate or reset the relative motion at a frame.

In some embodiments, the sensor data 102 is applied to one or more deep neural networks (DNNs) 202 that are trained to compute various different outputs 204. Prior to application or input to the DNN(s) 202, the sensor data 102 may undergo pre-processing, such as to convert, crop, upscale, downscale, zoom in, rotate, and/or otherwise modify the sensor data 102. For example, where the sensor data 102 corresponds to camera image data, the image data may be cropped, downscaled, upscaled, flipped, rotated, and/or otherwise adjusted to a suitable input format for the respective DNN(s) 202. In some embodiments, the sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). For example, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)).

Where the sensor data 102 corresponds to LiDAR data, for example, the raw LiDAR data may be accumulated, ego-motion compensated, and/or otherwise adjusted, and/or may be converted to another representation, such as a 3D point cloud representation (e.g., from a top down view, a sensor perspective view, etc.), a 2D projection image representation (e.g., LiDAR range image), and/or another representation. Similarly, for RADAR and/or other sensor modalities, the sensor data 102 may be converted to a suitable representation for input to a respective DNN(s) 202. In some embodiments, a DNN(s) 202 may process two or more different sensor data inputs—from any number of sensor modalities—to generate the outputs 204. As such, as used herein, the sensor data 102 may reference unprocessed sensor data, pre-processed sensor data, or a combination thereof.

Although examples are described herein with respect to using the DNNs(s) 202, this is not intended to be limiting. For example, and without limitation, the DNN(s) 202 may include any type of machine learning model or algorithm, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

As an example, the DNNs 202 may process the sensor data 102 to generate detections of lane markings, road boundaries, signs, poles, trees, static objects, vehicles and/or other dynamic objects, wait conditions, intersections, distances, depths, dimensions of objects, etc. For example, the detections may correspond to locations (e.g., in 2D image space, in 3D space, etc.), geometry, pose, semantic information, and/or other information about the detection. As such, for lane lines, locations of the lane lines and/or types of the lane lines (e.g., dashed, solid, yellow, white, crosswalk, bike lane, etc.) may be detected by a DNN(s) 202 processing the sensor data 102. With respect to signs, locations of signs or other wait condition information and/or types thereof (e.g., yield, stop, pedestrian crossing, traffic light, yield light, construction, speed limit, exits, etc.) may be detected using the DNN(s) 202. For detected vehicles, motorcyclists, and/or other dynamic actors or road users, the locations and/or types of the dynamic actors may be identified and/or tracked, and/or may be used to determine wait conditions in a scene (e.g., where a vehicle behaves a certain way with respect to an intersection, such as by coming to a stop, the intersection or wait conditions corresponding thereto may be detected as an intersection with a stop sign or a traffic light).

The outputs 204 of the DNN(s) 202 may undergo post-processing, in embodiments, such as by converting raw outputs to useful outputs—e.g., where a raw output corresponds to a confidences for each point (e.g., in LiDAR, RADAR, etc.) or pixel (e.g., for camera images) that the point or pixel corresponds to a particular object type, post-processing may be executed to determine each of the points or pixels that correspond to a single instance of the object type. This post-processing may include temporal filtering, weighting, outlier removal (e.g., removing pixels or points determined to be outliers), upscaling (e.g., the outputs may be predicted at a lower resolution than an input sensor data instance, and the output may be upscaled back to the input resolution), downscaling, curve fitting, and/or other post-processing techniques. The outputs 204—after post-processing, in embodiments—may be in either a 2D coordinate space (e.g., image space, LiDAR range image space, etc.) and/or may be in a 3D coordinate system. In embodiments where the outputs are in 2D coordinate space and/or in 3D coordinate space other than 3D world space, the data converter 206 may convert the outputs 204 to 3D world space.

In some non-limiting examples, the DNN(s) 202 and/or the outputs 204 may be similar to those described in U.S. Non-Provisional application Ser. No. 16/286,329, filed on Feb. 26, 2019, U.S. Non-Provisional application Ser. No. 16/355,328, filed on Mar. 15, 2019, U.S. Non-Provisional application Ser. No. 16/356,439, filed on Mar. 18, 2019, U.S. Non-Provisional application Ser. No. 16/385,921, filed on Apr. 16, 2019, U.S. Non-Provisional application Ser. No. 535,440, filed on Aug. 8, 2019, U.S. Non-Provisional application Ser. No. 16/728,595, filed on Dec. 27, 2019, U.S. Non-Provisional application Ser. No. 16/728,598, filed on Dec. 27, 2019, U.S. Non-Provisional application Ser. No. 16/813,306, filed on Mar. 9, 2020, U.S. Non-Provisional application Ser. No. 16/848,102, filed on Apr. 14, 2020, U.S. Non-Provisional application Ser. No. 16/814,351, filed on Mar. 10, 2020, U.S. Non-Provisional application Ser. No. 16/911,007, filed on Jun. 24, 2020, and/or U.S. Non-Provisional application Ser. No. 16/514,230, filed on Jul. 17, 2019, each of which is incorporated by reference herein in its entirety.

The data converter 206 may, in embodiments, convert all of the outputs 204 and/or the sensor data 102 to a 3D world space coordinate system with a rig of the vehicle 1500 as the origin (e.g., (0, 0, 0)). The origin of the vehicle 1500 may be a front or rear most point on the vehicle 1500, along an axle of the vehicle 1500, and/or at any location of the vehicle or relative to the vehicle 1500. In some non-limiting embodiments, the origin may correspond to a center of a rear axle of the vehicle 1500. For example, at a given frame or time step, the sensor data 102 may be generated. As a non-limiting example, a first subset of the sensor data 102 may be generated in 3D world space relative to the origin, and may be used directly—e.g., after compression by the data compressor 208—to generate the mapstream 210. A second subset of the sensor data 102 may be generated in 3D world space but not relative to the origin of the vehicle 1500. As such, the data converter 206 may convert the sensor data 102—e.g., using intrinsic and/or extrinsic parameters of the respective sensor(s)—such that the 3D world space locations of the sensor data 102 are relative to the origin of the vehicle 1500. A third subset of the sensor data 102 may be generated in 2D space. The data converter 206 may convert this sensor data 102—e.g., using the intrinsic and/or extrinsic parameters of the respective sensor(s)—such that the 2D space locations of the sensor data 102 are in 3D space and relative to the origin of the vehicle 1500.

In embodiments where DNN(s) 202 are implemented, the outputs 204—e.g., before or after post-processing—may be generated in 2D space and/or 3D space (relative or not relative to the origin). Similar to the description herein with respect to converting the locations from the sensor data 102 directly to 3D world space with respect to the origin of the vehicle 1500, the 2D and/or 3D outputs 204 (that are not relative to the origin) may be converted by the data converter 206 to 3D space relative to the origin of the vehicle 1500. As such, and as described herein, because the origin of the vehicle 1500 has a known relative location with respect to a current section of a road or within a sequence of mapstream frames, and the current road section has a relative location in a global coordinate system (e.g., the WGS84 reference system), the locations of the sensor data 102 and/or outputs 204 from the DNN(s) 202 may also have a relative location with respect to the current road segment and the global coordinate system.

With respect to detected road boundaries and lane lines—e.g., detected using the DNN(s) 202 processing the sensor data 102—a landmark filter may be executed to stitch and/or smooth the detected road boundary lines and/or lane lines. For example, the 3D locations of the lane lines and/or road boundaries may include gaps in detections, may include noise, and/or may otherwise not be as accurate, precise, or free from artifacts as optimal or desirable. As a result, landmark filtering may be executed to stitch together the detections within frames and/or across frames such that virtual continuous lane dividers and road boundary lines are generated. These continuous lane dividers and/or road boundary lines may be similar to a lane graph used to define a number of lanes, locations of lanes, and/or locations of road boundaries on a driving surface. In some embodiments, smoothing may be executed on the generated continuous lines to more accurately reflect known geometric information of lane lines and road boundaries. For example, where a detection of a lane line for a frame is skewed with respect to prior and/or subsequent detections, the skewed portion of the lane line may be smoothed to more accurately conform to known patterns of lane lines. As such, the encoded information in the mapstream 210 may correspond to these continuous lane lines and/or road boundaries in addition to, or alternatively from, encoding each detection into the mapstream 210.

In some embodiments, the sensor data 102 and the outputs 204 may be generated at all times and for each frame, and all of the data may be transmitted as the mapstream 210 to the map creation cloud or servers. However, in some embodiments, the sensor data 102 and/or the outputs 204 may not be generated at each frame, all the data may not be transmitted in the mapstream 210, or a combination thereof. For example, mapstream campaigns may be implemented that identify and direct what types and amount of data to collect, where to collect the data, how often to collect the data, and/or other information. The campaigns may allow for targeted or selective generation of data of certain types and/or at certain locations in order to fill in gaps, provide additional data to improve accuracy, update maps when road changes are detected (e.g., via health checking 112), and/or for other reasons. As an example, a mapstream campaign may be executed that identifies a vehicle 1500 at a particular location, and instructs the vehicle 1500 to generate (or prioritize generation of) certain data types—e.g., LiDAR data and RADAR data starting at a location and over some distance—in order to reduce the compute (e.g., by the vehicle 1500 when generating the mapstream 210 and during map creation 106 when processing the mapstream data) and bandwidth (e.g., for transmitting the mapstream 210 to the cloud). In such an example, some number of drives through the particular section(s) of a road may have been met with lots of occlusion, or the vehicles 1500 that executed the drives were not equipped with certain sensor modalities. As such, the mapstream campaign may instruct a vehicle 1500 to collect data corresponding to the previously occluded data and/or to generate data of the missing modalities. As another example, the mapstream campaign may be generated to more accurately identify lane markings, signs, traffic lights, and/or other information, and the instruction to the vehicle 1500 may be to generate the sensor data 102 and/or the outputs 204 that may be used for generating or updating the HD map with this information. As such, the DNN(s) 202 that compute information about lane markings, signs, traffic lights, etc. may execute using respective sensor data types, and the outputs 204—e.g., after post-processing, data conversion, compression, etc. —may be transmitted to the cloud for map creation via the mapstream 210.

In some embodiments, the mapstream campaigns may be part of map health checking 112—e.g., after the HD map is generated and being used for localization. For example, where a disagreement is detected between current sensor data or DNN detections with the HD map represented by the map data 108, a health checker may trigger the vehicle(s) 1500 to generate and/or upload new mapstream data for that location. For example, in some embodiments, the vehicle 1500 may be generating data for the mapstream 210 and not uploading the mapstream 210, while in other embodiments, the vehicle 1500 may only generate and upload the mapstream data when triggered. As such, where the localization to the map results in poor planning and/or control operations, the mapstream 210 may be uploaded to the cloud to update the map information through the map creation process. As a result, the map may not be constantly updated, but only updated when localization errors, planning errors, and/or control errors are detected.

In some examples, the system may minimize how often a trajectory point or frame is generated and/or included in the mapstream 210. For example, instead of including every frame in the mapstream 210, a distance threshold, a time threshold, or a combination thereof may be used to determine which frames to include in the mapstream 210. As such, if a certain distance (e.g., half a meter, one meter, two meters, five meters, ten meters, etc.) has been travelled by the vehicle 1500 and/or a certain amount of time has elapsed (e.g., half a second, a second, two seconds, etc.), a trajectory point or frame may be included in the mapstream. This distance or time thresholds may be used based on which is met first, or which is met last. For example, a first frame may be included in the mapstream 210, then a distance threshold may be met and a second frame at the distance threshold may be included in the mapstream 210. Once the second frame is included, the distance and time thresholds may be reset, and then a time threshold may be met and a third frame may be included in the mapstream 210, and so on. As a result, less duplicative data may be included in the mapstream 210.

For example, where the vehicle 1500 is at a traffic light for thirty seconds, the time threshold is one second, and the frame rate is 30 frames per second (fps), instead of including 900 (e.g., 30*30) frames in the mapstream 210, only 30 frames may be included in the mapstream 210. In some embodiments, once the vehicle 1500 is idle for a threshold amount of time—e.g., two seconds, four seconds, etc. —frame generation and/or frame inclusion in the mapstream 210 may be suspended (e.g., until movement is detected). As another non-limiting example, where a vehicle 1500 is traveling at a speed of one meter/second (or 2.24 miles per hour), the distance threshold is two meters, and the frame rate is 30 fps, instead of including 60 (e.g., 30*2) frames in the mapstream 210 during the two meter distance, only a single frame may be included in the mapstream 210. As a result, the amount of data to be transmitted from the vehicle 1500 to the cloud for map creation 106 is reduced, while not impacting the accuracy of the map creation process—e.g., because at least some of the data may be duplicative or only incrementally different and thus not necessary for accurate map creation.

In addition to, or alternatively from, sending less data (e.g., minimizing the amount of data) in the mapstreams 210, the data may be compressed, in embodiments—e.g., to reduce bandwidth and decrease run-time. In some embodiments, extrapolation and/or interpolation may be used to determine points or frames such that less points or frames (e.g., the rotation/translation information of the points or frames) need to be transmitted in the mapstream 210 and extrapolation and/or interpolation may be used to generate additional frames or points. For example, because the rotation and translation information may be data intensive—e.g., require lots of bits to fully encode the (x, y, z) location information and the x-axis, y-axis, and z-axis rotation information—the less points along the trajectory that need rotation and/or translation information encoded thereto the less data needs to be transmitted. As such, a history of the trajectory may be used to extrapolate future points in the trajectory. As another example, additional frames between frames may be generated using interpolation. As an example, where a trajectory corresponds to the vehicle 1500 driving straight at a substantially constant speed, then a first frame and a last frame of a sequence may be included in the mapstream 210 and the frames in between may be interpolated from the first and last frame of the sequence of frames. Where velocity changes, however, more frames may need to be encoded in the mapstream 210 in order to more accurately linearly interpolate where the vehicle 1500 was at particular points in time. In such an example, the system may still not use all of the frames, but may use more frames than in a straight driving constant speed example. In some embodiments, cubic interpolation or cubic polynomial interpolation may be used to encode derivatives which can be used to determine a rate of change of velocity, and thus used to determine—or interpolate—other points along the trajectory without having to directly encode them into the mapstream 210. As such, instead of encoding rotation, translation, location, and/or pose at each frame, the encoded interpolation and/or extrapolation information may be used instead to recreate the additional frames. In some embodiments, a frequency of trajectory data generation may be updated adaptively to achieve a maximum error in the accuracy of a pose used in map creation 106 that is interpolated in between two other frames or time steps, compared to the correct pose known at the time of the data reduction.

As another example, delta compression may be used to encode a difference—or delta—between a current position of the vehicle 1500 (e.g., pose and location) and a prior position of the vehicle 1500. For example, 64 bits may be used to encode each of a latitude, a longitude, and an altitude—or x, y, and z coordinates—of the vehicle 1500 at a frame for a total of 192 bits. However, as the vehicle 1500 moves, these values may not change much from frame to frame. As a result, the encoded values for frames may instead correspond to differences from a prior frame—which may be encoded in fewer bits—rather than a full 64 bits being used for each of latitude, longitude, and altitude at each frame. For example, the differences may be encoded using 12 or less bits, in embodiments, thereby generating substantial memory and bandwidth savings for the system. The delta compression encoding may be used for relative coordinates of the local layout and/or global coordinates.

In addition to, or alternatively from, compressing the location, pose, rotation, and/or translation information, the sensor data 102 and/or outputs 204 may be compressed for inclusion in the mapstream 210. For example, for locations, poses, dimensions, and/or other information about lanes, lane markers, lane dividers, signs, traffic lights, wait conditions, static and/or dynamic objects, and/or other outputs 204, the data may be delta encoded, extrapolated, interpolated, and/or otherwise compressed in order to reduce the amount of data included in the mapstream 210. With respect to sensor data 102 such as LiDAR data, RADAR data, ultrasonic data, and/or the like, the points represented by the data may be voxelized such that duplicative points are removed and instead a volume is represented by the data. This may allow for a lower density of points to be encoded in the mapstream 210, while still including enough information for accurate and detailed map creation 106. RADAR data, for example, may be encoded using octrees. In addition, quantization of RADAR points and/or points from other sensor modalities may be executed to minimize the number of bits used to encode the RADAR information. For example, because RADAR points may have x and y positions, the geometry of lane dividers, signs, and/or other information may be used—in addition to the x and y positions—to encode the RADAR points using less bits.

In some embodiments, a buffer or other data structure may be used to encode the mapstream data as serialized structured data. As such, instead of having a single field of the data structure describing some amount of information, bit packing into byte arrays may be executed—e.g., such that the data in the buffer includes only numbers, not field names, to provide bandwidth and/or storage saving compared with systems that include the field names in the data). As a result, the schema may be defined that associated data types with field names, using integers to identify each field. For example, an interface description language may be used to describe the structure of the data, and a program may be used to generate source code from the interface description language for generating or parsing a stream of bytes that represents the structured data. As such, a compiler may receive a file and produce an application programming interface (API)—e.g., a cAPI, a pythonAPI, etc. —that instructs the system on how to consume information from a pin file encoded in this particular way. Additional compression may be realized by chunking data into smaller—e.g., 10,000 byte—chunks, converting the data to a byte array, and then transmitting or uploading to the cloud for map creation 106.

In some embodiments, dynamic obstacle removal may be executed with LiDAR data, RADAR data, and/or data from other sensor types to remove or filter out the sensor data 102 that corresponds to dynamic objects (e.g., vehicles, animals, pedestrians, etc.). For example, different frames of the sensor data 102 may be compared—e.g., after ego-motion compensation—to determine points that are not consistent across frames. In such an example, where a bird may fly across a sensory field of a LiDAR sensor for example, the points corresponding to the detected bird at one or more frames may not be present in one or more prior or subsequent frames. As such, these points corresponding to the detected bird may be filtered out or removed such that— during map creation 106—these points are not used during generation of a final LiDAR layer of the HD map.

As such, the sensor data 102 may be processed by the system to generate outputs corresponding to image data, LiDAR data, RADAR data, and/or trajectory data, and one or more of these outputs may undergo post-processing (e.g., perception outputs may undergo fusion to generate fused perception outputs, LiDAR data may undergo dynamic obstacle filtering to generate filtered LiDAR data, etc.). The resulting data may be aggregated, merged, edited (e.g., trajectory completion, interpolation, extrapolation, etc.), filtered (e.g., landmark filtering for creating continuous lane lines and/or road boundary lines), and/or otherwise processed to generate a mapstream 210 representing this data generated from any number of different sensors and/or sensor modalities.

Figure 3:
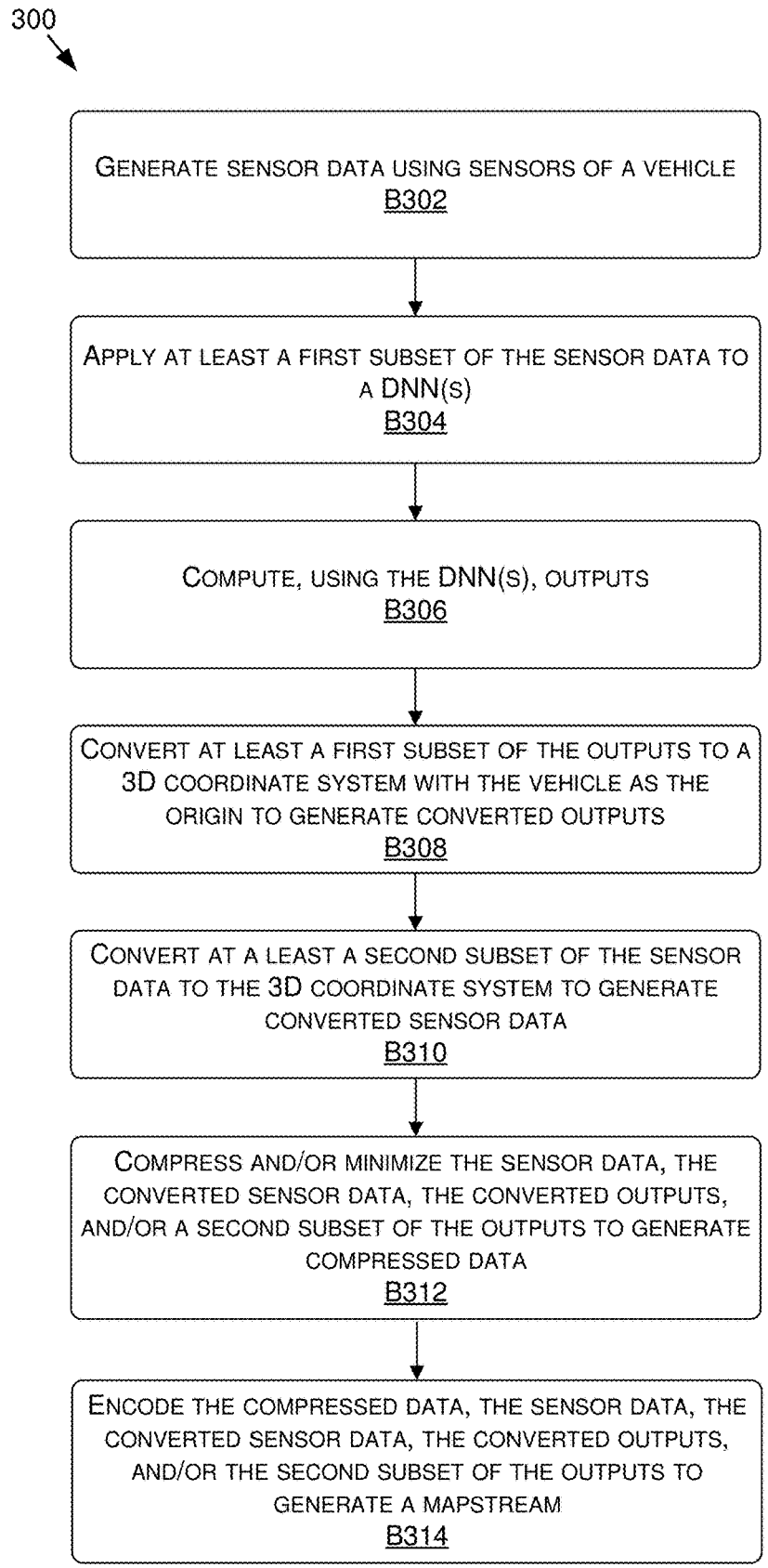
FIG. 3 is a flow diagram showing a method for mapstream generation, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, the method 300 is described, by way of example, with respect to the process 104 of FIG. 2. However, this method 300 may additionally or alternatively be executed within any one process by any one system, or any combination of processes and systems, including, but not limited to, those described herein.

FIG. 3 is a flow diagram showing a method 300 for mapstream generation, in accordance with some embodiments of the present disclosure. The method 300, at block B302, includes generating sensor data using sensors of the vehicle. For example, the sensor data 102 may be generated.

The method 300, at block B304, includes applying at a least a first subset of the sensor data to a DNN(s). For example, the sensor data 102 may be applied to the DNN(s) 202.

The method 300, at block B306, includes computing, using the DNN(s), outputs. For example, the DNN(s) 202 may compute the output(s) 204 and, in one or more embodiments, the outputs may include, without limitation, lane divider information, road boundary information, static object information, dynamic object information, wait condition information, intersection information, sign, pole, or traffic light information, and/or other information corresponding to objects—static and/or dynamic—in an environment of the vehicle 1500.

The method 300, at block B308, includes converting at least a first subset of the outputs to a 3D coordinate system with the vehicle as the origin to generate converted outputs. For example, the data converter 206 may convert the output(s) 204 to a 3D coordinate system with the vehicle 1500 origin as the origin.

The method 300, at block B310, includes converting at least a second subset of the sensor data to the 3D coordinate system to generate converted sensor data. For example, at least some of the sensor data 102 may be used directly in the mapstream 210, but may not have been generated in the 3D coordinate system relative to the origin of the vehicle 1500. As such, the sensor data 102 may be converted to the 3D coordinate space with the vehicle 1500 at the origin.

The method 300, at block B312, includes compressing and/or minimizing the sensor data, the converted sensor data, the converted outputs, and/or a second subset of the outputs to generate compressed data. For example, the sensor data 102 and/or the outputs (e.g., in either case without conversion or after conversion where not generated in a 3D coordinate space relative to the vehicle 1500) may be compressed and/or minimized. The compression and/or minimizing may be executed using any known techniques, including, but not limited to, those described herein.

The method 300, at block B314, includes encoding the compressed data, the sensor data, the converted sensor data, the converted outputs, and/or the second subset of the outputs to generate a mapstream. For example, the sensor data 102 (with or without conversion) and/or the outputs 204 (with or without conversion)—e.g., after compression by the data compressor 208—may be encoded to generate the mapstream 210. The mapstream 210 may then be transmitted to the cloud for map creation 106.

The process described with respect to FIG. 3 may be repeated for any number of drives—or segments thereof—for any number of vehicle(s) 1500. The information from each of the mapstreams 210 may then be used for map creation 106.

Map Creation

Figure 4:
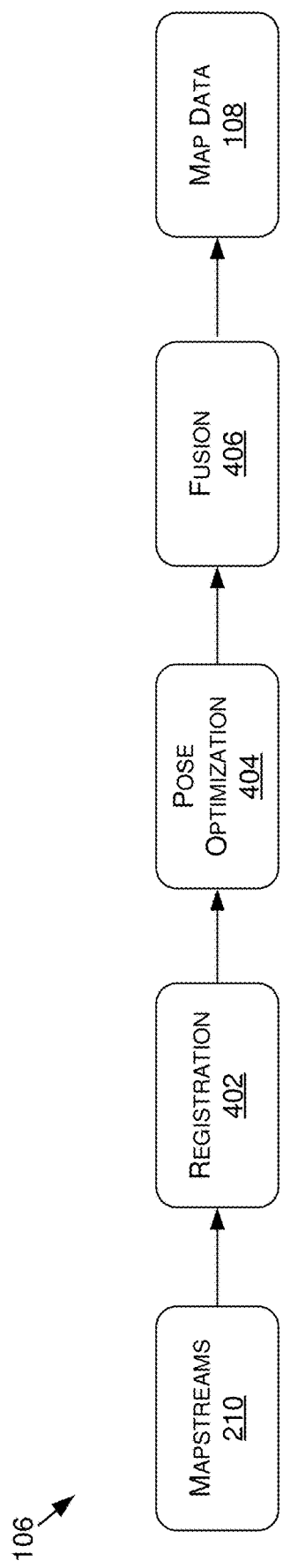
FIG. 4 depicts a data flow diagram for a process of map creation, in accordance with some embodiments of the present disclosure.

With reference to FIG. 4, FIG. 4 depicts a data flow diagram for a process 106 of map creation, in accordance with some embodiments of the present disclosure. The process 106, in some embodiments, may be executed in the cloud using computing devices (e.g., similar to example computing device 1600 of FIG. 16) of one or more data centers—such as example data center 1700 of FIG. 17. In some embodiments, the process 106 may be executed using one or more virtual machines, one or more discrete computing devices (e.g., servers), or a combination thereof. For example, virtual graphics processing units (GPUs), virtual central processing units (CPUs), and/or other virtual components may be used to execute the process 106. In some embodiments, one or more of the process steps described with respect to the process 106 may be executed in parallel using one or more parallel processing units. For example, registration 402—e.g., cost space sampling, aggregation, etc.—of pairs of segments may be executed in parallel (e.g., a first pair may be registered in parallel with another pair). In addition, within a single registration, a pose sampled for updating a cost for a point of the cost space may be executed in parallel with one or more other poses. In addition, because map data corresponding to layers of individual maps may be stored on GPUs as textures, a texture lookup may be executed to quickly determine cost values for cost spaces—thereby leading to reduced run-time for each cost space analysis.

The map creation process 106 may include receiving the mapstreams 210 from one or more vehicles 1500 corresponding to any number of drives. Each mapstream 210, as described herein, may include various layers of data generated using various different methods—such as by tracking ego-motion (e.g., relative and global), sensor data 102 generation and processing, perception using one or more DNNs 202, etc. Each layer of the mapstream 210 may correspond to a series of frames corresponding to sensor events recorded at variable frame rates. For example, the mapstream 210 layers may correspond to a camera layer(s), a LiDAR layer(s) (e.g., a layer for each different slice), a RADAR layer(s), a trajectory (or ego-motion) layer(s), and/or other layers. The camera layer may contain information obtained by executing perception—e.g., via the DNNs 202—on a stream of 2D camera images, and converting the (2D and/or 3D) detections or outputs 204 of the DNNs 202 into 3D landmarks and paths (e.g., by combining lane markings to define lane line and road boundary locations). The LiDAR and/or RADAR layers (or other sensor modality layers) may correspond to point cloud information collected using LiDAR sensors 1564 and/or RADAR sensors 1560, respectively. As described herein, during the mapstream generation process 104 pre-processing may be executed on the LiDAR data and/or the RADAR data, such as data reduction, ego-motion compensation, and/or dynamic obstacle removal. The trajectory layer may contain information corresponding to an absolute position of the origin or rig of the vehicle 1500 as well as relative ego-motion over a certain time frame.

Figure 5A:
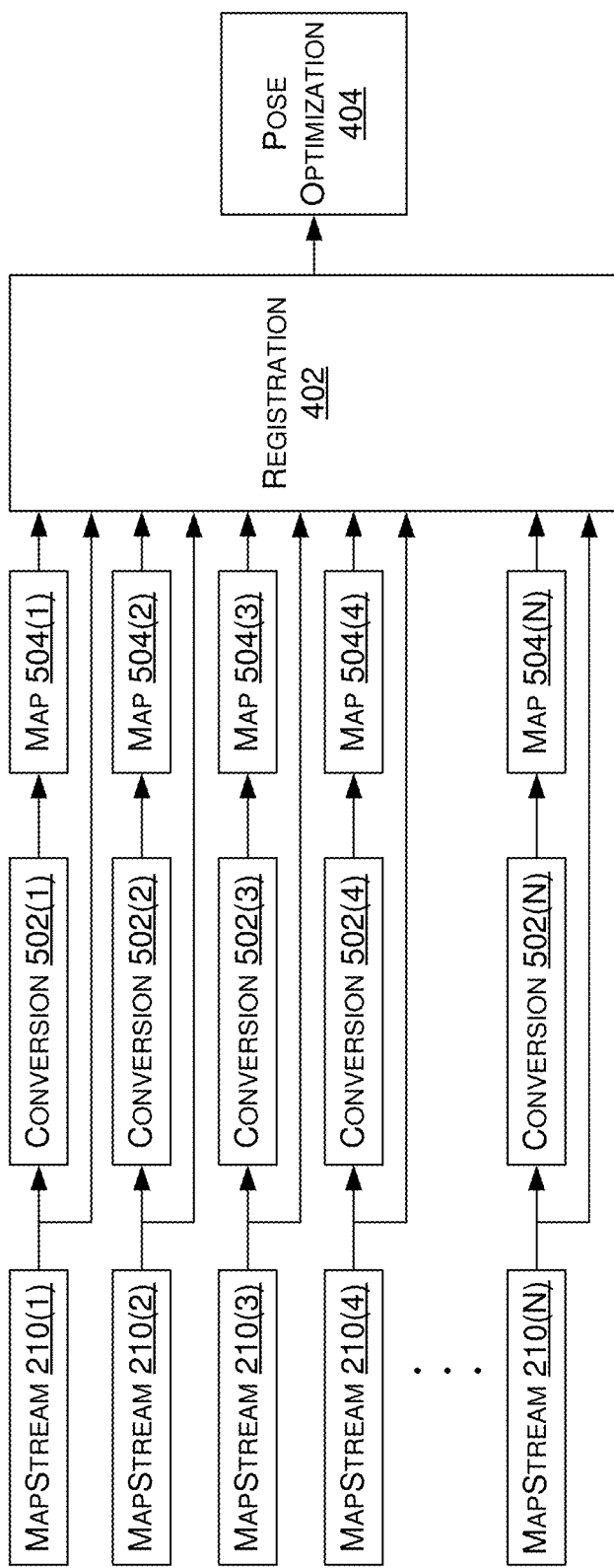
FIGS. 5A-5B depict a data flow diagrams for a process of converting mapstreams to maps for registration, in accordance with some embodiments of the present disclosure.
Figure 5B:
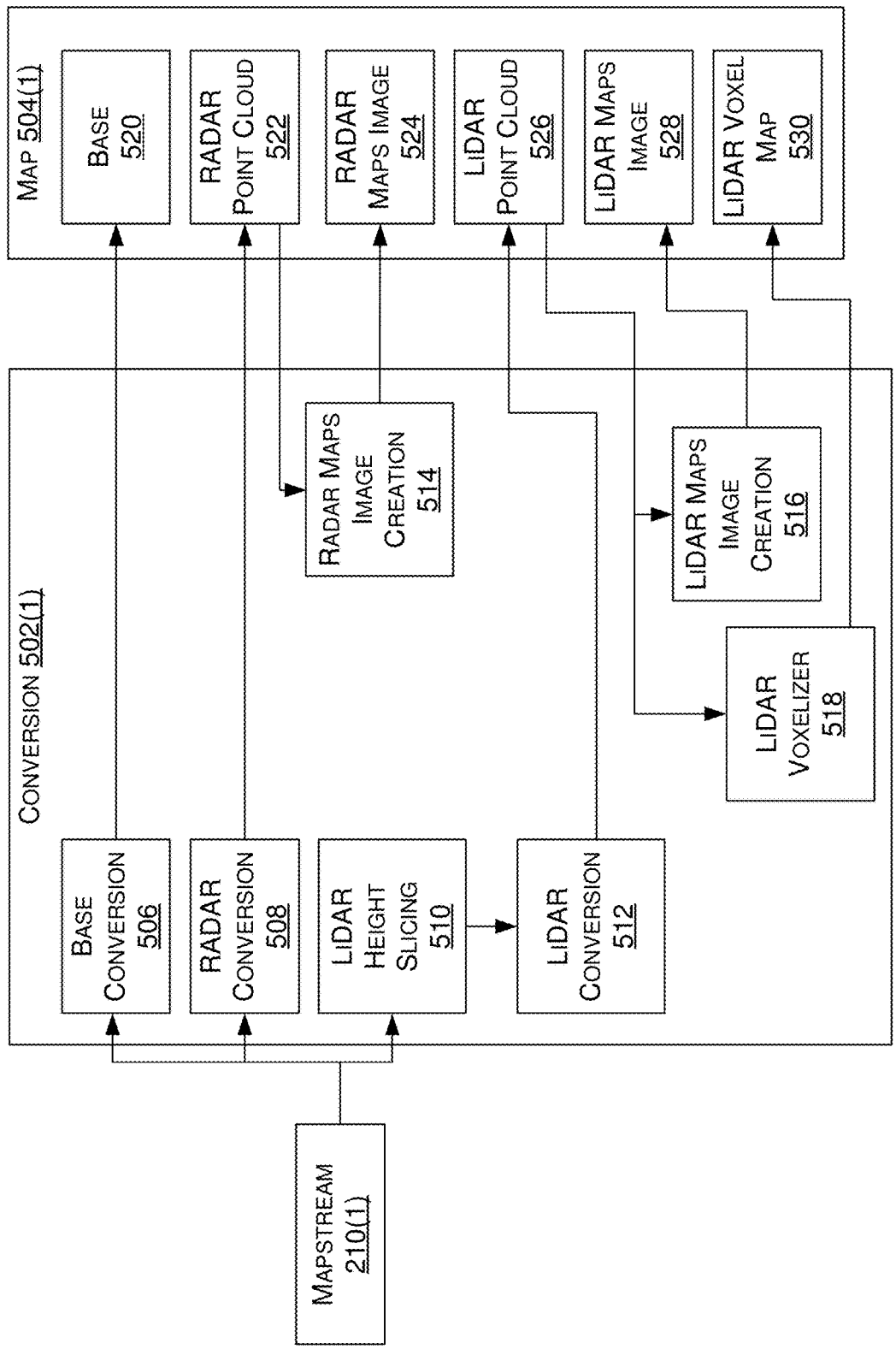

With reference to FIG. 5A, the map creation process 106 may include, for each mapstream 210(1)-210(N)—where N corresponds to the number of mapstreams 210 being used for a particular registration process-converting the mapstream 210 via conversion 502(1)-502(N), to a map 504(1)-504(N) (e.g., converting the mapstreams to DriveWorks maps format). For example, with reference to FIG. 5B, for a single mapstream 210(1), conversion 502(1) may include base conversion 506, RADAR conversion 508, LiDAR height slicing 510, LiDAR conversion 512, RADAR maps image creation 514, LiDAR maps image creation 516, and/or LiDAR voxelization using a LiDAR voxelizer 518. The base conversion 506 may correspond to the landmarks—e.g., lane lines, road boundary lines, signs, poles, trees, other vertical structures or objects, crosswalks, etc.—as determined using perception via the DNN(s) 202. For example, the 3D landmark locations may be converted— using base conversion 506—to a map format to generate base layer 520 (or "camera layer" or "perception layer") of the map 504(1). In addition to the landmark locations, the base layer 520 may further represent the trajectories or paths (e.g., global or relative) of the vehicle 1500 that generated the mapstream 210(1). When generating the base layer 520, a 1:1 mapping between the aggregated input frames of the mapstream 210(1) and the output base layer 520 map road segments may be maintained.

The RADAR data from the mapstream 210(1)—e.g., when received or accessed in a raw format—may be converted to a RADAR point cloud layer 522 via RADAR conversion 508. In some embodiments, the RADAR point cloud from the RADAR point cloud layer 522 may be used to generate a RADAR maps image layer 524 via RADAR maps image creation 514. For example, the RADAR point cloud may be converted to an image(s) of the RADAR point cloud from one or more different perspectives (e.g., top-down, sensor perspective, etc.). For example, a virtual camera with a top-down field of view may be used to project the RADAR point cloud into frames of the virtual camera to generate RADAR maps images for the RADAR maps image layer 524.

The LiDAR data from the mapstream 210(1)—e.g., when received or accessed in a raw format—may be converted to a LiDAR point cloud layer 526 via LiDAR conversion 512. In some embodiments, as described herein, the LiDAR data may be generated in slices (e.g., an above ground slice (e.g., from 5 meters to 300 meters with respect to the origin of the vehicle 1500), a giraffe plane slice (e.g., from 2.5 meters to 5 meters with respect to the origin of the vehicle 1500), a ground plane slice (e.g., from −2.5 meters to 0.5 meters with respect to the origin of the vehicle 1500), etc.). In addition to, or alternatively from, the LiDAR height slicing in the mapstream generation process 104, LiDAR height slicing 510 may be executed during conversion 502(1) to determine separate slices of the LiDAR data for use in generating one or more LiDAR point cloud layers 526. For example, the LiDAR data corresponding to a particular slice—e.g., the giraffe slice—may be used to generate the LiDAR point cloud layer 526 of the map 504(1). In some embodiments, the LiDAR point cloud from the LiDAR point cloud layer 526 may be used to generate a LiDAR maps image layer 528 via LiDAR maps image creation 516. For example, the LiDAR point cloud—e.g., corresponding to a particular slice—may be converted to an image(s) of the LiDAR point cloud from one or more different perspectives (e.g., top-down, sensor perspective, etc.). For example, a virtual camera with a top-down field of view may be used to project the LiDAR point cloud into frames of the virtual camera to generate LiDAR maps images for the LiDAR maps image layer 528. The LiDAR maps image layer 528 may include a LiDAR map image (e.g., a top-down depth map) encoded with elevation values determined from the point cloud, a LiDAR map image encoded with intensity values determined from the point cloud, and/or other LiDAR map image types. In some embodiments, the LiDAR point cloud layer 526 may be used—e.g., by the LiDAR voxelizer 518—to generate a LiDAR voxel map layer 530 of the map 504(1). The LiDAR voxel map layer 530 may represent a voxelized representation of the LiDAR point cloud. The voxel map layer 530 may be used for editing of the LiDAR data in the individual maps 504 and/or in the fused HD map (as described in more detail herein), such as to filter out dynamic objects.

With reference again to FIG. 5A, the processes described with respect to mapstream 210(1) may be executed for each mapstream 210(1)-210(N) to generate the maps 504(1)-504(N). The maps 504(1)-504(N), or a subset thereof, may then be used for registration 402. As such, once maps 504 have been generated for each mapstream 210 to be used in a current registration process, registration 402 may be executed to generate an aggregate map that corresponds to the multiple mapstreams 210. An aggregate map may include aggregated layers—e.g., aggregate camera or base layers, aggregate LiDAR layers, aggregate RADAR layers, etc. In order to determine which mapstreams 210 (and thus maps 504) should be registered together, locations of the mapstreams 210—or segments thereof—may be determined. For example, with reference to FIG. 5C, a first mapstream segment 540 (e.g., representing the trajectory of the vehicle 1500 that generated the mapstream 210(1)) may correspond to a first mapstream 210(1), a second mapstream segment 542 may correspond to a second mapstream 210(2), and a third mapstream segment 544 may correspond to a third mapstream 210(3). To determine that these mapstreams 210(1)-210(3) correspond to a similar location or road section, location or trajectory information may be used—e.g., GNSS data. For example, the GNSS coordinates from the mapstreams 210 and/or the maps 504 may be used to determine whether the mapstreams 210—or the sections thereof—are close enough in space for a long enough distance to be registered to one another. Once localized using the GNSS coordinates, the relative coordinates from the mapstreams 210(1)-210(3) may be used to determine how close the mapstream segments are (e.g., how close the trajectories of the vehicles 1500 are). This process may result in a final list of mapstream sections that are to be registered. For example, the mapstream segments 540, 542, and 544 may be determined to be on the same road—or to at least have portions that overlap between demarcations 550A and 550B—using the GNSS coordinates and/or the relative coordinates from the mapstreams 210 and/or the maps 504.

In some examples, an individual mapstream 210 or drive—e.g., the mapstream 210(1) corresponding to the mapstream segment 540—may include a loop. For example, during the mapstream generation process 104 the vehicle 1500 may have traversed a same road segment two or more different times. As a result, the mapstream segment 540 may be split—via de-duplication—into two separate segments 552A and 552B, and treated as separate mapstream segments for registration 402. The de-duplication process may be executed as a pre-processing step that identifies when a vehicle 1500—or a mapstream 210 corresponding thereto—was driving in circles or loops. Once a loop is identified, the drive or mapstream 210 may be split into two or more sections to make sure that each physical location is represented only once.

A layout of all of the mapstream segments may be generated that includes the mapstream segments determined to be within some spatial threshold to one another. For example, FIG. 5C may represent an example visualization of the layouts of the mapstream segments 540, 542, and 544. In the example of FIG. 5C, for registration 402, overlapping portions 552A-552D—e.g., between the demarcations 550A and 550B—may be used. The layout may then be used to determine which pairs of the overlapping portions 552A-552D to register together. In some embodiments, a minimum spanning tree algorithm may be used to determine a minimum number of portions 552 to be registered together to have a connection between each of the portions 552 (e.g., if portion 552A and portion 552B are registered together, and portion 552B and 552C are registered together, then portion 552A and 552C have a connection via portion 552B). The minimum spanning tree algorithm may include randomly selecting a pair of portions 552, then randomly selecting another pair of portions, until the minimum spanning tree is complete. In some embodiments, in addition to the minimum spanning tree algorithm, a margin of error may be used to include additional pairs for robustness and accuracy.

As an example, with respect to FIG. 5D, table 560 illustrates different numbers of connections, or pairs, between mapstreams or mapstream sections using various different techniques. The number of segments, M, may correspond to the total number of mapstreams or mapstream sections available for registration 402 of a particular segment (e.g., the portions 552A-552D of FIG. 5C). All connections may correspond to the number of pairs that would be registered if registration was executed for each possible connection between each pair of the segments. As an example, to calculate all connections, the following equation (1) may be used:

$$\text{All Connections} = M*(M-1)/2 \quad (1)$$

As another example, to calculate the minimum spanning tree connections, the following equation (2) may be used:

$$\text{Minimum Spanning Tree Connections} = M-1 \quad (2)$$

As a further example, to calculate the safety margin connections—e.g., the minimum spanning tree connections plus a safety margin—the following equation (3) may be used:

$$\text{Safety Margin Connections} = \text{MIN}[(\text{Minimum Spanning Tree Connections} * 2), \text{All Connections}] \quad (3)$$

As such, with reference also to FIG. 5C, using equation (3) with respect to the portions 552A-552D, connections 554A-554F may be determined. For example, because there are four portions or segments to registered, the safety margin would result in six connections being made between the four portions or sections of the mapstream sections between the demarcations 550A and 550B.

In some embodiments, to determine which of the sections to use and/or to determine which sections to use more often (e.g., where some sections are registered to more than once), the quality of the sections may be analyzed. For example, the quality may correspond to the number of sensor modalities represented in the mapstream sections. As such, where one section includes camera, trajectory, RADAR, and LiDAR, and another only includes camera, trajectory, and RADAR, the segment with LiDAR may be weighted or favored such that the section is more likely to be included in more registrations 402. In addition, in some embodiments, when determining the sections to register together, geometric distance may be used as a criteria. For example, two sections that are geometrically closer may be selected over geometrically distance sections—e.g., because closer located sections may correspond to a same lane of travel, as opposed to farther away sections that may correspond to different lanes of travel or opposite sides of a road.

Referring again to FIGS. 4 and 5A, the pairs of sections may then be registered to one another to generate pose links between them, which may be used for pose optimization 404. Registration 402 may be executed to determine the geometric relationships between multipole drives or mapstreams 210 corresponding thereto in many different locations where the drives or mapstreams 210 overlap—e.g., the portions 552A-552D of FIG. 5C. The output of the registration process may include relative pose links (e.g., rotation and translation between poses of a first mapstream frame or sections and poses of a second mapstream frame or sections) between pairs of frames or sections in different mapstreams. In addition to the relative poses, the pose links may further represent covariances representing the confidence in the respective pose link. The relative pose links are then used to align the maps 504 corresponding to each of the mapstreams 210 such that landmarks and other features—e.g., points clouds, LiDAR image maps, RADAR image maps, etc.—are aligned in a final, aggregate, HD map. As such, the registration process is executed by localizing one map 504—or portion thereof—to the other map 504—or portion thereof—of the pair. Registration 402 may be executed for each sensor modality and/or for each map layer corresponding to various sensor modalities. For example, camera based registration, LiDAR based registration, RADAR based registration, and/or other registrations may be separately executed. The result may include an aggregate base layer for the HD map, an aggregate LiDAR point cloud layer for the HD map, an aggregate RADAR point cloud layer for the HD map, and aggregate LiDAR map image layer for the HD map, and so on.

The localization process used to localize one section to another section for registration may be executed similarly to the localization process 110 used in live perception, as described in more detail herein. For example, cost spaces may be sampled for single frames or poses, aggregate cost spaces may be accumulated over frames or poses, and a Kalman filter may be used on the aggregate cost space to localize one section with respect to another. As such, a pose from a trajectory of a first section may be known, and the pose of the trajectory from the second section may be sampled with respect to the first section using localization to determine—once the alignment between landmarks is achieved—the relative poses between the two. This process may be repeated for each of the poses of the sections such that pose links between the poses are generated.

For example, with respect to the base layer or perception layer of the maps 504, during registration 402, the 3D world space locations of landmarks may be projected into a virtual field of view of a virtual camera to generate images corresponding to 2D image space locations of the landmarks within the virtual image. In some embodiments, the 3D world space landmark locations may be projected into fields of view or more than one virtual camera to generate images from different perspectives. For example, a forward facing virtual camera and a rear facing virtual camera may be used to generate two separate images for localization in the registration process. Using two or more images may add to the robustness and accuracy of the registration process. For registering to an image, the virtual image space locations of the landmarks from the two sections undergoing registration 402 may be compared to one another—e.g., using camera based localization techniques—to sample a cost space representing the locations of agreement between the sections. For example, the detections from a first section may be converted to a distance function image (e.g., as described herein with respect to localization 110), and the detections from a second section may be compared to the distance function image to generate the cost space. In addition to comparing geometries, semantic information may also be compared—e.g., at the same time or in a separate projection—to compute the cost. For example, where semantic information—e.g., lane line type, pole, sign type, etc.—does not match for a particular point(s), the cost for that particular point(s) may be set to a max cost. The geometric cost and the semantic cost may then be used together to determine a final cost for each pose. This process may be executed over any number of frames to determine the aggregate cost space that is more fine-tuned than any individual cost space, and a Kalman filter (or other filter type) may be executed on the aggregate cost space to determine the poses—and the pose links—between the two segments.

With reference to FIGS. 5E and 5F, FIGS. 5E and 5F illustrate examples of camera or base layer based registration, in accordance with some embodiments of the present disclosure. For example, visualization 570A of FIG. 5E may correspond to a forward facing virtual camera registration and visualization 570B of FIG. 5F may correspond to a rearward facing virtual camera. The 3D landmark locations from a base layer of a first map 504 may be projected into 2D image space for the forward facing virtual camera and the rearward facing virtual camera. The 2D projections may then be converted to a distance function—illustrated as a dotted pattern in the visualization 570A and 570B—where a centerline of each dotted segments 572A-572K may correspond to a cost of zero, and as the points move away from the centerline of the section the cost increases until the white area which may correspond to a max cost. The dotted segments 572 may correspond to the distance function equivalents of the landmarks. For example, the dotted segments 572A-572C and 572J-572K may correspond to lane lines and/or road boundaries and the dotted segments 572D-572I may correspond to poles, signs, and/or other static objects or structures.

The distance functions may then be compared against 2D projected 3D landmark information from a base layer of a second map 504. For example, solid black segments 574 (e.g., including lines and/or dots) may represent the 2D projection of the 3D landmarks of the second map 504 at a sampled pose 576. As such, this comparison of the 2D projections to the distance function projections of the first map 504 may correspond to a single location on a cost space corresponding to the pose 576, and any number of other poses may also be sampled to fill out the cost space. As such, for example, each point along the solid black segment 574A may have a relatively low cost because many of the points match up with the points along the dotted segment 572A. In contrast, each point along the solid black segment 574J may have a high cost because many of the points don't match up with the points along the dotted segment 572J. Ultimately, for the pose 576, the cost corresponding to each of the points of the solid black segments 574A-574K may be computed—e.g., using an average—and the point in the cost space corresponding to the pose 576 may be updated to reflect the computed cost. This process may be repeated for any number of poses—e.g., each possible pose—until a most likely relative pose of the base layer of the second map 504 with respect to the base layer of the first map 504 is determined for the particular time step or frame. This process may then be repeated for each time step or frame of the pair of sections that are being registered together—e.g., with reference to FIG. 5C, for each corresponding time step or frame from the portions 552A and 552B, for each corresponding time step or frame from the portions 552C and 552D, and so on.

As another example, with respect to a LiDAR point cloud layer of the maps 504, during registration 402, the LiDAR point cloud from a first section may be converted to a distance function point cloud and compared against the LiDAR point cloud of a second section to generate a cost space. For example, the cost may be sampled at each possible pose of the second section with respect to the distance function image corresponding to the first section. This process may similarly be performed with respect to LiDAR intensity map images, LiDAR elevation map images, and/or the other LiDAR image types. Similarly, for RADAR, registration 402 may be executed in this way.

The result of registration 402 between any pair of segments are pose links defining the rotation, translation, and/or covariance between poses of the sections. This registration process is executed for each of the determined pairs from the connections—e.g., the safety margin connections 554A-554F of FIG. 5C. Using the outputs of the registration process, a pose graph may be generated that represents pose links of time stamp based relative locations of different drives or sections—or poses thereof.

Referring again to FIGS. 4 and 5A, after the registration process 402 is complete, and pose links have been generated between frames or poses of registered pairs, pose optimization 404 may be executed to smooth the pose links, split groups of poses from various different drives into segments that correspond to road segments used for relative localization in the final aggregate HD map. Pose optimization 404 may be executed to get a more desirable or optimal geometric alignment of sub-maps or layers based on the input absolute poses from the mapstreams 210, the relative pose links generated during registration 402, and the relative trajectory pose links for each individual drive generated using ego-motion. Prior to pose optimization, a pose graph may be generated to represent the absolute poses and relative poses. In some embodiments, a filtering process may be executed to remove poses that have a low confidence—e.g., using the covariance as determined during the registration process 402. The (filtered) frames or poses may be clustered into road segments which may differ from segments of individual input maps 504—e.g., because the same area only needs to be represented by a single road segment rather than multiple overlapping road segments. Each output road segment may be associated with an absolute pose, or origin, during the pose optimization process 404. Given an initial pose graph layout, optimization may be performed to minimize pose error of the absolute poses against the observed relative poses and input absolute poses while taking into account the uncertainty information associated with each observation (e.g., maximum likelihood optimization). The optimization may be initialized by means of a random sample consensus (RANSAC) process to find a subset of maximally agreeing pose links measured via cycle consistency checks across cycles within the pose graph. Once optimized, each road segment may be compared against coupled road segments to determine relative transforms between the road segments such that, during localization 110, the cost function computations can be translated from road segment to road segment using the transforms such that accurate accumulated cost spaces may be computed.

For example, FIGS. 6A-6I illustrate an example pose optimization process 404 corresponding to four drives or segments from the same and/or different maps 504. In some embodiments, the pose optimization process 404 may be separately executed for different sensor data modalities or layers of the maps 504. For example, the base layers of any number of maps 504 may be registered together and then pose optimized, the LiDAR point cloud layers of any number of maps 504 may be registered together and then pose optimized separately from the pose optimization of the base layers, and so on. In other embodiments, the results of the registration processes for different layers of the maps 504 may be used to generate aggregate poses and pose links, and the pose registration process may be executed in the aggregate.

Figure 6A:
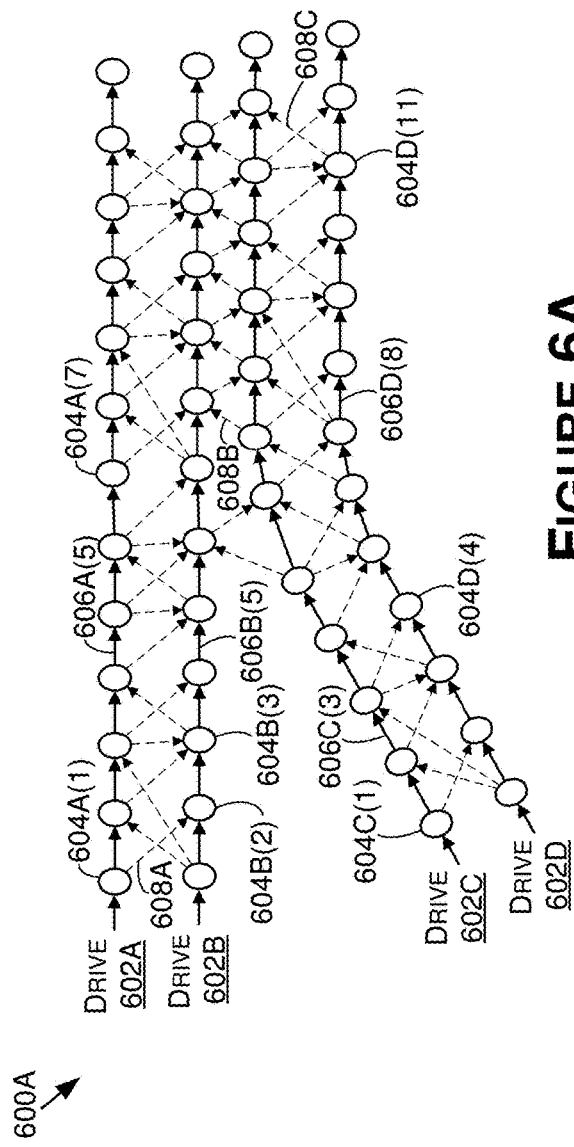
FIG. 6A depicts an example frame graph generated after registration of segments of a plurality of drives, in accordance with some embodiments of the present disclosure.

With respect to FIG. 6A, registered segments from four different drives 602A-602D are illustrated in frame graph 600A. The frame graph 600A is an example of a portion of a larger frame graph, where the larger frame graph may correspond to any portion—or all portions—of a road structure or layout. Four drives 602A-602D may have been registered together to generate pose links 608 (e.g., pose links 608A-608C) between poses 604 or positions of different drives 602. Each pose 604 or position of a single drive 602 may be represented by links 606. For example, the links 606 may represent a translation, rotation, and/or covariance from one pose 604 to a next pose 604. As such, link 606A(6) may represent a rotation, translation, and/or covariance between the poses 604 of the drive 602A that the link 606A(5) connects. Pose links 608A may correspond to the outputs of the registration process 402, and may encode a translation, rotation, and/or covariance between poses 604 of different drives 602. For example, pose link 608A may encode six degrees of freedom transformations between poses—e.g., the translation (e.g., difference in (x, y, z) location), rotation (e.g., difference in x, y, and z axis angles), and/or covariance (e.g., corresponding to the confidence in the values of the pose link) between pose 604A(1) of drive 602A and pose 604B(2) of the drive 602B.

Figure 6B:
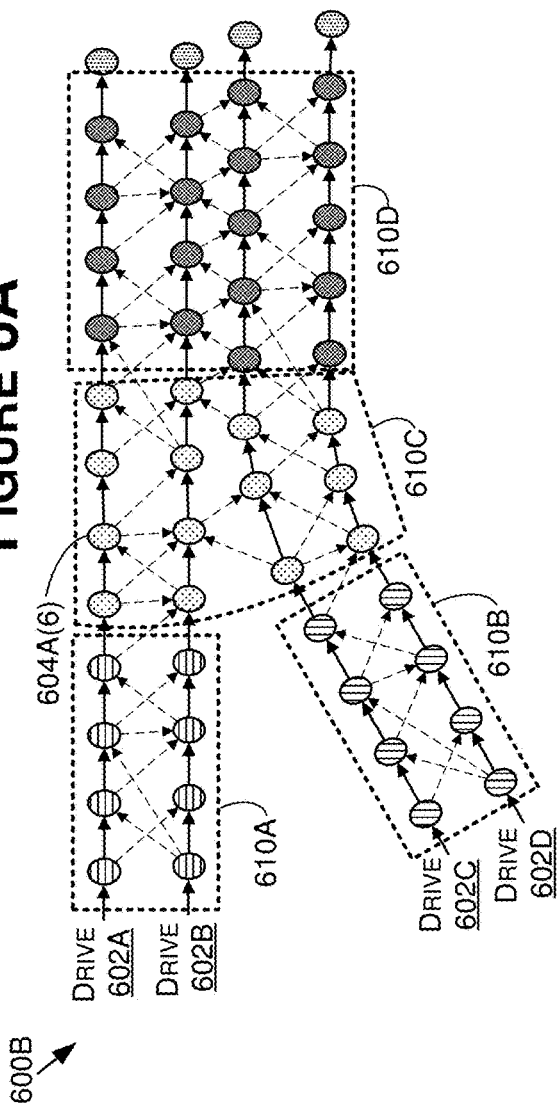
FIG. 6B depicts road segment generation using the frame graph of FIG. 6A, in accordance with some embodiments of the present disclosure.

FIG. 6B illustrates road segment generation whereby groups of poses from any number of the drives 602 may be combined into a single road segment. The resulting road segments may be included in the final aggregate HD map used for local or relative localization. In addition, the road segments that are generated may have an origin, and the origin may have a relative location in a global coordinate system—such as the WGS84 coordinate system. Frame graph 600B (which may correspond to frame graph 600A but with road segment identification) illustrates how a frame graph may be separated into different road segments 610A-610D. For example, poses with a horizontal striped fill may correspond to a first road segment 610A, poses with a vertical striped fill may correspond to a second road segment 610B, poses with a dotted fill may correspond to a third road segment 610C, and poses with a shaded fill may correspond to a fourth road segment 610D. In order to determine which poses 604 or frames are to be included in each road segment, a first random pose 604—such as pose 604A(6)—may be selected. Once the random pose 604 is selected, links 606 and/or pose links 608 may be iterated from pose 604 to pose 604 starting with the randomly selected pose 604 until either a maximum distance is reached (e.g., 25 meters, 50 meters, etc.) corresponding to a maximum distance for a road segment 610 or a pose 604 or frame that is already encoded to a road segment 610 is determined. Once a road segment 610 is fully encoded, another random un-encoded pose 604 may be selected and the process may be repeated. This may be repeated until each of the poses 604 is encoded to or included in a road segment 610. Due to the stochastic nature of this process, some very small road segments 610 may be created. As such, a post-processing algorithm may be executed to analyze road segment sizes, and to merge road segments below a certain size threshold into neighboring road segments.

Figure 6C:
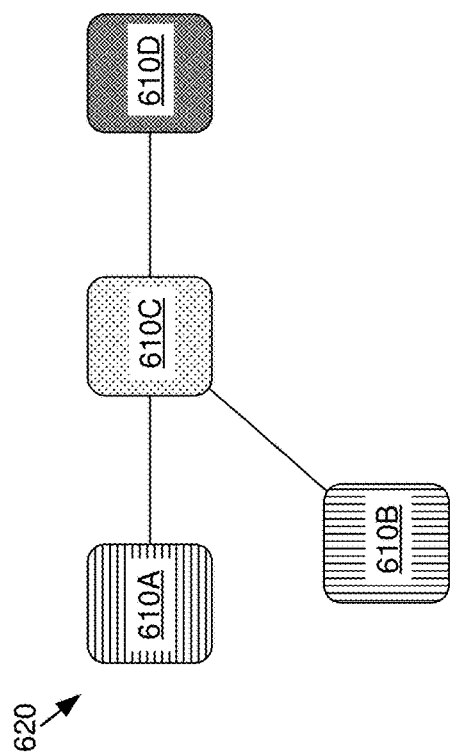
FIG. 6C depicts a segment graph corresponding to determined road segments of the frame graph of FIG. 6B, in accordance with some embodiments of the present disclosure.

FIG. 6C illustrates a segment graph 620 of the road segments 610A-610D after the road segment encoding or generation process. For example, each block labeled with 610A-610D may correspond to a collapsed representation of all of the poses 604 corresponding to the respective road segment 610. Once the road segments 610 are determined, an origin or seed location for each road segment may be determined. The origin or seed location may correspond to a center of the road segment 610 (e.g., where road segments are 50 meters by 50 meters long, the origin may be at (25 m, 25 m)). In some embodiments, the origin may correspond to an average or middle location of each of the poses 604 within the road segment 610. For example, the (x, y, z) coordinates corresponding to each pose 604 may be averaged, and the result may be selected as the origin. In other embodiments, the origin may be selected using a different method.

Figure 6D:
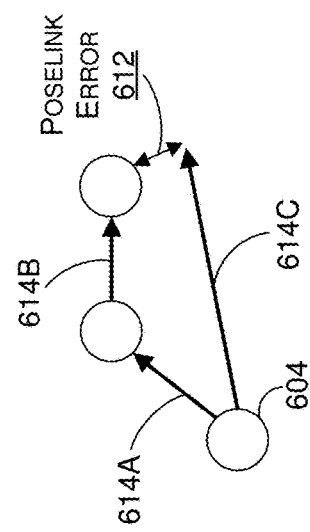
FIG. 6D depicts an example pose link error calculation for poses of a road segment, in accordance with some embodiments of the present disclosure.

FIG. 6D illustrates a pose link error correction process. For example, pose link transforms between poses of the frame graph may not be guaranteed to be consistent among one another. As such, where three poses 604 are taken—as in FIG. 6D—a pose link error 612 may be present. In order to minimize the pose link error 612 within a road segment, an arrangement of poses within a road segment 610 that has a lowest pose link error 612 may be determined. In one or more embodiments, the layout of the poses that is determined during pose optimization 404 may not be globally consistent, but may be optimized such that the layout is consistent within the same road segment 610 and neighboring road segments 610. For example, pose link 614A and 614B should be roughly the same, and pose link 614C should be roughly equal to the combination of pose link 614A and 614B. However, in practice, due to some error—e.g., localization error during registration 402—there may be some delta or pose link error 612 that manifests between poses 604. As a result, pose optimization 404 may be used to move or shift the poses 604 or frames such that a best fit is achieved within the corresponding road segment 610. With respect to the pose links 614A and 614B, the poses 604 may be shifted to distribute the error between all of the pose links 614 instead of having the pose link error 612 primarily manifest with pose link 614C.

FIG. 6E illustrates a pose graph 630 which may represent the frame graph 600B of FIG. 6B, but with pose links connecting the road segments 610A-610D to outside road segments 610 omitted. FIG. 6F illustrates a RANSAC operation executed on the pose graph 630. This process may be executed based on the reliance on the accuracy of the links 606 between poses being more accurate than the pose links 608. For example, a minimum set of pose links 608—or a minimum spanning tree—in the pose graph 630 that keeps all nodes or poses 604 connected may be sampled. Once the minimum set is selected, the rest of the pose links 608 may be sampled to see how much pose link error 612 is detected. This may correspond to one iteration, and at a next iteration, another random minimum set of pose links 608 may be selected, and then all the rest of the pose links 608 may be sampled for the pose link error 612, and so on, for some number of iterations (e.g., 100, 1000, 2000, etc.). Once completed for the number of iterations, the layout that had the most agreement may be used. For example, with respect to FIG. 6F, a cost of the error may be computed for each of the pose links 608 other than the minimum sampled—e.g., according to equation (4), below:

$$\text{cost} = \sqrt{\Sigma_i \frac{u_i^2}{s_i^2}} \quad (4)$$

where $u=\log(\text{Err})$, $u \in se3$, $\text{Err} \in SE3$, Err is the difference between the pose link transform and the transform between the poses connected by the pose link, according to the currently evaluated layout of road segments 610, and $s_i$ is the standard deviation of the i'th component of the pose link transform (e.g., the transform confidence). As such, the cost may express the pose link error 612 in terms of the number of standard deviations. The RANSAC sampling may be repeated over the number of iterations, and at each iteration the number of pose links that fit the layout within N standard deviations may be counted. The pose links that satisfy this condition and that are included in the count may be referred to as inliers.

Figure 6G:
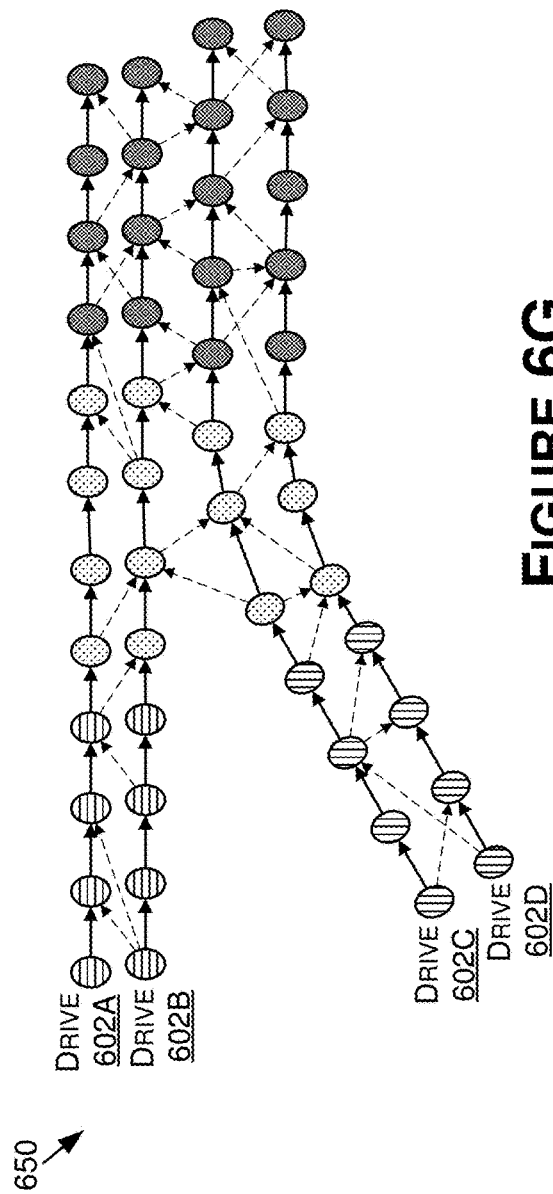

With reference to FIG. 6G, FIG. 6G illustrates an updated pose graph 650 after the RANSAC process is completed—e.g., the pose graph 650 illustrates the pose arrangement with the most inliers. The pose graph 650 of FIG. 6G may undergo an optimization process, such as a non-linear optimization process (e.g., a bundle adjustment process) with the goal of minimizing the sum of squared costs of inliers—e.g., using the computed cost function described herein with respect to FIG. 6F. After bundle adjustment, the pose graph 650 may be fixed, and the road segments 610A-610D may be fixed such that the poses 604 may be in their final fixed position for the road segments 610—e.g., as illustrated in FIG. 6H with the example road segment 610C. The final road segments 610, as described herein, may have a relative origin (e.g., for localizing with respect to in the local or relative coordinate system). As such, and because the relative origin has a location in a global coordinate system, then localizing to the local coordinate system may also localize to the global coordinate system. For example, with respect to FIG. 6H, the road segment 610C may have an origin 652C (as illustrated). Although not illustrated, the other road segments 610A, 610B, and 610D may also have respective origins 652.

Figure 6I:
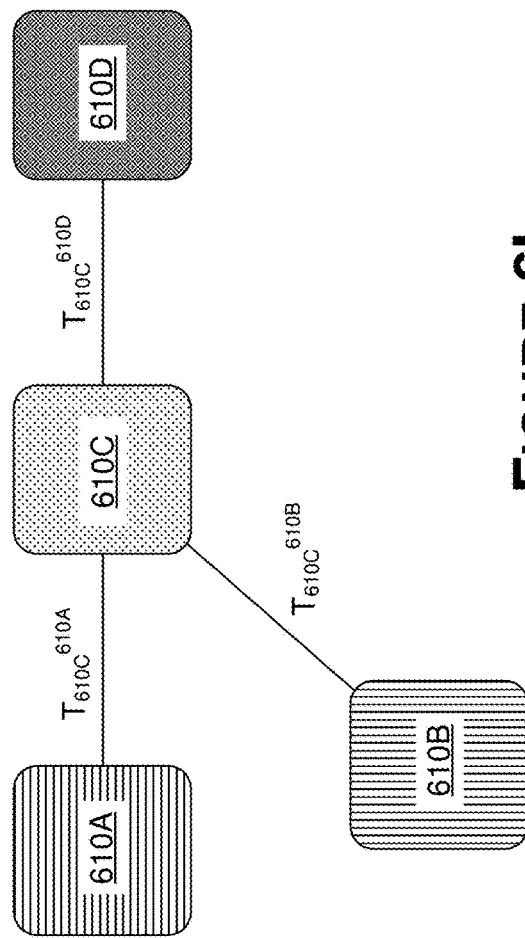
FIG. 6I depicts transforms between origins of road segments of a segment graph, in accordance with some embodiments of the present disclosure.
Figure 6H:
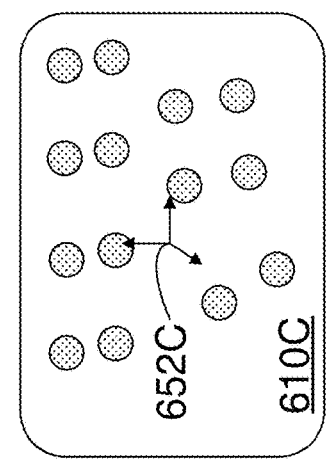
FIG. 6H depicts a finalized road segment determined from the pose graph of FIG. 6G, in accordance with some embodiments of the present disclosure.

With reference to FIG. 6I, each of the road segments 610 may have a relative transform for computed for each direct neighbor road segment 610. In the illustration of FIG. 6I, the road segment 610C may have a relative transform determined between road segment 610C and road segment 610A (e.g., transform, $T_{610C}^{610A}$), a relative transform determined between road segment 610C and road segment 610B (e.g., transform, $T_{610C}^{610B}$), and a relative transform determined between road segment 610C and road segment 610D (e.g., transform, $T_{610C}^{610D}$). The relative transform may be used during localization 110—e.g., more specifically when generating the aggregate cost function and/or when generating the local map layouts used for localization—as the aggregate cost spaces may include one or more cost spaces that were generated when localizing with respect to, for example, the road segment 610A and may include cost spaces that were generated when localizing with respect to, for example, the road segment 610C. As such, when entering road segment 610C from road segment 610A, the cost spaces may be updated or transformed—e.g., using the transform, $T_{610C}^{610A}$—to update the cost spaces such that each aggregate cost space references the same origin (e.g., the origin 652C of the road segment 610C). The relative transforms may represent six degrees of freedom, such as rotation (e.g., differences between x, y, and z axis rotation angles) and translation (e.g., difference between (x, y, z) coordinates).

Referring again to FIG. 4, after registration 402 and pose optimization 404, the updated pose graphs—e.g., pose graph 650—may be fixed, and the relative poses of multiple drives 602 may be fixed as a result. As such, the maps 504 from each of the drives 602, with their outputs now currently in alignment—e.g., as a result of registration 402 and pose optimization 404—may be used to fuse (e.g., via fusion 406) the map layers of individual maps 504 together to form an aggregate HD map. The aggregate HD map may include the same separate layers as the individual maps 504, but the aggregate HD map may include aggregate layers—e.g., an aggregate base layer, an aggregate LiDAR point cloud layer, an aggregate RADAR point cloud layer, and aggregate RADAR map image layer, and so on. The fusion process 604 may be used to improve the data quality of map data with respect to the data present in any single drive—e.g., fused maps may be more accurate or reliable than a single map 504 from a mapstream 210 of a single drive. For example, inconsistencies between maps 504 may be removed, precision of map contents may be improved, and a more complete representation of the world may be achieved—e.g., by combining the geographic scope of two different map layers or sub-maps or combining observations about wait conditions across multiple drives through a same intersection. Once a final—e.g., more optimal or desired—geometric layout of the poses 604 of different drives 602 is determined by the pose graph (e.g., pose graph 650), the information from the multiple maps 504 and/or mapstream 210 corresponding thereto may easily be transformed into the same output coordinate frames or poses associated with each road segment 610.

As an example, with respect to 3D landmark locations represented in the base layer, the 3D landmark locations from multiple maps 504 may be fused together to generate a final representation of each lane line, each road boundary, each sign, each pole, etc. Similarly, for LiDAR intensity maps, LiDAR elevation maps, LiDAR distance function images, RADAR distance function images, and/or other layers of the maps 504, the separate map layers may be fused to generate the aggregate map layers. As such, where a first map layer includes data that matches up—within some threshold similarity—to data of another map layer, the matching data may be used (e.g., averaged) to generate a final representation. For example, with respect to base layers, where the data corresponds to a sign, the first representation of the sign in the first map 504 and the second representation of the sign in the second map 504 may be compared. Where the first sign and the second sign are within a threshold distance to one another and/or are of the same semantic class, a final (e.g., averaged) representation of the sign may be included in the aggregate HD map. This same process may be executed for lane dividers, road boundaries, wait conditions, and/or other map information. On the contrary, where data from map layers of a map 504 does not match up with data from other map layers of other maps, the data may be filtered out. For example, where a first map 504 includes data for a lane divider at a location and of a semantic class, and one or more other maps 504 do not share this information, the lane divider from the first map 504 may be removed or filtered out from consideration for the aggregate HD map.

As described herein, the fusion process 406 may be different for different map layers—or different features represented therein—of the maps 504. For example, for lane graph fusion—e.g., fusion of lane dividers, road boundaries, etc.—the individually observed lanes, paths, and/or trajectories from multiple base map layers of multiple maps 504 may be fused into a single lane graph in the aggregate HD map. The lane boundaries and/or lane dividers of the various maps 504 may be fused not only for the lane graph (e.g., as delimiters of the boundaries of the lanes that a vehicle 1500 may travel), but also for camera-based localization as 3D landmarks, or 2D landmarks generated from the 3D landmarks (e.g., as a set of stable semantic landmarks). In addition to lane boundaries or dividers, other road markings may also be gleaned from the mapstreams 210 and included in the maps 504 for use in the fusion process 604. For example, stop lines, road text, gore areas, and/or other markings may be fused together for use as semantic landmarks for localization and/or for updating wait condition information. With respect to wait conditions in the base layers, the wait conditions from multiple maps 504 may be fused to generate a final representation of the wait conditions. Poles, signs, and/or other static objects may also be fused from multiple base layers of the maps 504 to generate aggregate representations thereof. The poles, signs, and/or other (vertical) static objects may be used for localization.

In some embodiments, lane dividers, lane center (e.g., rails), and/or road boundaries may not be clearly identified in the base layer from perception. In such embodiments, the trajectory information from the base layers and/or the mapstreams 210 may be used to infer the rails and/or lane dividers. For example, after bundle adjustment, the pose graph 650 may be viewed from a top down view to determine the patterns of trajectories. The trajectories that are determined to be in the same lane may be used to generate the lane dividers and/or rails for that particular lane. However, to determine that two or more trajectories are from the same lane of travel, a heuristic may be used. For example, to determine to cluster two trajectories together as belonging to a same lane, a current pose or frame may be compared. Where the current frame or poses of the two trajectories appear to match up with the same lane of travel (e.g., based on some distance heuristic), poses some distance (e.g., 25 meters) ahead of the current poses and poses some distance (e.g., 25 meters) behind the current poses of the two trajectories may also be analyzed. Where the current, the prior, and the forward poses all indicate a same lane of travel, the current poses may be clustered together for determining the lane divider, lane rail, and/or road boundary locations. As a result, where one trajectory corresponds to a vehicle 1500 changing lanes while another vehicle 1500 was staying steady in a lane, the combination of the two trajectories would result in an inaccurate representation of the actual lane dividers, lane rails, and/or road boundaries. In some embodiments, in addition to, or alternatively from, analyzing the distances between the poses of the trajectories, the angles formed between the trajectories may be analyzed. For example, where a difference in angle is greater than some threshold (e.g., 15 degrees, 40 degrees, etc.), the two trajectories may be considered as not being from the same lane and may not be clustered together.

With respect to LiDAR and/or RADAR map layers, the fusion of LiDAR and RADAR points from multiple maps 504 may assure that a fused or aggregate map contains a more complete point cloud than any individual map 504 (e.g., due to occlusions, dynamic objects, etc.). The fusion process 604 may also reduce redundancy in the point cloud coverage by removing redundancies to reduce the amount of data required for storing and/or transmitting the point cloud information of the aggregate HD map. For example, where point cloud points of one or more drives do not line up with point cloud points from another drive, the point from the non-matching drive may be removed—e.g., via dynamic object removal. The resulting aggregate map layers for LiDAR may include an aggregate sliced (e.g., ground plane slice, giraffe plane slice, etc.) point cloud layer(s), an LiDAR elevation map image layer that stores the average height per pixel, and/or a ground reflectance or intensity map image layer that stores the average intensity value per pixel. For RADAR, the resulting aggregate map layers may include a RADAR cross section (RCS) map image layer and/or a RADAR point cloud layer (which may or may not be sliced).

The in-memory representation for all LiDAR and RADAR map image layers may use a floating point representation, in embodiments. For the elevation model, the ground reflectance model, and/or RCS, the pixels without any valid data may be encoded by a not a number (NaN) data type. With respect to ground reflectance and elevation map image layers, the maps image generators may search for peak density in each point's height distribution. Only these points may be considered as ground detections, and the noisy measurements may be filtered out (e.g., measurements corresponding to obstacles). In some embodiments, a median filter may be applied to fill in missing measurements where gaps would otherwise have existed.

With respect to LiDAR, a voxel based fusion strategy may be implemented. For example, where a voxel is only observed by few of many drives, the voxel may be determined to be a noisy detection. This LiDAR fusion may be performed per road segment 610, in embodiments. LiDAR fusion, in non-limiting embodiments, may be executed according to the following process: (1) find tight 3D bounding boxes of the LiDAR points; (2) given a preset voxel resolution, and a 3D point, (x, y, z), the compute the index of the 3D point; (3) use sparse representation of the 3D volume instead of dense representation for memory usage reduction; (4) save the ID's of the drives or mapstream 210 that observed the voxel and the average colors in the voxel data; and (5) after updating the voxel volume with all the points in the drive, threshold the number of the drive in each voxel such that only the voxels with the number of drives larger than the threshold are kept (e.g., the threshold may be set to half of the total drives 602 in the road segment 610). In addition to removing the noisy 3D points, LiDAR fusion may generate and save point clouds in giraffe plane and ground plane slices. The 3D points in the corresponding planes or slices may later be used to generate different kinds of LiDAR map images for LiDAR localization. For example, the giraffe plane may include the points in the range of z=[a1, b1], and the ground plane points may be in the range of z=[a2, b2], where a1, b1, a2, b2 may be preset parameters. Therefore, the points are selected based on the z coordinate (height) of the points in their frame coordinate system. Note the filtering process is done based on the frame coordinate instead of road segment coordinate, so the points may not be filtered based on their z coordinate after they are transformed to the road segment coordinate system. To solve this problem, it may be noted that a point belongs to a giraffe plane or a ground plane before the point is transformed, and that information may be saved inside the data structure associated with the voxel. If a voxel passes the noise filtering process, and also belongs to one of the two planes, the voxel may be saved into the corresponding point cloud file. Similar processes may be executed for the RADAR data.

In some embodiments, such as where the fusion process 406 is executed during health checking 112, the LiDAR data, RADAR data, and/or map data that is more outdated may be weighted more negatively as compared to more recent data. As such, where disagreement is determined between a newer map 504 and an older map 504, the data from the older map 504 may be filtered out and the data from the newer map 504 may be kept. This may be a result of changing road conditions, construction, and/or the like, and the more recent or current data may be more useful for navigation of the road segment 610.

After the fusion process 406, map data 108—e.g., representing the aggregate HD map including aggregate layers—may have been generated. The map data 108 may then be used for localization 110, as described in more detail herein.

Figure 7:
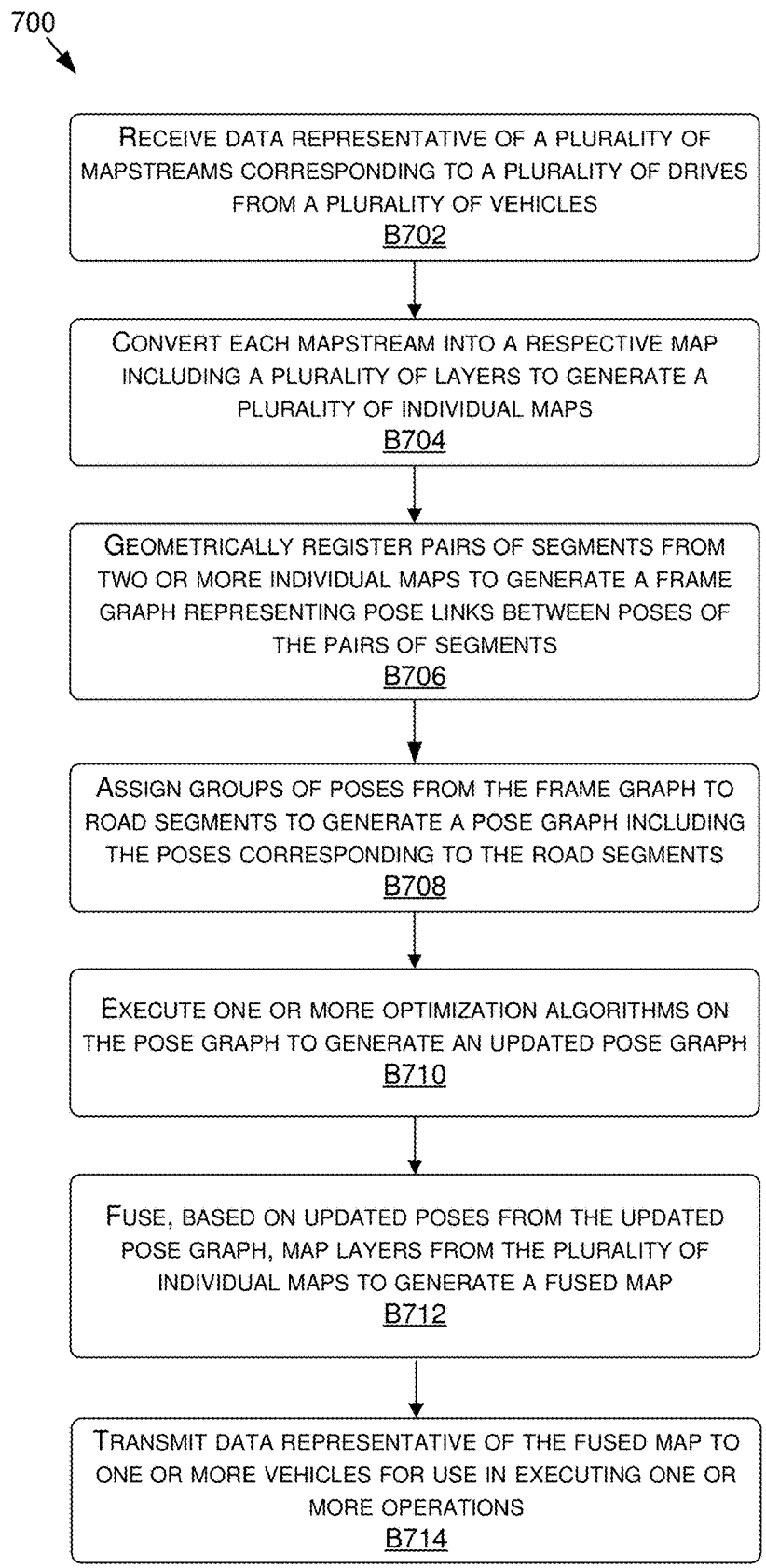
FIG. 7 is a flow diagram showing a method for map creation, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, the method 700 is described, by way of example, with respect to the process 106 of FIG. 4. However, this method 700 may additionally or alternatively be executed within any one process by any one system, or any combination of processes and systems, including, but not limited to, those described herein.

FIG. 7 is a flow diagram showing a method 700 for map creation, in accordance with some embodiments of the present disclosure. The method 700, at block B702, includes receiving data representative of a plurality of mapstreams corresponding to a plurality of drives from a plurality of vehicles. For example, the mapstreams 210 may be received for the map creation 106 process, where the mapstreams 210 may correspond to any number of drives from any number of vehicles 1500.

The method 700, at block B704, includes converting each mapstream into a respective map including a plurality of layers to generate a plurality of individual maps. For example, each received mapstream 210 may undergo conversion 502 to generate a map 504, such that a plurality of maps 504 (e.g., maps 504(1)-504(N)) are generated. Each map 504 may include a plurality of layers, such as but not limited to the layers described with respect to FIG. 5B.

The method 700, at block B706, includes geometrically registering pairs of segments from two or more individual maps to generate a frame graph representing pose links between poses of the pairs of segments. For example, segments (e.g., portions 552A-552D) of various mapstreams 210 and/or maps 504 may be determined—e.g., using the trajectory information and GNSS data indicating proximity—and the segments may be registered to one another (e.g., using a minimum spanning tree, plus a safety margin, in embodiments) to generate a pose graph (e.g., frame graph 600A of FIG. 6A). The pose graph may include pose links between poses or frames of the different drives 602. In some embodiments, different registration processes may be executed for different map layers and/or sensor modalities—e.g., because frame rates of different sensors may differ, the poses of the vehicles 1500 at each frame may be different for different sensor modalities and thus also for different map layers.

The method 700, at block B708, includes assigning groups of poses from the frame graph to road segments to generate a pose graph including the poses corresponding to the road segments. For example, the process described herein with respect to FIG. 6B may be executed to determine poses 604 from different drives 602 that correspond to a single road segment 610. Once a road segment 610C is determined, a pose graph may be generated that includes the poses 604 from the road segment 610C and each neighboring road segment (e.g., 610A, 610B, and 610D) to generate a pose graph 630—e.g., similar to the larger frame graph 600A but without outside pose connections (e.g., pose connections to poses 604 outside of the road segments 610A-610D) being omitted.

The method 700, at block B710, includes executing one or more pose optimization algorithms on the pose graph to generate an updated pose graph. For example, a RANSAC operation (e.g., FIG. 6F), pose graph optimization (e.g., FIG. 6G), and/or other optimization algorithms may be executed to generate the updated pose graph 650.

The method 700, at block B712, includes fusing, based on updated poses from the updated pose graph, map layers from the plurality of individual maps to generate a fused map. For example, once the relative poses 604 of each of the frames of the map layers are known, the data from the map layers may be fused to generate aggregate or fused HD map layers. For example, 3D landmark locations from two or more base layers of respective maps 504 may be fused according to their pose-aligned average positions. As such, where a pole in a first base layer of a first map 504 has a position (x1, y1, z1) and the pole in a second base layer of another map 504 has a position (x2, y2, z2), the pole may have a single final position in the fused base layer of the HD map as ((x1+x2)/2, (y1+y2)/2, (z1+z2)/2). In addition, because an origin 652 of the road segment 610 that the pole corresponds to may be known, the final pole location may be determined relative to the origin 652 of the road segment. This process may be repeated for all 3D landmarks in the base layer, and may be repeated for each other layer type (e.g., RADAR layers, LiDAR layers, etc.) of the maps 504.

The method 700, at block B714, includes transmitting data representative of the fused map to one or more vehicles for use in executing one or more operations. For example, the map data 108 representative of the final fused HD map may be transmitted to one or more vehicle 1500 for localization, path planning, control decisions, and/or other operations. For example, once localized to the fused HD map, information from planning and control layers of an autonomous driving stack may be obtained—such as a lane graph, wait conditions, static obstacles, etc. —and this information may be provided to a planning and control sub-system of the autonomous vehicle 1500. In some embodiments, select layers of the fused HD map may be transmitted to a respective vehicle 1500 based on the configuration of the vehicle 1500. For example, where a vehicle 1500 does not have LiDAR sensors, the LiDAR layers of the fused map may not be transmitted to the vehicle 1500 for storage and/or use. As a result of this tailored approach, the bandwidth requirements for transmitting the map data 108 and/or the storage requirements on the vehicle 1500 for storing the map data 108 may be reduced.

Localization

Figure 8A:
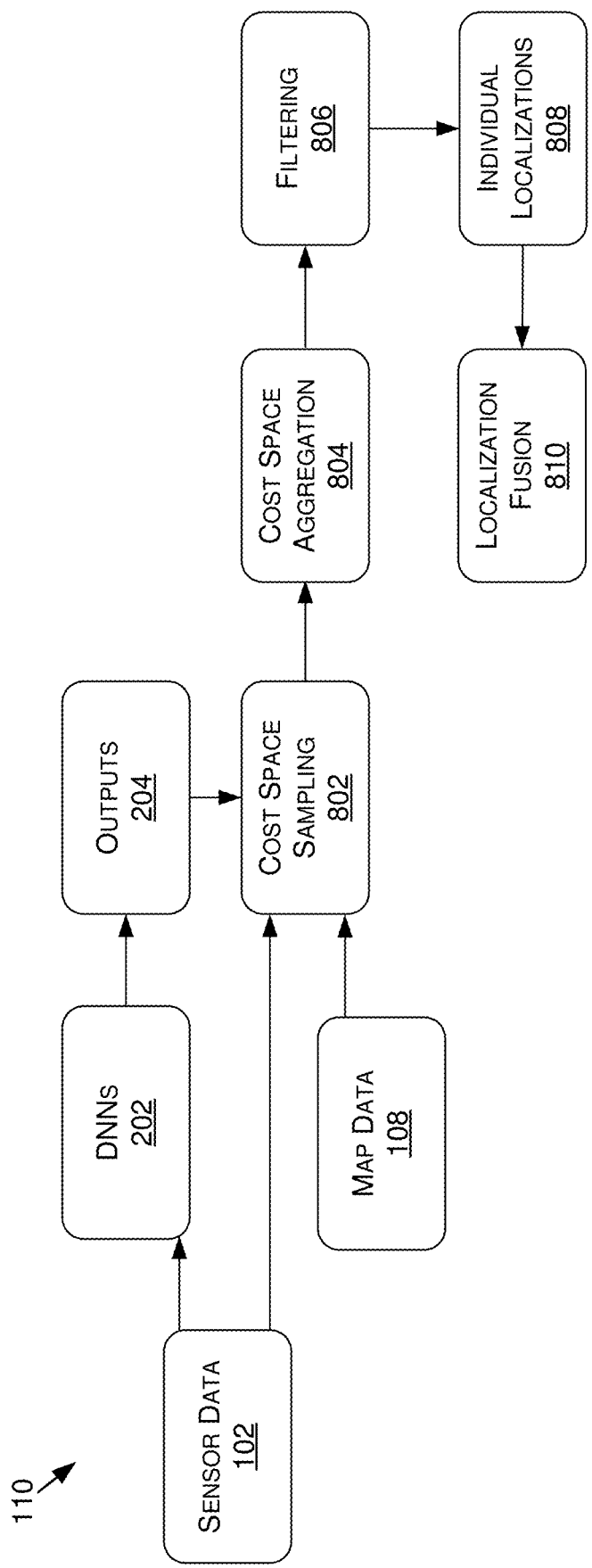
FIG. 8A depicts a data flow diagram for a process of localization, in accordance with some embodiments of the present disclosure.

With reference to FIG. 8A, FIG. 8A depicts a data flow diagram for a process 110 of localization, in accordance with some embodiments of the present disclosure. The process 110, in some embodiments, may be executed using a vehicle 1500. In some embodiments, one or more of the processes described with respect to the process 110 may be executed in parallel using one or more parallel processing units. For example, localization using different map layers may be executed in parallel with one or more other map layers. Within a single map layer, cost space sampling 802, cost space aggregation 804, and/or filtering 806 may be executed in parallel. For example, different poses may be sampled in parallel during cost space sampling 802 to more efficiently generate the cost space for the current frame or time step. In addition, because map data corresponding to layers of the maps may be stored on GPUs as textures, a texture lookup may be executed to quickly determine cost values for cost spaces—thereby leading to reduced run-time for each cost space analysis. In addition, as described herein, the localization process 110—e.g., the cost space sampling 802, the cost space aggregation 804, and/or the filtering 806—may be executed during registration 402 in the map creation process 106. For example, the localization process 110 may be used to geometrically register poses from pairs of segments, and the cost space sampling 802, the cost space aggregation 804, and/or the filtering 806 may be used to align map layers from one segment with those of another segment.

The goal of the localization process 110 may be to localize an origin 820 of a vehicle 1500 with respect to a local origin 652 of a road segment 610 of the fused HD map represented by the map data 108. For example, an ellipsoid(s) corresponding to a fused localization 1308—described in more detail herein with respect to FIGS. 9A-9C—may be determined for the vehicle 1500 at a particular time step or frame using the localization process 110. The origin 820 of the vehicle 1500 may correspond to a reference point or origin of the vehicle 1500, such as a center of a rear axle of the vehicle 1500. The vehicle 1500 may be localized relative to the origin 652 of the road segment 610, and the road segment 610 may have a corresponding location 824 in a global coordinate system. As such, once the vehicle 1500 is localized to the road segment 610 of the HD map, the vehicle 1500 may be localized globally, as well. In some embodiments, the ellipsoid 910 may be determined for each individual sensor modality—e.g., LiDAR localization, camera localization, RADAR localization, etc. —and the outputs of each localization technique may be fused via localization fusion 810. A final origin location may be generated—e.g., the origin 820 of the vehicle 1500—and used as the localization result for the vehicle 1500 at the current frame or time step.

At a beginning of a drive, a current road segment 610 of the vehicle 1500 may be determined. In some embodiments, the current road segment 610 may be known from a last drive—e.g., when the vehicle 1500 was shut off, the last known road segment the vehicle 1500 was localized to may be stored. In other embodiments, the current road segment 610 may be determined. To determine the current road segment 610, GNSS data may be used to localize the vehicle 1500 globally, and then to determine the road segment(s) 610 corresponding to the global localization result. Where the results return two or more road segments 610, the road segment 610 with an origin 652 closest to the origin of the vehicle 1500 may be determined to be the current road segment 610. Once a current road segment 610 is determined, the road segment 610 may be determined to be a seed road segment for a breadth first search. The breadth first search may be executed to generate a local layout of road segments 610 that neighbor the current road segment 610 at a first level, then a second level of road segments 610 that neighbor the road segments 610 from the first level, and so on. Understanding the road segments 610 that neighbor the current road segment 610 may be useful for the localization process 110 because, as the vehicle 1500 moves from one road segment 610 to another road segment 610, the relative transforms between the road segments 610 may be used to update the sampled cost spaces generated for prior road segments 610 that are used in the aggregate cost spaces for localization. Once a vehicle 1500 moves from a seed road segment to a neighbor road segment, another breadth first search may be executed for the new road segment to generate an updated local layout, and this process may be repeated as the vehicle 1500 traverses the map from road segment to road segment. In addition, as described herein, as the vehicle 1500 moves from one road segment 610 to another road segment 610, the previously computed cost spaces (e.g., some number of previous cost spaces in a buffer, such as 50, 100, etc.) may be updated to reflect the same cost spaces but with respect to the origin 652 of the new road segment 610. As a result, the computed cost spaces may be carried over through road segments to generate the aggregate cost spaces via cost space aggregation 804.

The localization process 110 may use the sensor data 102—e.g., real-time sensor data 102 generated by a vehicle 1500—the map data 108, and/or the outputs 204 to localize the vehicle 1500 at each time step or frame. For example, the sensor data 102, the outputs 204, and the map data 108 may be used to execute cost space sampling 802. The cost space sampling 802 may be different for different sensor modalities corresponding to different map layers. For example, cost space sampling 802 may be executed separately for LiDAR map layers (e.g., LiDAR point cloud layer, LiDAR maps image layer, and/or LiDAR voxel map layer), RADAR map layers (e.g., RADAR point cloud layers and/or RADAR maps image layers), and/or for the base layer (e.g., for landmark or camera based map layers). Within each sensor modality, the cost sampling may be executed using one or more different techniques, and the costs over the different techniques may be weighted to generate a final cost for a sampled pose. This process may be repeated for each pose in the cost space to generate a final cost space for a frame during localization. For example, a LiDAR intensity cost, a LiDAR elevation cost, and a LiDAR (sliced) point cloud cost (e.g., using a distance function) may be computed, then averaged or otherwise weighted, and used for the final cost for a pose or point on the cost space. Similarly, for camera or landmark based cost space sampling, a semantic cost may be computed and a geometric cost (e.g., using a distance function) may be computed, then averaged or otherwise weighted, and used for the final cost for a pose or point on the cost space. As a further example, RADAR point cloud cost (e.g., using a distance function) may be computed and used for the final cost for a pose or point on the cost space. As such, cost space sampling 802 may be executed to sample the cost of each different pose within a cost space. The cost space may correspond to some region in the map that may include only a portion of a current road segment 610, an entirety of a current road segment 610, the current road segment 610 and one or more adjoining road segments 610, and/or some other region of the overall fused HD map. As such, the size of a cost space may be a programmable parameter of the system.

A result of cost space sampling 802, for any individual sensor modality, may be a cost space that represents the geometric match or likelihood that the vehicle 1500 may be positioned with respect to each particular pose. For example, the points in the cost space may have corresponding relative locations with respect to a current road segment 610, and the cost space may indicate the likelihood or possibility that the vehicle 1500 is currently in each particular pose (e.g., (x, y, z) location with respect to the origin of the road segment 610 and axis angle about each of the x, y, and z axes).

With reference to FIG. 9A, cost space 902 may represent a cost space for a sensor modality—e.g., a camera based cost space generated according to FIGS. 10A-10C. For example, the cost space 902 may represent the likelihood that a vehicle 1500 is currently in each of a plurality of poses—e.g., represented by points of the cost space 902—at a current frame. The cost space 902, although represented in 2D in FIG. 9A, may correspond to a 3D cost space (e.g., with (x, y, z) locations and/or axis angles for each of the x, y, and z axes). As such, the sensor data 102—e.g., before or after pre-processing—and/or the outputs 204 (e.g., detections of landmark locations in 2D image space and/or 3D image space) may be compared against the map data 108 for each of the plurality of poses. Where a pose does not match up well with the map data 108, the cost may be high, and the point in the cost space corresponding to the pose may be represented as such—e.g., represented in red, or with respect to FIG. 9A, represented in non-dotted or white portions. Where a pose does match up well with the map data 108, the cost may be low, and the point in the cost space corresponding to the pose may be represented as such—e.g., represented in green, or with respect to FIG. 9A, represented by the dotted points. For example, with reference to FIG. 9A, where the cost space 902 corresponds to visualization 1002 of FIG. 10A, the dotted portions 908 may correspond to the low cost for the poses along the diagonal where a sign 1010 may match up well with the predictions or outputs 204 of the DNNs 202. For example, at a pose on the left bottom of the dotted portions of the cost space, the predictions of the sign may line up well with the sign 1010 from the map data 108, and similarly on the upper right portion of the dotted portions, the predictions of the sign from the corresponding poses may also line up well with the sign 1010. As such, these points may be represented with low cost. However, due to noise and the high number of low cost poses, a single cost space 902 may not be accurate for localization—e.g., the vehicle 1500 cannot be located at each of the poses represented by the dotted portions 908. As such, an aggregate cost space 904 may be generated via cost space aggregation 804, as described herein.

Cost space sampling 802 may be executed separately for different sensor modalities, as described herein. For example, with respect to FIGS. 10A-10D, camera or landmark based cost spaces (e.g., corresponding to base layers of the fused HD map) may be generated using geometric cost and/or semantic cost analysis at each pose of the cost space. For example, at a given time step or frame, the outputs 204—e.g., landmark locations of lane dividers, road boundaries, signs, poles, etc. —may be computed with respect to an image(s), such as the image represented in visualization 1002. The 3D landmark information from the map data 108 may be projected into 2D image space to correspond to the location of the 3D landmarks in the 2D image space relative to the current predictions of the vehicle 1500 at the current pose being sampled in the cost space. For example, the sign 1010 may correspond to the 2D projection from the map data and sign 1012 may correspond to the current prediction or output 204 from one or more DNN(s) 202. Similarly, lane divider 1014 may correspond to the 2D projection from the map data 108 and lane divider 1016 may correspond to the current prediction or output 204 from one or more DNN(s) 202. In order to compute the cost for the current pose—e.g., represented by pose indicator 1018—the current outputs 204 from the DNN(s) 202 may be converted to a distance function (e.g., where the predictions are divided into points, and each point has a zero cost at its center and the cost increases from the center moving outward until a max cost is reached, as represented by the white areas of the visualization 1004) corresponding to the geometry of the predictions as represented in visualization 1004, and the current outputs 204 may separately be converted to semantic labels for the predictions as represented in the visualization 1006. In addition, the 2D projections of the 3D landmarks may be projected into the image space and each point from the 2D projections may be compared against the portion of the distance function representation that the projected point lands on to determine the associated cost. As such, the dotted portions may correspond to the distance function representation of the current predictions of the DNN(s) 202, and the dark solid lines or dots may represent the 2D projections from the map data 108. A cost may be computed for each point of the 2D projections, and an average cost may be determined using the relative costs from each point. For example, the cost at point 1020A may be high, or max, and the cost at point 1020B may be low—e.g., because the cost at point 1020B lines up with a center of the distance function representation of the lane divider. This cost may correspond to the geometric cost for the current pose of the current frame. Similarly, semantic labels corresponding to the 2D projected points from the map data 108 may be compared against semantic information of the projections, as illustrated in FIG. 10C. As such, where a point does not semantically match, the cost may be set to a max, and where a point does match, the cost may be set to a min. These values may be averaged—or otherwise weighted—to determine the final semantic cost. The final semantic cost and the final geometric cost may be weighted to determine a final overall cost for updating the cost space (e.g., cost space 902). For example, for each point, the semantic cost may have to be low for the corresponding geometric cost to have a vote. As such, where semantic information does not match, the cost for that particular point may be set to a max. Where the semantic information does match, the cost may be set to a minimum, or zero, for the semantic cost, and the final cost for that point may represent the geometric cost. Ultimately, the point in the cost space corresponding to the current pose may be updated to reflect the final cost of all of the 2D projected points.

Figure 11B:
FIGS. 11A-11B depict example visualizations for sampling a pose of a sampled cost space for RADAR based localization, in accordance with some embodiments of the present disclosure.
Figure 11A:
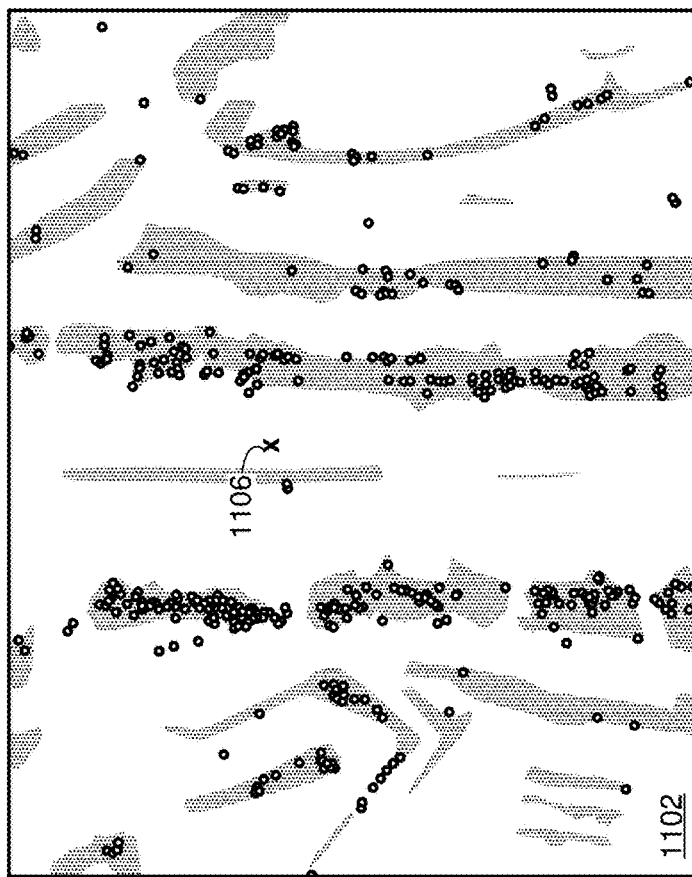

As another example, with respect to FIGS. 11A-11B, RADAR based cost spaces (e.g., corresponding to RADAR layers of the fused HD map) may be generated using distance functions corresponding to the map data 108 (e.g., a top down projection of the RADAR point cloud with each point converted to a distance function representation). For example, at a given time step or frame, the map data 108 corresponding to the RADAR point cloud—as represented in visualization 1102—may be converted to a distance function, as represented in visualization 1104—e.g., where each RADAR point may have a zero cost at its center with costs increasing to a max cost as the distance from the center increases. For example, with respect to visualization 1104, the white portions of the visualization 1102 may correspond to a max cost. In order to compute the cost for the current pose—e.g., represented by pose indicator 1106—the RADAR data from the sensor data 102 may be converted to a RADAR point cloud and compared against the distance function representation of the RADAR point cloud (e.g., as represented in visualization 1104). The hollow circles in the visualization 1102 and 1104 may correspond to the current RADAR point cloud predictions of the vehicle 1500. As such, for each current RADAR point, a cost may be determined by comparing each current RADAR point to the distance function RADAR values that the current RADAR point corresponds to, or lands on. As such, a current RADAR point 1108A may have a max cost while a current RADAR point 1108B may have low cost—e.g., because the point 1108B lands closely to a center of a point from the RADAR point cloud in the map data 108. Ultimately, an average or other weighting of each of the costs from the current RADAR points may be computed, and the final cost value may be used to update the cost space for the currently sampled pose.

As another example, with respect to FIGS. 12A-12D, LiDAR based cost spaces (e.g., corresponding to LiDAR layers of the fused HD map) may be generated using distance functions on a (sliced) LiDAR point cloud, LiDAR intensity maps, and/or LiDAR elevation maps. For example, for a given pose—as indicated by pose indicator 1210—current or real-time LiDAR data (e.g., corresponding to the sensor data 102) may be generated and converted into values for comparison against an intensity map generated from the map data 108 (e.g., as illustrated in visualization 1202), converted into values for comparison to an elevation map generated from the map data 108 (e.g., as illustrated in visualization 1204), and a LiDAR point cloud of the map data 108 (e.g., as illustrated in visualization 1206) may be converted to a distance function representation of the same (e.g., as illustrated in from visualization 1208) for comparison to a current LiDAR point cloud corresponding to the sensor data 102. The LiDAR point cloud, in embodiments, may correspond to a slice of the LiDAR point cloud, and one or more separate slices may be converted to a distance function representation and used to compute cost. The costs from elevation comparison, intensity comparison, and distance function comparison may be averaged or otherwise weighted to determine the final cost corresponding to the current pose on the LiDAR based cost map.

For example, with respect to FIG. 12A, a LiDAR layer of the fused HD map represented by the map data 108 may include a LiDAR intensity (or reflectivity) image (e.g., a top down projection of the intensity values from the fused LiDAR data). For example, painted surfaces, such as lane markers, may have higher reflectivity, and this reflection intensity may be captured and used to compare the map data 108 to the current LiDAR sensor data. The current LiDAR sensor data from the vehicle 1500 may be converted to a LiDAR intensity representation 1212A and compared against the LiDAR intensity image from the map data 108 at the current pose. For points of the current LiDAR intensity representation 1212A that have a similar or matching intensity value as the points from the map data 108, the cost may be low, and where the intensity value does not match, the cost may be higher. For example, zero difference in intensity for a point may correspond to zero cost, a threshold difference and above may correspond to a max cost, and between the zero difference and the threshold difference the cost may be increase from zero cost to the max cost. The cost for each point of the current LiDAR intensity representation 1212A may be averaged or otherwise weighted with each other point to determine the cost for the LiDAR intensity comparison.

As another example, with respect to FIG. 12B, a LiDAR layer of the fused HD map represented by the map data 108 may include a LiDAR elevation image (e.g., a top down projection of the elevation values, resulting in a top down depth map). The current LiDAR sensor data from the vehicle 1500 may be converted to a LiDAR elevation representation 1212B and compared against the LiDAR elevation image generated from the map data 108 at the current pose. For points of the current LiDAR elevation representation 1212B that have a similar or matching elevation value as the points from the map data 108, the cost may be low, and where the elevation value does not match, the cost may be higher. For example, zero difference in elevation for a point may correspond to zero cost, a threshold difference and above may correspond to a max cost, and between the zero difference and the threshold difference the cost may be increase from zero cost to the max cost. The cost for each point of the current LiDAR elevation representation 1212B may be averaged or otherwise weighted with each other point to determine the cost for the LiDAR elevation comparison.

In some embodiments, because the elevation values from the map data 108 may be determined relative to an origin 652 of a current road segment 610, and the elevation values from the current LiDAR elevation representation 1212B may correspond to an origin 820 or reference point of the vehicle 1500, a transform may be executed to compare the values from the LiDAR elevation representation 1212B to the LiDAR elevation image from the map data 108. For example, where a point from the LiDAR elevation representation 1212B has an elevation value of 1.0 meters (e.g., 1.0 meters up from an origin of the vehicle 1500), a point of the map data 108 that corresponds to the point from the representation 1212B has a value of 1.5 meters, and a difference in elevation between the origin 820 of the vehicle 1500 and the origin 652 of the road segment 610 of 0.5 meters (e.g., the origin 652 of the road segment is 0.5 meters higher than the origin 820 of the vehicle 1500), the actual difference between the point from the map data 108 and the representation 1212B may be 0.0 meters (e.g., 1.5 meters—0.5 meters=1 meter as the final value for the point from the map data 108 relative to the origin 820 of the vehicle 1500). Depending on the embodiment, the transform between the values of the map data 108 or the representation 1212B may correspond to a transform from the road segment origin 652 to the vehicle origin 820, from the vehicle origin 820 to the road segment origin 652, or a combination thereof.

As a further example, with respect to FIGS. 12C-12D, a LiDAR layer of the fused HD map represented by the map data 108 may include a sliced LiDAR point cloud (e.g., corresponding to a ground plane slice, a giraffe plane slice, another defined slice, such as a one meter thick slice extending from two meters to three meters from the ground plane, etc.). In some embodiments, the point cloud may not be sliced and may instead represent an entirety of the point cloud. The sliced LiDAR point cloud (e.g., as illustrated in visualization 1206) may be converted to a distance function representation of the same (e.g., as illustrated in visualization 1208). For example, each point from the LiDAR point cloud may be converted such that a center of the point has zero cost and the cost increases the further from the center of the point until some max cost (e.g., as represented by the white regions of the visualization 1208). In order to compute the cost for the current pose—e.g., represented by pose indicator 1210—the LiDAR data from the sensor data 102 may be converted to a LiDAR point cloud (or a corresponding slice thereof) and compared against the distance function representation of the LiDAR point cloud (e.g., as represented in visualization 1208). The hollow circles in the visualizations 1206 and 1208 may correspond to the current LiDAR point cloud predictions of the vehicle 1500. As such, for each current LiDAR point, a cost may be determined by comparing each current LiDAR point to the distance function LiDAR values that the current LiDAR point corresponds to, or lands on. As such, a current LiDAR point 1214A may have a max cost while a current LiDAR point 1214B may have low cost—e.g., because the point 1214B lands closely to a center of a point from the LiDAR point cloud in the map data 108. Ultimately, an average or other weighting of each of the costs from the current LiDAR points may be computed, and the final cost value may be used—in addition to the cost values from the elevation and intensity comparison—to update the cost space for the currently sampled pose.

In some embodiments, at least one of the LiDAR based cost space sampling 802, cost space aggregation 804, and/or filtering 806 may be executed on a GPU—e.g., a discrete GPU, a virtual GPU, etc. —and/or using one or more parallel processing units. For example, for camera-based cost spaces (e.g., described with respect to FIGS. 10A-10C), the detection information and the map data 108 projections may be stored as textures in memory on or accessible to the GPU, and the comparison may correspond to a texture lookup executed using the GPU. Similarly, with respect to LiDAR and/or RADAR, the comparison may correspond to a texture lookup. In addition, in some embodiments, parallel processing may be used to execute two or more cost spaces in parallel—e.g., a first cost space corresponding to LiDAR and a second cost space corresponding to RADAR may be generated in parallel using different GPU and/or parallel processing unit resources. For example, the individual localizations 808 may be computed in parallel such that run time of the system for fused localization is reduced. As a result, these processes may be executed more efficiently than if executed on a CPU alone.

Referring again to FIG. 8A, after cost space sampling 802 is executed for a single frame or time step, and for any number of sensor modalities, cost space aggregation 804 may be executed. Cost space aggregation 804 may be executed separately for each sensor modality—e.g., a LiDAR based cost space aggregation, a RADAR based cost space aggregation, a camera based cost space aggregation, etc. For example, cost space aggregation 804 may aggregate the cost spaces computed for any number of frames (e.g., 25 frames, 80 frames, 100 frames, 300 frames, etc.). To aggregate the cost spaces, each prior cost space that has been computed may be ego-motion compensated to correspond to the current frame. For example, rotation and/or translation of the vehicle 1500 relative to the current pose of the vehicle 1500 and from each previous frame included in the aggregation may be determined, and used to carry forward the cost space values from the prior frames. In addition to transforming prior cost spaces based on ego-motion, the cost spaces may also be transformed—e.g., using the transforms from one road segment to a next road segment, such as those described with respect to FIG. 6I—such that each cost space corresponds to an origin 652 of a current road segment 610 of the fused HD map. For example, some number of the cost spaces to be aggregated may have been generated while the vehicle 1500 was localizing relative to a first road segment 610, and some other number of cost spaces to be aggregated may have been generated while the vehicle 1500 is localizing relative to a second road segment 610. As such, the cost spaces from the first or prior road segment 610 may be transformed such that the cost space values are relative to the second or current road segment 610. Once in the same reference frame corresponding to a current frame and a current road segment 610, the cost spaces may be aggregated. As a result, and with reference to FIG. 9B, the ego-motion of the vehicle 1500 over time may help disambiguate the individual cost spaces such that the aggregate cost space 904 may be generated.

The aggregate cost space 904 may then undergo filtering 806—e.g., using a Kalman filter or another filter type—to determine an ellipsoid 910 corresponding to a computed location of the vehicle 1500 with respect to the current road segment 610. Similar to the description above with respect to the transforms for the aggregate cost spaces 904, filtered cost space 906 may also undergo transforms to compensate for ego-motion and road segment switching. The ellipsoid 910 may indicate a current location relative to the current road segment 610 of the vehicle 1500, and this process may be repeated at each new frame. The result may be individual localizations based on the sensor modality that the ellipsoid 910 was computed for, and multiple ellipsoids 910 may be computed at each frame—e.g., one for each sensor modality.

Figure 13:
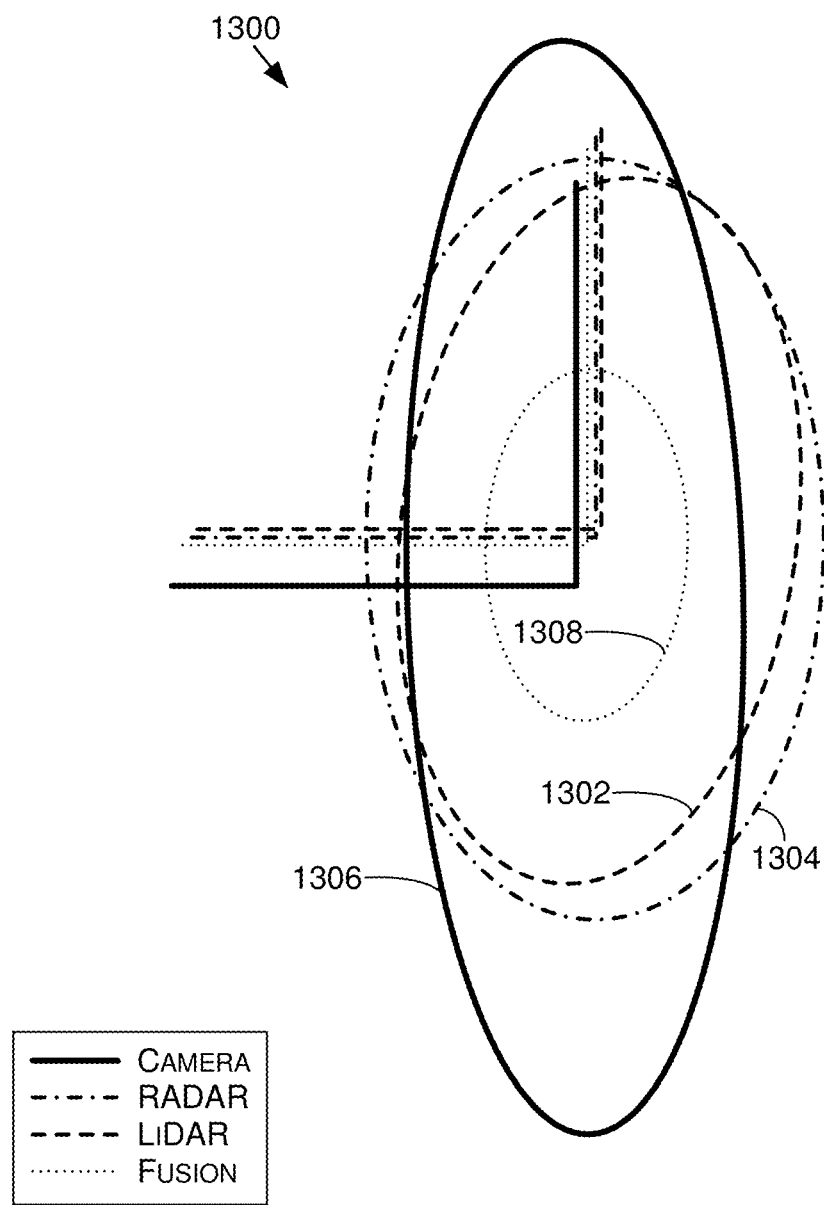
FIG. 13 depicts an example of fusing a plurality of localization results to generate a final localization result, in accordance with some embodiments of the present disclosure.

Localization fusion 810 may then be executed on the individual localizations 808 to generate a final localization result. For example, with reference to FIG. 13, the individual localizations 808 may correspond to a LiDAR based localization 1302 (e.g., represented by an ellipsoid and an origin in visualization 1300), a RADAR based localization 1304, a camera based localization 1306, other sensor modality localizations (not shown), and/or a fused localization 1308. Although only a single localization per sensor modality is described herein, this is not intended to be limiting. In some embodiments, there may be more than one localization result for different sensor modalities. For example, a vehicle 1500 may be localized with respect to a first camera (e.g., a forward facing camera) and may separately be localized with respect to a second camera (e.g., a rearward facing camera). In such an example, the individual localizations 808 may include a first camera based localization and a second camera based localization. In some embodiments, the fused localization 1308 may correspond to the fusion of the individual localizations 808 at the current frame and/or may correspond to a prior fused localization result(s) from one or more prior frames carried forward—e.g., based on ego-motion—to the current frame. As such, the fused localization 1308 for a current frame may take into account individual localizations 808 and prior fused localization results, in embodiments, to advance a current localization state through frames.

To compute the fused localization 1308 for a current frame, an agreement/disagreement analysis may be executed on the individual localizations 808. For example, in some embodiments, a distance threshold may be used to determine clusters of individual localizations 808, and the cluster with the least inner-cluster covariance may be selected for fusion. The individual localizations 808 within the selected cluster may then be averaged or otherwise weighted to determine the fused localization 1308 for the current frame. In some embodiments, a filter—such as a Kalman filter—may be used to generate the fused localization 1308 of the clustered individual localizations 808 for a current frame. For example, a Kalman filter, where employed, may not deal with outliers well, so a heavy outlier may have an undesirable impact on the final result. As such, the clustering approach may aid in filtering out or removing the outliers such that the Kalman filter based fusion is more accurate. In some embodiments, such as where a prior fusion result is carried forward to a current frame as an individual localization 808, the fusion result from a prior frame may drift. For example, once the current individual localizations 808 are different enough from the fusion result (e.g., where the fusion result may be filtered out of the cluster), the fusion result may be re-initialized for the current frame, and the re-initialized fusion result may then be carried forward to subsequent frames until a certain amount of drift is again detected.

In some embodiments, the fused localization 1308 may be determined by factoring in each of the individual localizations 808. For example, instead of grouping the results into clusters, each individual localization 808 may be weighted based on a distance evaluation. For example, covariance may be computed for the individual localizations 808, and the individual localizations 808 with the highest covariance (e.g., corresponding to the greatest outliers) may be weighted less for determining the fused localization 1308. This may be executed using a robustified mean such that outliers do not have an undesirable impact on the fused localization 1308. For example, a distance for each individual localization 808 to the robustified mean may be computed, and the greater the distance the less weight the individual localization 808 may have in determining the fused localization 1308.

The fused localization 1308 for the current frame may then be used to localize the vehicle 1500 with respect to the road segment 610 of the fused HD map (represented by the map data 108) and/or with respect to the global coordinate system. For example, because the road segment 610 may have a known global location, the localization of the vehicle 1500 to the road segment 610 may have a corresponding global localization result. In addition, because the local or relative localization to the road segment 610 is more accurate than a global or GNSS localization result alone, the planning and control for the vehicle 1500 may be more reliable and safer than in solely GNSS based localization systems.

Figure 14:
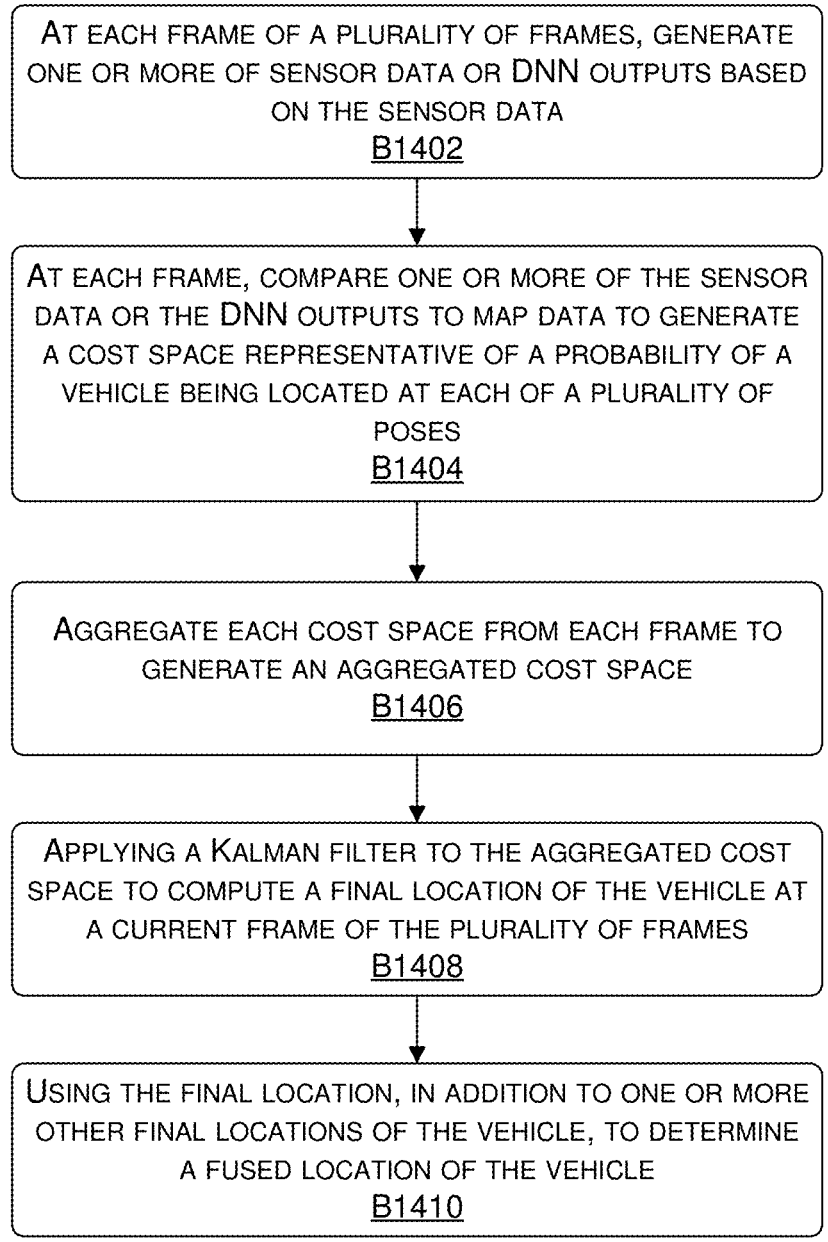
FIG. 14 is a flow diagram showing a method for localization, in accordance with some embodiments of the present disclosure.

Now referring to FIG. 14, each block of method 1400, described herein, comprises a computing process that may be performed using any combination of hardware, firmware, and/or software. For instance, various functions may be carried out by a processor executing instructions stored in memory. The method 1400 may also be embodied as computer-usable instructions stored on computer storage media. The method 1400 may be provided by a standalone application, a service or hosted service (standalone or in combination with another hosted service), or a plug-in to another product, to name a few. In addition, the method 1400 is described, by way of example, with respect to the process 110 of FIG. 8A. However, this method 1400 may additionally or alternatively be executed within any one process by any one system, or any combination of processes and systems, including, but not limited to, those described herein.

FIG. 14 is a flow diagram showing a method 1400 for localization, in accordance with some embodiments of the present disclosure. The method 1400, at block B1402, includes, at each frame of a plurality of frames, generating one or more of sensor data or DNN outputs based on the sensor data. For example, at each frame of some buffered number of frames or time steps (e.g., 25, 50, 70, 100, etc.), the sensor data 102 and/or the outputs 204 may be computed. For example, where LiDAR based localization or RADAR based localization are used, the sensor data 102 may be generated and/or processed (e.g., to generate elevation representations, intensity representations, etc.) at each frame or time step. Where camera based localization is used, the sensor data 102 may be applied to a DNN(s) 202 to generate the outputs 204 corresponding to landmarks.

The method 1400, at block B1404, includes, at each frame, comparing one or more of the sensor data or the DNN outputs to map data to generate a cost space representing a probability of a vehicle being located at each of a plurality of poses. For example, cost space sampling 802 may be executed at each frame to generate the cost space corresponding to the particular sensor data modality. The comparison between the map data 108 and the sensor data 102 and/or the outputs 204 may include comparing LiDAR elevation information, LiDAR intensity information, LiDAR point cloud (slice) information, RADAR point cloud information, camera landmark information (e.g., comparing 2D projections of 3D landmarks locations from the map data 108 to the current real-time predictions of the DNN(s) 202), etc.

The method 1400, at block B1406, includes aggregating each cost space from each frame to generate an aggregated cost space. For example, cost space aggregation 804 may be executed on some number of buffered or prior cost spaces to generate an aggregate cost space. The aggregation may include ego-motion transformations of prior cost spaces and/or road segment transformations of prior cost spaces that were generated relative to a road segment 610 other than a current road segment 610 of the vehicle 1500.

The method 1400, at block B1408, includes applying a Kalman filter to the aggregated cost space to compute a final location of the vehicle at a current frame of the plurality of frames. For example, filtering 806 may be applied to the aggregate cost space to generate an ellipsoid or other representation of an estimated location of the vehicle 1500 with respect to a particular sensor modality at a current frame or time step.

Blocks B1402-B1408 of the process 1408 may be repeated—in parallel, in embodiments—for any number of different sensor modalities such that two or more ellipsoids or locations predictions of the vehicle 1500 are generated.

The method 1400, at block B1410, includes using the final location, in addition to one or more other final locations of the vehicle, to determine a fused location of the vehicle. For example, the ellipsoids of other representations that are output after filtering 806 for different sensor modalities may undergo localization fusion 810 to generate a final fused localization result. In some embodiments, as described herein, the prior fused localization results from prior frames or time steps may also be used when determining a current fused localization result.

Example Autonomous Vehicle

Figure 15A:
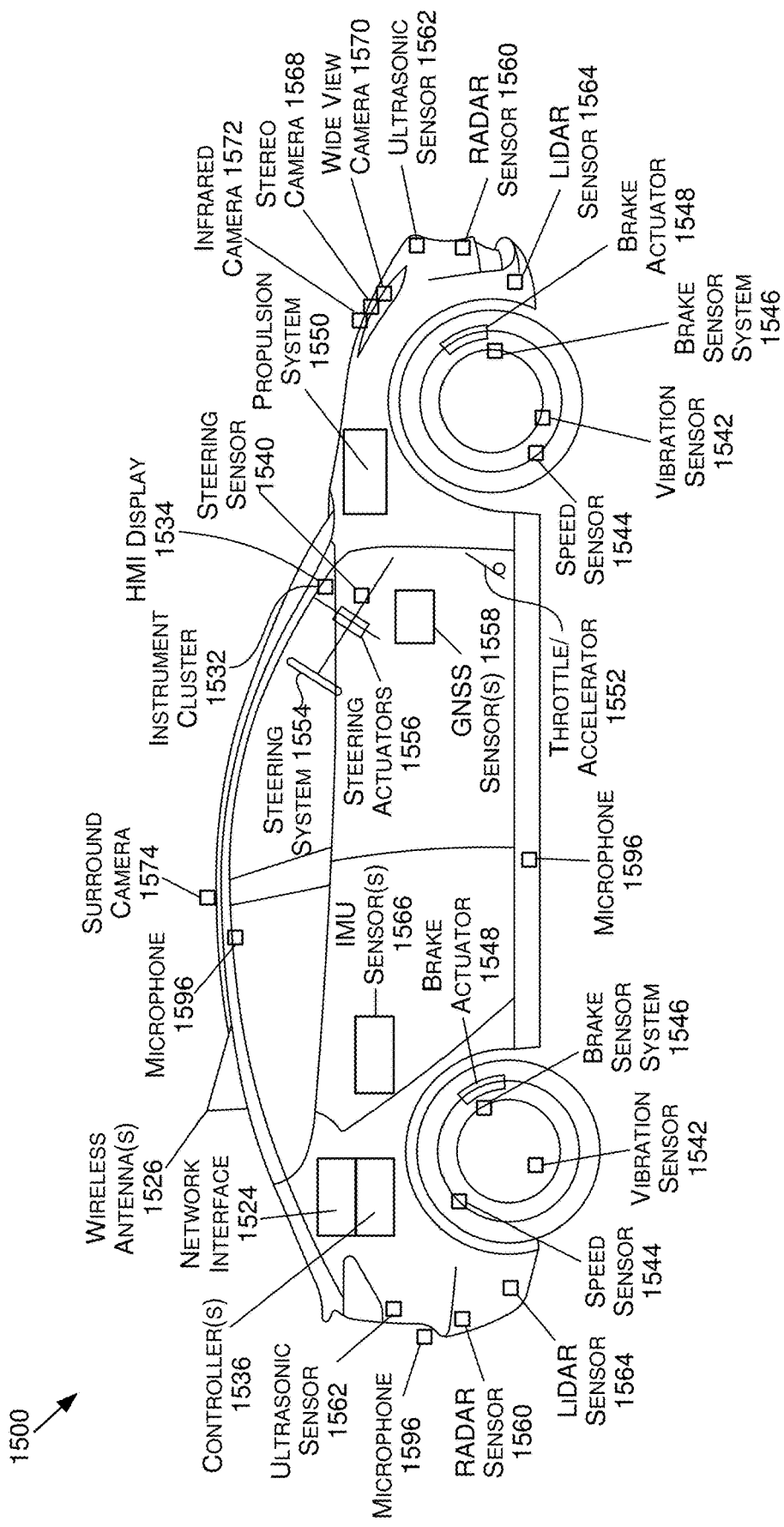
FIG. 15A is an illustration of an example autonomous vehicle, in accordance with some embodiments of the present disclosure.

FIG. 15A is an illustration of an example autonomous vehicle 1500, in accordance with some embodiments of the present disclosure. The autonomous vehicle 1500 (alternatively referred to herein as the "vehicle 1500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. For example, the vehicle 1500 may be capable of conditional automation (Level 3), high automation (Level 4), and/or full automation (Level 5), depending on the embodiment.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems sensor(s) 1558 (e.g., Global Positioning System sensor(s)), RADAR sensor(s) 1560, ultrasonic sensor(s) 1562, LiDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the HD map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over LTE, WCDMA, UMTS, GSM, CDMA2000, etc. The wireless antenna(s) 1526 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LP-WANs), such as LoRaWAN, SigFox, etc.

Figure 15B:
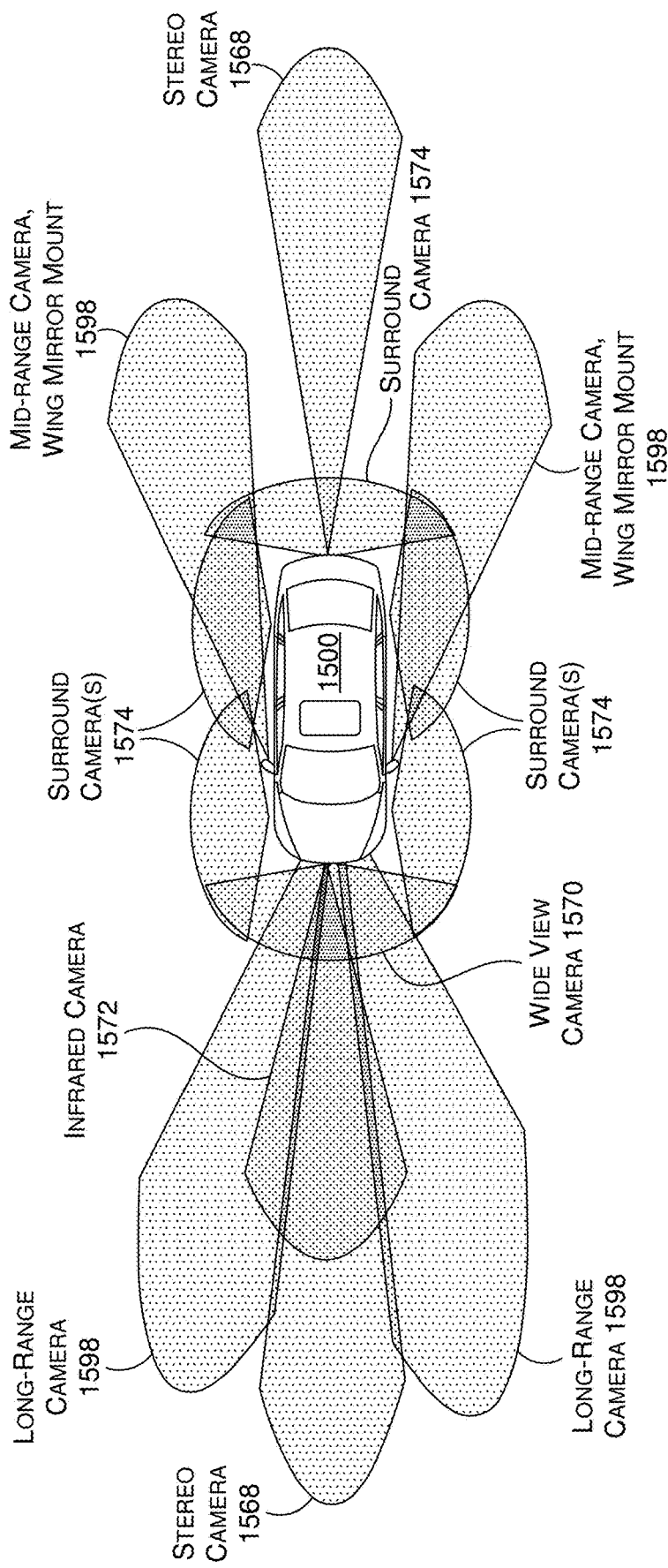
FIG. 15B is an example of camera locations and fields of view for the example autonomous vehicle of FIG. 15A, in accordance with some embodiments of the present disclosure.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may any number of wide-view cameras 1570 on the vehicle 1500. In addition, long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

One or more stereo cameras 1568 may also be included in a front-facing configuration. The stereo camera(s) 1568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568, infrared camera(s) 1572, etc.), as described herein.

Figure 15C:
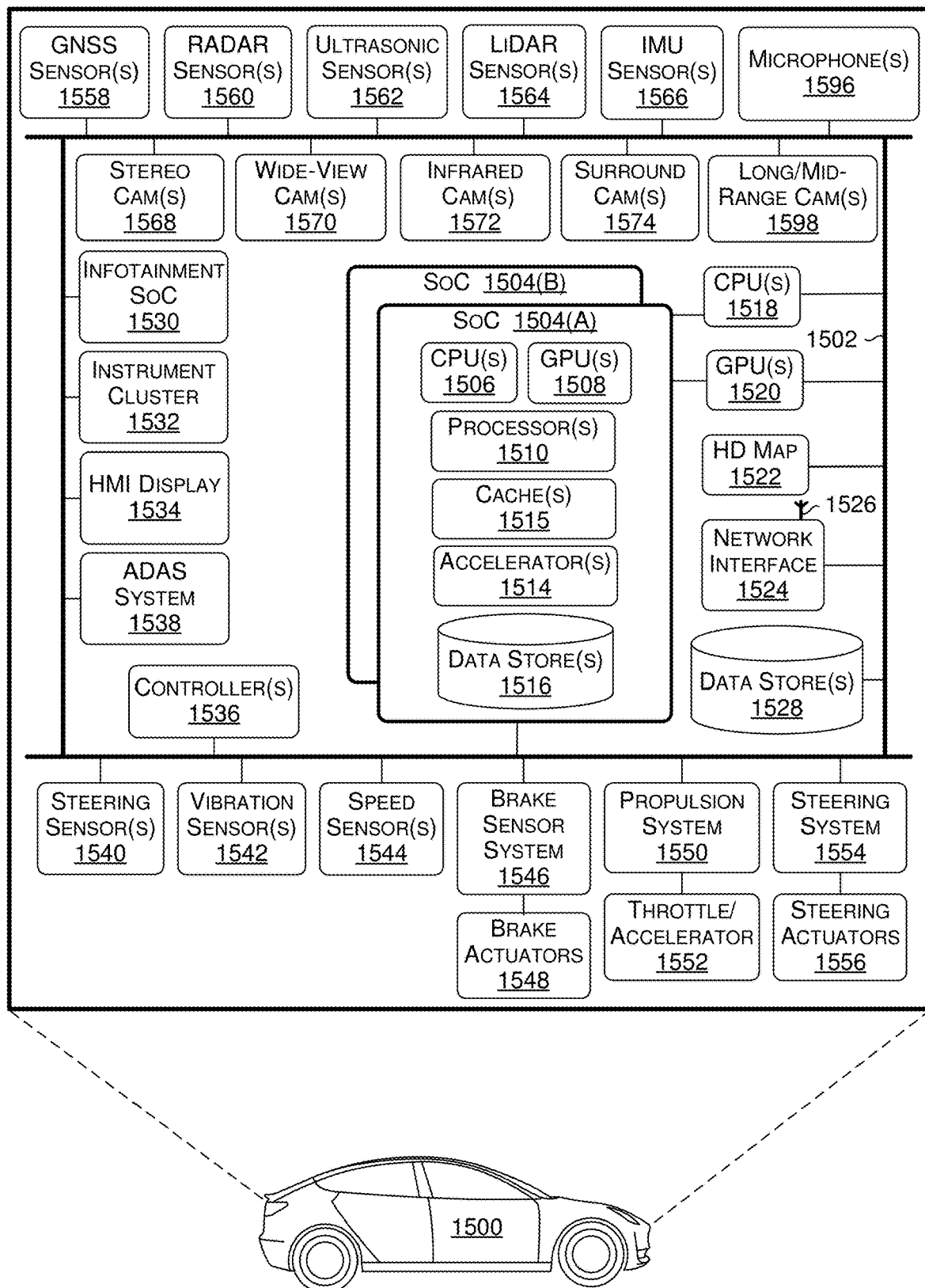
FIG. 15C is a block diagram of an example system architecture for the example autonomous vehicle of FIG. 15A, in accordance with some embodiments of the present disclosure.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX").

The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDRS).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LiDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1512 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LiDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS, assisted GPS sensors, differential GPS (DGPS) sensors, etc.), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LiDAR sensor(s) 1564. The LiDAR sensor(s) 1564 may be used for object and pedestrian detection, emergency braking, collision avoidance, and/or other functions. The LiDAR sensor(s) 1564 may be functional safety level ASIL B. In some examples, the vehicle 1500 may include multiple LiDAR sensors 1564

(e.g., two, four, six, etc.) that may use Ethernet (e.g., to provide data to a Gigabit Ethernet switch).

In some examples, the LiDAR sensor(s) 1564 may be capable of providing a list of objects and their distances for a 360-degree field of view. Commercially available LiDAR sensor(s) 1564 may have an advertised range of approximately 1500 m, with an accuracy of 2 cm-3 cm, and with support for a 1500 Mbps Ethernet connection, for example. In some examples, one or more non-protruding LiDAR sensors 1564 may be used. In such examples, the LiDAR sensor(s) 1564 may be implemented as a small device that may be embedded into the front, rear, sides, and/or corners of the vehicle 1500. The LiDAR sensor(s) 1564, in such examples, may provide up to a 120-degree horizontal and 35-degree vertical field-of-view, with a 200 m range even for low-reflectivity objects. Front-mounted LiDAR sensor(s) 1564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LiDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1500), while the I2V communication concept provides information about traffic further ahead. CACC systems may include either or both I2V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, Wi-Fi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

Figure 15D:
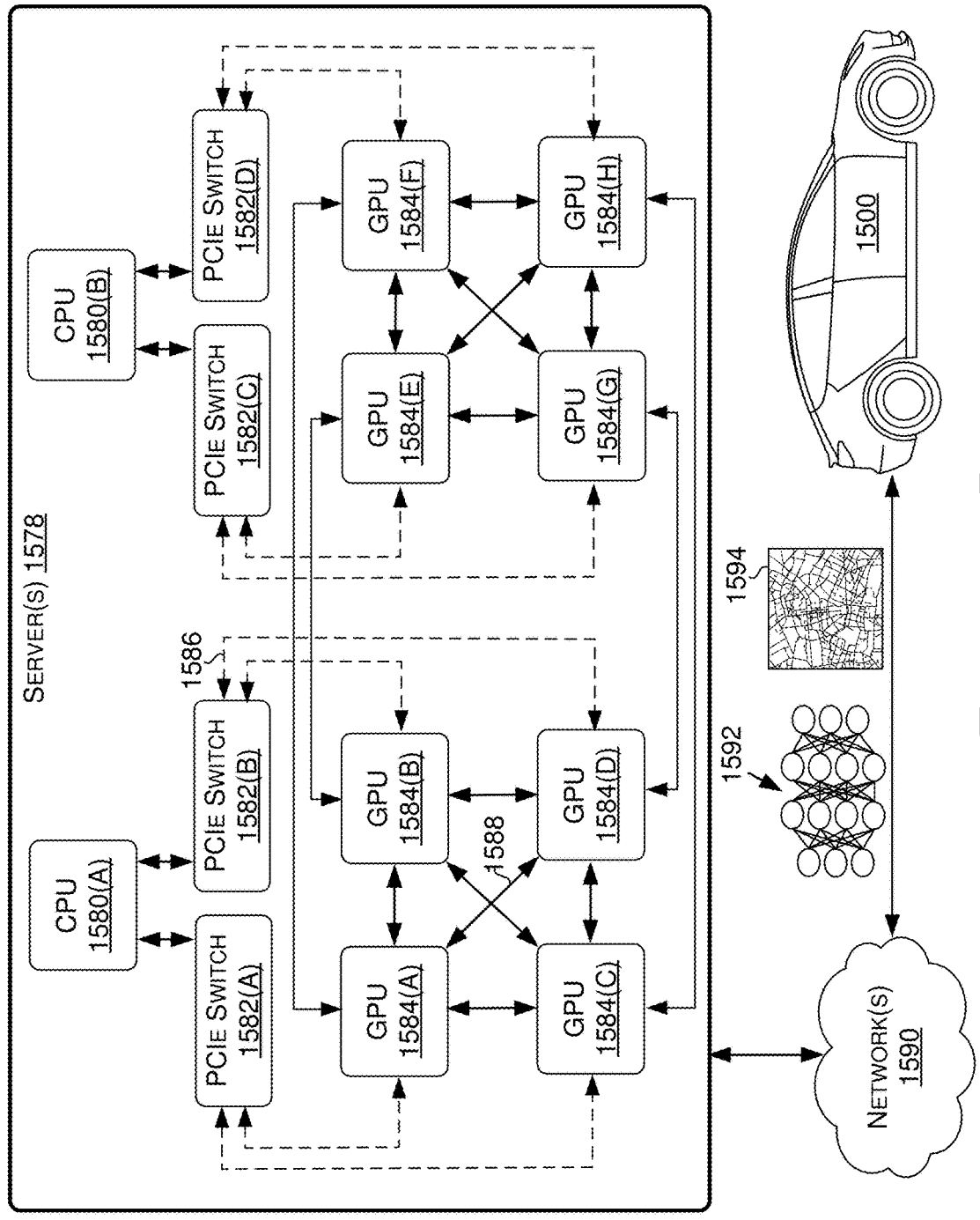
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1584(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA' s TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 16:
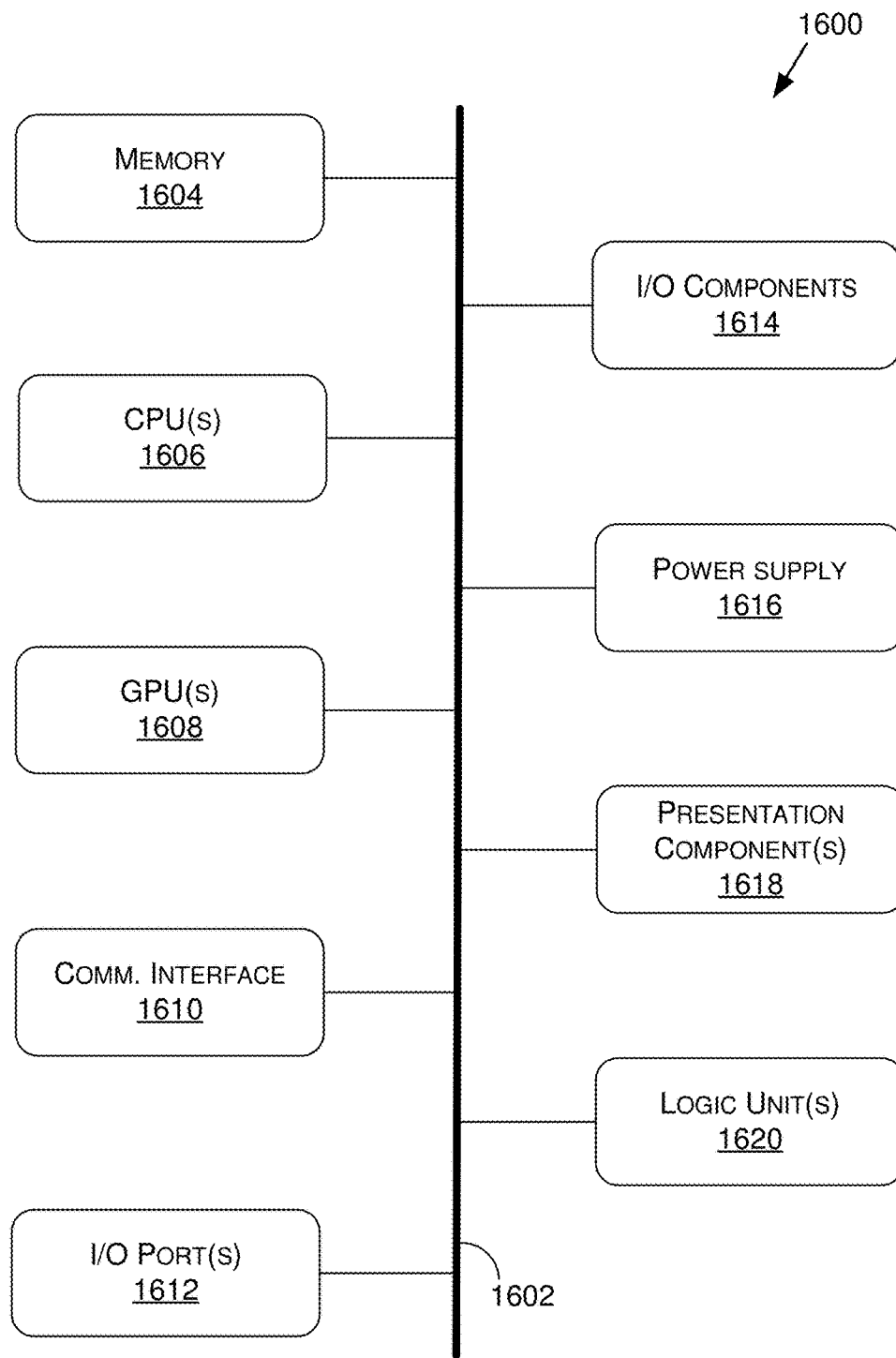
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, one or more presentation components 1618 (e.g., display(s)), and one or more logic units 1620. In at least one embodiment, the computing device(s) 1600 may comprise one or more virtual machines (VMs), and/or any of the components thereof may comprise virtual components (e.g., virtual hardware components). For non-limiting examples, one or more of the GPUs 1608 may comprise one or more vGPUs, one or more of the CPUs 1606 may comprise one or more vCPUs, and/or one or more of the logic units 1620 may comprise one or more virtual logic units. As such, a computing device(s) 1600 may include discrete components (e.g., a full GPU dedicated to the computing device 1600), virtual components (e.g., a portion of a GPU dedicated to the computing device 1600), or a combination thereof.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606 and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1610 may include one or more receivers, transmitters, and/or transceivers that enable the computing device 1600 to communicate with other computing devices via an electronic communication network, included wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1612 may enable the computing device 1600 to be logically coupled to other devices including the I/O components 1614, the presentation component(s) 1618, and/or other components, some of which may be built in to (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, etc.), and output the data (e.g., as an image, video, sound, etc.).

Example Data Center

Figure 17:
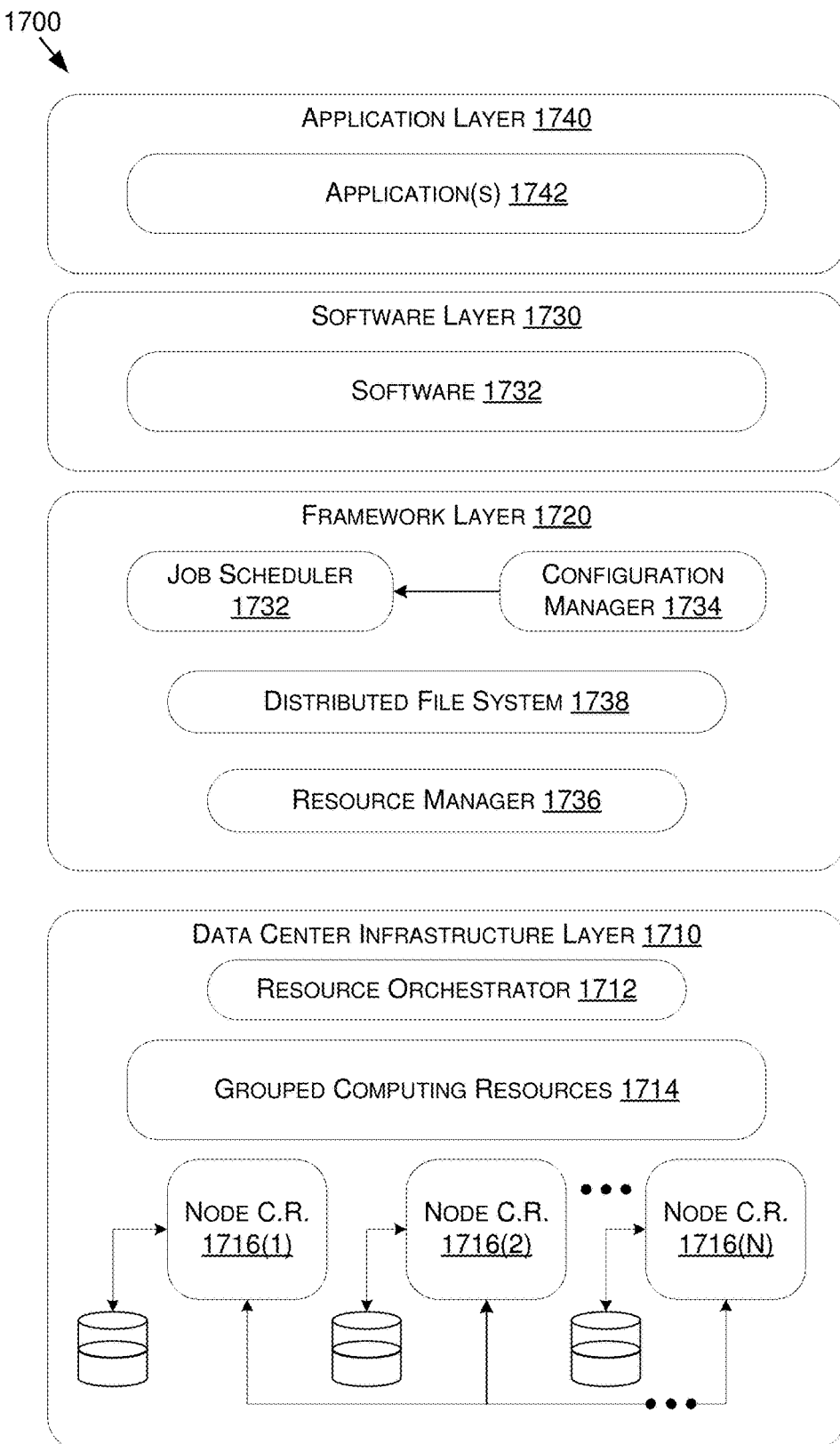
FIG. 17 is a block diagram of an example data center suitable for use in implementing some embodiments of the present disclosure.

FIG. 17 illustrates an example data center 1700 that may be used in at least one embodiments of the present disclosure. The data center 1700 may include a data center infrastructure layer 1710, a framework layer 1720, a software layer 1730, and/or an application layer 1740.

As shown in FIG. 17, the data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1716(1)-1716(N) may correspond to a server having one or more of the above-mentioned computing resources. In addition, in some embodiments, the node C.R.s 1716(1)-17161(N) may include one or more virtual components, such as vGPUs, vCPUs, and/or the like, and/or one or more of the node C.R.s 1716(1)-1716(N) may correspond to a virtual machine (VM).

In at least one embodiment, grouped computing resources 1714 may include separate groupings of node C.R.s 1716 housed within one or more racks (not shown), or many racks housed in data centers at various geographical locations (also not shown). Separate groupings of node C.R.s 1716 within grouped computing resources 1714 may include grouped compute, network, memory or storage resources that may be configured or allocated to support one or more workloads. In at least one embodiment, several node C.R.s 1716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1722 may configure or otherwise control one or more node C.R.s 1716(1)-1716(N) and/or grouped computing resources 1714. In at least one embodiment, resource orchestrator 1722 may include a software design infrastructure ("SDI") management entity for the data center 1700. The resource orchestrator 1722 may include hardware, software, or some combination thereof.

In at least one embodiment, as shown in FIG. 17, framework layer 1720 may include a job scheduler 1732, a configuration manager 1734, a resource manager 1736, and/or a distributed file system 1738. The framework layer 1720 may include a framework to support software 1732 of software layer 1730 and/or one or more application(s) 1742 of application layer 1740. The software 1732 or application (s) 1742 may respectively include web-based service software or applications, such as those provided by Amazon Web Services, Google Cloud and Microsoft Azure. The framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1732 may include a Spark driver to facilitate scheduling of workloads supported by various layers of data center 1700. The configuration manager 1734 may be capable of configuring different layers such as software layer 1730 and framework layer 1720 including Spark and distributed file system 1738 for supporting large-scale data processing. The resource manager 1736 may be capable of managing clustered or grouped computing resources mapped to or allocated for support of distributed file system 1738 and job scheduler 1732. In at least one embodiment, clustered or grouped computing resources may include grouped computing resource 1714 at data center infrastructure layer 1710. The resource manager 1036 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716(1)-1716(N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. Self-modifying actions may relieve a data center operator of data center 1700 from making possibly bad configuration decisions and possibly avoiding underutilized and/or poor performing portions of a data center.

The data center 1700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1700. In at least one embodiment, trained or deployed machine learning models corresponding to one or more neural networks may be used to infer or predict information using resources described above with respect to the data center 1700 by using weight parameters calculated through one or more training techniques, such as but not limited to those described herein.

In at least one embodiment, the data center 1700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1600 of FIG. 16—e.g., each device may include similar components, features, and/or functionality of the computing device(s) 1600. In addition, where backend devices (e.g., servers, NAS, etc.) are implemented, the backend devices may be included as part of a data center 1700, an example of which is described in more detail herein with respect to FIG. 17.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Clauses

In one or more embodiments, a method comprises, for at least two frames of a plurality of frames corresponding to a drive of a vehicle: generating sensor data using one or more sensors of the vehicle; computing, using one or more neural networks (NNs) and based at least in part on the sensor data, outputs indicative of locations of landmarks; converting the locations to three-dimensional (3D) world space locations relative to an origin of the vehicle; encoding the 3D world space locations to generate encoded data corresponding to the frame; and transmitting the encoded data to a server to cause the server to generate a map including the landmarks.

In one or more embodiments, the sensor data includes image data representative of an image; one or more of the outputs are computed in two-dimensional (2D) image space; and the converting the locations includes converting 2D image space locations to the 3D world space locations based at least in part on at least one of intrinsic camera parameters or extrinsic camera parameters corresponding to a camera that generated the image data.

In one or more embodiments, the landmarks include one or more of: lane dividers; road boundaries; signs; poles; wait conditions; vertical structures; other road users; static objects; or dynamic objects.

In one or more embodiments, the outputs are further representative of at least one of a pose of the landmarks or geometry of the landmarks.

In one or more embodiments, the outputs are further representative of semantic information corresponding to the landmarks.

In one or more embodiments, the landmarks include lane dividers, and the method further comprises: for at least two lane dividers, combining detections of each of the at least two lane dividers to generate a continuous lane divider representation.

In one or more embodiments, the method further comprises, for each frame of the at least two frames: determining, based at least in part on the sensor data, a translation and a rotation of the vehicle relative to a previous frame of the frame, wherein the encoding further includes encoding the rotation and the translation.

In one or more embodiments, the method further comprises: compressing data representative of the rotation and the translation using a delta compression algorithm to generate delta compressed data, wherein the encoding the rotation and the translation further includes encoding the delta compressed data.

In one or more embodiments, the sensor data includes global navigation satellite system (GNSS) data, and the method further comprises, for each frame of the at least two frames: determining, based at least in part on the GNSS data, a global location of the vehicle, wherein the encoding further includes encoding the global location.

In one or more embodiments, the sensor data includes LiDAR data, and the method further comprises: filtering out dynamic objects from the LiDAR data to generate filtered LiDAR data, wherein the encoded data is further representative of the filtered LiDAR data.

In one or more embodiments, the encoded data further represents the sensor data, and the sensor data includes one or more of: LiDAR data; RADAR data; ultrasound data; ultrasonic data; GNSS data; image data; or inertial measurement unit (IMU) data.

In one or more embodiments, the method further comprises: receiving, from the server, data representative of a request for the locations of the landmarks, wherein the transmitting the encoded data is based at least in part on the request.

In one or more embodiments, the method further comprises: determining to generate each frame of the at least two frames based at least in part on one or more of a time threshold being met or a distance threshold being met.

In one or more embodiments, the encoded data is encoded as serialized structured data using protocol buffers.

In one or more embodiments, the server comprises at least one of: a data center server; a cloud server; or an edge server.

In one or more embodiments, a method comprises, for at least two frames of a plurality of frames corresponding to a drive of a vehicle: generating one or more of LiDAR data or RADAR data using one or more sensors of the vehicle; filtering out points corresponding to one or more of the LiDAR data or the RADAR data to generate filtered data; determining a pose of the vehicle relative to a prior frame; encoding the filtered data and the pose to generate encoded data; and transmitting the encoded data to a cloud server to cause the cloud server to generate, using the pose, at least one of a LiDAR layer of a map or a RADAR layer of the map.

In one or more embodiments, the filtering out includes at least one of dynamic object filtering or de-duplication.

In one or more embodiments, the method further comprises: generating sensor data using one or more sensors of the vehicle; computing, using one or more neural networks (NNs) and based at least in part on the sensor data, outputs indicative of locations of landmarks, wherein the transmitting further includes transmitting data representative of the locations of the landmarks.

In one or more embodiments, the encoding the filtered data includes encoding the filtered data using octrees.

In one or more embodiments, the method further comprises compressing the filtered data using quantization.

In one or more embodiments, a system comprises: one or more sensors; one or more processors; and one or more memory devices storing instructions thereon that, when executed by the one or more processors, cause the one or more processors to execute operations comprising: generating, at a current frame, sensor data using the one or more sensors; computing, using one or more neural networks (NNs) and based at least in part on the sensor data, outputs indicative of locations of landmarks; converting the locations to three-dimensional (3D) world space locations relative to an origin of the vehicle; determining a pose of the current frame relative to a previous pose of a previous frame; encoding the 3D world space locations and the pose to generate encoded data corresponding to the current frame; and transmitting the encoded data.

In one or more embodiments, the system is comprised in at least one of: a control system for an autonomous or semi-autonomous machine; a perception system for an autonomous or semi-autonomous machine; a system for performing simulation operations; a system for performing deep learning operations; a system implemented using an edge device; a system implemented using a robot; a system incorporating one or more virtual machines (VMs); a system implemented at least partially in a data center; or a system implemented at least partially using cloud computing resources.

In one or more embodiments, a method comprises: computing, using one or more neural networks (NNs) and based at least in part on sensor data generated by one or more sensors of a vehicle, outputs indicative of locations in two-dimensional (2D) image space corresponding to detected landmarks; generating a distance function representation of the detected landmarks based at least in part on the locations; generating a cost space by, for at least two poses of a plurality of poses of the vehicle represented in the cost space: projecting map landmarks corresponding to a map into the 2D image space to generate projected map landmarks; comparing the projected map landmarks to the distance function representation; computing a cost based at least in part on the comparing; and updating a point of the cost space corresponding to each pose of the at least two poses based at least in part on the cost; and localizing the vehicle to the map based at least in part on the cost space.

In one or more embodiments, the localizing is to an origin of a road segment of a plurality of road segments of the map, and the method further comprises localizing the vehicle to a global coordinate system based at least in part on the localizing the vehicle to the origin of the road segment.

In one or more embodiments, the cost space corresponds to a current frame, and the method further comprises: generating a plurality of additional cost spaces corresponding to a plurality of previous frames; generating an aggregate cost space corresponding the cost space and the plurality of additional cost spaces, the generating the aggregate cost space including using ego-motion compensation relative to the current frame; and applying a filter to the aggregate cost space to determine a location representation of the vehicle for a current frame, wherein the localizing is further based at least in part on the location representation.

In one or more embodiments, the filter includes a Kalman filter.

In one or more embodiments, the location representation includes an ellipsoid.

In one or more embodiments, each of the plurality of cost spaces are generated based at least in part on respective outputs computed based at least in part on respective sensor data corresponding to a respective frame of the plurality of frames.

In one or more embodiments, one or more of the plurality of additional cost spaces was generated to correspond to a first road segment, and the generating the aggregate cost space includes transforming the one or more of the additional cost spaces to correspond to a second road segment corresponding to the cost space of the current frame.

In one or more embodiments, the transforming includes a translation transformation and a rotation transformation.

In one or more embodiments, the localizing corresponds to a modality of localization, and the method further comprises: localizing the vehicle using one or more additional modalities of localization; and fusing the modality of localization with the one or more additional modalities of localization to determine a final localization result.

In one or more embodiments, the one or more additional modalities of localization include a LiDAR modality, a RADAR modality, or a fusion modality.

In one or more embodiments, the modality of localization corresponds to a camera modality.

In one or more embodiments, the fusing includes applying a Kalman filter to localization results from the modality of localization and the additional modalities of localization.

In one or more embodiments, one or more of the map landmarks or the detected landmarks correspond to at least one of: lane dividers, road boundaries, signs, poles, vertical structures, wait conditions, static objects, or dynamic actors.

In one or more embodiments, the generating the cost space is further by, for at least two poses of the plurality of poses of the vehicle represented in the cost space: projecting the map landmarks corresponding to the map into another 2D image space to generate additional projected map landmarks; comparing map semantic information of the additional projected map landmarks to detected semantic information of the detected landmarks; and computing another cost based at least in part on the comparing the map semantic information to the detected semantic information.

In one or more embodiments, a method comprises: generating LiDAR data using one or more LiDAR sensors of a vehicle; generating a cost space by, for at least two poses of a plurality of poses of the vehicle represented in the cost space: projecting points corresponding to the LiDAR data into a distance function representation of a LiDAR point cloud corresponding to a LiDAR layer of a map; comparing the points to the distance function representation; computing a cost based at least in part on the comparing; and updating a point of the cost space corresponding to each pose of the at least two poses based at least in part on the cost; and localizing the vehicle to the map based at least in part on the cost space.

In one or more embodiments, the method further comprises: determining, from within a larger set of points represented by the LiDAR data, the points based at least in part on elevation values corresponding to the points being within an elevation range, wherein the LiDAR point cloud corresponds to the elevation range.

In one or more embodiments, the generating the cost space is further by, for each pose of the at least two poses of the vehicle represented in the cost space: projecting an elevation representation corresponding to the LiDAR data into a map elevation representation corresponding to the LiDAR layer of the map; comparing the elevation representation to the map elevation representation; and computing another cost based at least in part on the comparing the elevation representation to the map elevation representation.

In one or more embodiments, the comparing the elevation representation to the map elevation representation includes adjusting at least one of the elevation representation or the map elevation representation based at least in part on a difference between a vehicle origin of the vehicle or a road origin of a road segment that the map elevation representation corresponds to.

In one or more embodiments, the generating the cost space is further by, for each pose of the at least two poses of the vehicle represented in the cost space: projecting an intensity representation corresponding to the LiDAR data into a map intensity representation corresponding to the LiDAR layer of the map; comparing the intensity representation to the map intensity representation; and computing another cost based at least in part on the comparing the intensity representation to the map intensity representation.

In one or more embodiments, the localizing is to an origin of a road segment of a plurality of road segments of the map, and the method further comprises localizing the vehicle to a global coordinate system based at least in part on the localizing the vehicle to the origin of the road segment.

In one or more embodiments, the cost space corresponds to a current frame, and the method further comprises: generating a plurality of additional cost spaces corresponding to a plurality of previous frames; generating an aggregate cost space corresponding the cost space and the plurality of additional cost spaces, the generating the aggregate cost space including using ego-motion compensation relative to the current frame; and applying a filter to the aggregate cost space to determine a location representation of the vehicle for a current frame, wherein the localizing is further based at least in part on the location representation.

In one or more embodiments, the filter includes a Kalman filter.

In one or more embodiments, the location representation includes an ellipsoid.

In one or more embodiments, one or more of the plurality of additional cost spaces was generated to correspond to a first road segment, and the generating the aggregate cost space includes transforming the one or more of the additional cost spaces to correspond to a second road segment corresponding to the cost space of the current frame.

In one or more embodiments, the localizing corresponds to a modality of localization, and the method further comprises: localizing the vehicle using one or more additional modalities of localization; and fusing the modality of localization with the one or more additional modalities of localization to determine a final localization result.

In one or more embodiments, the modality of localization includes a LiDAR modality, and the one or more additional modalities of localization include a RADAR modality, an image modality, or a fusion modality.

In one or more embodiments, a system comprises: one or more sensors; one or more processors; and one or more memory devices storing instructions thereon that, when executed by the one or more processors, cause the one or more processors to execute operations comprising: generating sensor data using the one or more sensors; generating a cost space by, for at least two poses of a plurality of poses represented in the cost space: projecting points corresponding to the sensor data into a distance function representation of a point cloud corresponding to a map; comparing the points to the distance function representation; computing a cost based at least in part on the comparing; and updating a point of the cost space corresponding to each pose of the at least two poses based at least in part on the cost; and localizing the vehicle to the map based at least in part on the cost space.

In one or more embodiments, the system is comprised in at least one of: a control system for an autonomous or semi-autonomous machine; a perception system for an autonomous or semi-autonomous machine; a system for performing simulation operations; a system for performing deep learning operations; a system implemented using an edge device; a system incorporating one or more virtual machines (VMs); a system implemented using a robot; a system implemented at least partially in a data center; or a system implemented at least partially using cloud computing resources.

In one or more embodiments, the localizing is to an origin of a road segment of a plurality of road segments of the map, and the method further comprises localizing the vehicle to a global coordinate system based at least in part on the localizing the vehicle to the origin of the road segment.

In one or more embodiments, the cost space corresponds to a current frame, and the method further comprises: generating a plurality of additional cost spaces corresponding to a plurality of previous frames; generating an aggregate cost space corresponding the cost space and the plurality of additional cost spaces, the generating the aggregate cost space including using ego-motion compensation relative to the current frame; and applying a filter to the aggregate cost space to determine a location representation of the vehicle for a current frame, wherein the localizing is further based at least in part on the location representation.

In one or more embodiments, the sensor data corresponds to one or more of LiDAR data or RADAR data and the one or more sensor include one or more of LiDAR sensors or RADAR sensors.

What is claimed is:

1. A method comprising:
causing a vehicle to navigate within an environment based at least on a fused map representative of the environment, wherein the fused map is generated, at least, by:
receiving a plurality of mapstreams corresponding to a plurality of drives;
determining segments of two or more mapstreams of the plurality of mapstreams that are within a threshold distance to each other;
generating, based at least on registering the segments from the two or more mapstreams, a frame graph that includes poses and corresponding pose links associated with the two or more mapstreams;
generating, based at least on dividing the frame graph into road segments, a pose graph that includes a first portion of the poses and a first portion of the pose links corresponding to a first position within a first road segment of the road segments and a second portion of the poses and a second portion of the pose links corresponding to a second position within a second road segment of the road segments; and
generating the fused map based at least on fusing data from the two or more mapstreams according to the pose graph.

2. The method of claim 1, wherein the fused map is further generated, at least, by:
converting the two or more mapstreams to respective maps,
wherein the fusing the data from the two or more mapstreams comprises fusing the data from the respective maps.

3. The method of claim 2, wherein an individual map of the respective maps includes two or more map layers corresponding to different sensor modalities.

4. The method of claim 1, further comprising:
determining, based at least on the fused map, a path for the vehicle through the environment,
wherein the causing the vehicle to navigate through the environment comprises controlling the vehicle to navigate along the path.

5. The method of claim 1, wherein the plurality of mapstreams are generated by a plurality of vehicles.

6. The method of claim 1, further comprises receiving, using the vehicle, at least a subset of the fused map corresponding to sensor modalities that the vehicle is equipped with.

7. A method comprising:
receiving data representative of sensor data, perception outputs from one or more deep neural networks (DNNs), and trajectory information corresponding to a plurality of drives;
converting the data to first map data representative of a plurality of maps, an individual map of the plurality of maps corresponding to a drive of the plurality, of drives;
registering, based at least on the trajectory information, a first segment of a first map of the plurality of maps to a second segment of a second map of the plurality of maps;
generating, based at least on the registering, a frame graph that includes poses and corresponding pose links associated with the first segment of the first map and the second segment of the second map;
generating, based at least on assigning at least a portion of the poses and at least a portion of the pose links from the frame graph to road segments, a pose graph;
based at least on the pose graph, generating second map data representative of a fused map corresponding to the first map and the second map, the fused map including the road segments; and
sending data representative of the fused map to a vehicle to cause the vehicle to navigate an environment based at least on the fused map.

8. The method of claim 7, further comprising localizing the vehicle with respect to a global coordinate system.

9. The method of claim 7, wherein the individual map includes one or more map layers corresponding to different sensor modalities.

10. The method of claim 7, further comprising:
receiving additional data corresponding to additional drives based at least on a quality of localization results; and
updating the fused map based at least on the additional data.

11. The method of claim 7, further comprising generating, based at least on executing one or more optimization algorithms on the pose graph, an updated pose graph, wherein the generating the second map data representative of the fused map is based at least on the updated pose graph.

12. The method of claim 7, wherein the receiving the data representative of the sensor data, the perception outputs, and the trajectory information comprises receiving pre-processed data representative of the sensor data, the perception outputs, and the trajectory information, the pre-processed data reducing an amount of the data.

13. The method of claim 7, wherein the data representative of at least one of the sensor data, the perception outputs, or the trajectory information is received in a compressed format, and the method further comprises:
decompressing the data in the compressed format,
wherein the converting the data to the first map data includes converting the data after the decompressing.

14. The method of claim 7, wherein the registering includes geometric registration.

15. The method of claim 7, further comprising:
assigning one or more origins to the road segment;
computing one or more transforms between the one or more origins of neighboring road segments of the road segments; and
encoding the one or more transforms in the fused map.

16. The method of claim 7, further comprising determining to register the first segment and the second segment based at least on global navigation satellite system (GNSS) data corresponding to the first map and the second map.

17. The method of claim 7, wherein the perception outputs correspond to three-dimensional (3D) representations of detected landmarks, the detected landmarks including one or more of lane dividers, road boundaries, signs, poles, static objects, or vertical structures.

18. The method of claim 7, wherein the sensor data corresponds to at least one of LiDAR data, RADAR data, or ultrasonic data.

19. A system comprising:
one or more processing units to:
receive a plurality of mapstreams corresponding to a plurality of drives;
determine segments of two or more mapstreams of the plurality of mapstreams that are within a threshold distance to each other;
generate, based at least in part on registering the segments, a frame graph that includes poses and corresponding pose links associated with the segments;
generate, based at least on dividing the frame graph into road segments, a pose graph that includes a first portion of the poses and a first portion of the pose links corresponding to a first road segment of the road segments and a second portion of the poses and a second portion of the pose links corresponding to a second road segment of the road segments;
fuse data from the two or more mapstreams based at least on the pose graph;
generate, based at least on the data from the two or more mapstreams being fused, a fused map; and
send the fused map to a vehicle to cause the vehicle to navigate based at least on the fused map.

20. The system of claim 19, wherein the one or more processing units are further to:
convert the two or more mapstreams to respective maps,
wherein the data from the two or more mapstreams is fused using the respective maps.

21. The method of claim 20, wherein an individual respective map of the respective maps includes map layers corresponding to different sensor modalities.

22. The method of claim 19, wherein to cause the vehicle to navigate based at least on the fused map comprises causing the vehicle to:
determine, based at least on the fused map, a path for the vehicle through an environment; and
control the vehicle to navigate the path.

23. The method of claim 19, wherein the one or more processing units are further to receive the plurality of mapstreams from a plurality of vehicles.

24. The method of claim 19, wherein a first subset of the fused map corresponding to first sensor modalities that the vehicle is equipped with is sent to the vehicle, and a second subset of the fused map corresponding to second sensor modalities that the vehicle is not equipped with is not sent to the vehicle.

25. The system of claim 19, wherein the system is located in at least one of:
a control system for an autonomous or semi-autonomous machine;
a perception system for an autonomous or semi-autonomous machine;
a system for performing simulation operations;
a system for performing deep learning operations;
a system implemented using an edge device;
a system incorporating one or more virtual machines (VMs);
a system implemented at least partially in a data center; or
a system implemented at least partially using cloud computing resources.

* * * * *